US012666498B2

(12) United States Patent
Luo et al.

(10) Patent No.: US 12,666,498 B2
(45) Date of Patent: Jun. 23, 2026

(54) REDUCTION OF POWER CONSUMPTION OF A TERMINAL DEVICE IN DUAL CONNECTIVITY

(71) Applicant: Honor Device Co., Ltd., Shenzhen (CN)

(72) Inventors: Qiao Luo, Shenzhen (CN); Kai Yuan, Shenzhen (CN); Lianyi Zhao, Shenzhen (CN); Yanzhao He, Shenzhen (CN); Hongyang Ma, Shenzhen (CN); Xiaoyan Wang, Shenzhen (CN); Ding Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 544 days.

(21) Appl. No.: 17/783,882

(22) PCT Filed: Nov. 16, 2020

(86) PCT No.: PCT/CN2020/128944
§ 371 (c)(1),
(2) Date: Jun. 9, 2022

(87) PCT Pub. No.: WO2021/115030
PCT Pub. Date: Jun. 17, 2021

(65) Prior Publication Data
US 2023/0024741 A1 Jan. 26, 2023

(30) Foreign Application Priority Data
Dec. 10, 2019 (CN) .......................... 201911259929.5

(51) Int. Cl.
*H04W 76/34* (2018.01)
*H04W 52/02* (2009.01)

(52) U.S. Cl.
CPC ....... *H04W 76/34* (2018.02); *H04W 52/0219* (2013.01); *H04W 52/0261* (2013.01)

(58) Field of Classification Search
CPC ............. H04W 76/34; H04W 52/0219; H04W 52/0261; H04W 52/0216; H04W 8/02;
(Continued)

(56) References Cited

U.S. PATENT DOCUMENTS 8,774,868 B2 7/2014 Niu et al.
9,167,526 B2 10/2015 Yun et al.
(Continued)

FOREIGN PATENT DOCUMENTS

CN 101877745 A 11/2010
CN 102111858 A 6/2011
(Continued)

OTHER PUBLICATIONS

Mediatek Inc."On the Scope of NR UE Power Saving WI," 3GPP TSG RAN Meeting 83, RP-190481, Shenzhen, Guangdong, China, Mar. 18-21, 2019, 4 pages.

*Primary Examiner* — Hoang-Chuong Q Vu
(74) *Attorney, Agent, or Firm* — Leydig, Voit & Mayer, Ltd.

(57) ABSTRACT

This application provides a terminal device and a communication method. The terminal device is in a dual-connectivity network including a long term evolution (LTE) link and a new radio (NR) link, and when the terminal device detects that the terminal device is in a power saving mode, and/or when the terminal device detects that battery power of the terminal device is less than or equal to a first preset value, and/or when the terminal device detects that temperature of a rear cover of the terminal device is greater than or equal to a second preset value, the terminal device releases the NR link, and uses the LTE link for communication.

20 Claims, 57 Drawing Sheets

(58) Field of Classification Search
CPC ....... H04W 8/24; H04W 76/16; H04W 88/06; H04W 24/10; H04W 52/0251; H04W 48/16; H04L 5/001; Y02D 30/70
See application file for complete search history.

(56) References Cited

U.S. PATENT DOCUMENTS

| | | | |
|---|---|---|---|
| 10,172,183 B2 | 1/2019 | Diachina et al. | |
| 10,356,717 B2 | 7/2019 | Trainin et al. | |
| 10,671,140 B2 | 6/2020 | Ge et al. | |
| 10,880,798 B2* | 12/2020 | Lee ....................... | H04W 48/20 |
| 11,595,903 B2* | 2/2023 | Ahn .................. | H04W 52/0264 |
| 11,647,459 B2* | 5/2023 | Islam ................ | H04W 52/0212 |
| | | | 370/311 |
| 11,812,387 B2 | 11/2023 | Tang et al. | |
| 11,956,723 B2 | 4/2024 | Yoon et al. | |
| 2012/0324260 A1 | 12/2012 | Kezuka et al. | |
| 2016/0004408 A1* | 1/2016 | Yun ......................... | G06F 3/017 |
| | | | 345/173 |
| 2017/0272999 A1 | 9/2017 | Tsai | |
| 2017/0367047 A1* | 12/2017 | Fujishiro ........... | H04W 52/0216 |
| 2019/0075537 A1* | 3/2019 | Wu ....................... | H04W 76/15 |
| 2019/0208474 A1 | 7/2019 | Ali et al. | |
| 2019/0268950 A1 | 8/2019 | Youtz et al. | |
| 2019/0289552 A1* | 9/2019 | Jain ...................... | H04B 7/0626 |
| 2019/0349822 A1* | 11/2019 | Kim ....................... | H04W 36/08 |
| 2020/0068638 A1* | 2/2020 | Au ......................... | H04W 48/16 |
| 2020/0351771 A1* | 11/2020 | Geekie ................. | H04W 76/30 |
| 2020/0396676 A1* | 12/2020 | Ahluwalia ........... | H04W 48/18 |

| | | | |
|---|---|---|---|
| 2021/0037473 A1* | 2/2021 | Liu ........................ | H04W 76/28 |
| 2021/0045177 A1* | 2/2021 | Lee ........................ | H04W 76/18 |
| 2021/0099936 A1* | 4/2021 | Gupta ................... | H04W 80/06 |
| 2021/0132678 A1* | 5/2021 | An ........................... | G06F 3/013 |
| 2021/0298106 A1* | 9/2021 | Jha ........................... | H04W 8/24 |
| 2022/0046546 A1 | 2/2022 | Wang et al. | |
| 2022/0078877 A1* | 3/2022 | Lee ....................... | H04W 76/15 |
| 2022/0150829 A1* | 5/2022 | Yoon ................ | H04W 52/0277 |

FOREIGN PATENT DOCUMENTS

| | | |
|---|---|---|
| CN | 103199311 A | 7/2013 |
| CN | 105407521 A | 3/2016 |
| CN | 107493596 A | 12/2017 |
| CN | 107566156 A | 1/2018 |
| CN | 107852694 A | 3/2018 |
| CN | 110493892 A | 11/2019 |
| CN | 110505652 A | 11/2019 |
| CN | 110536342 A | 12/2019 |
| CN | 110536343 A | 12/2019 |
| CN | 110536345 A | 12/2019 |
| CN | 110536346 A | 12/2019 |
| CN | 110536347 A | 12/2019 |
| CN | 110536348 A | 12/2019 |
| CN | 110831096 A | 2/2020 |
| CN | 110226347 B | 9/2021 |
| EP | 3462789 A1 | 4/2019 |
| EP | 3550877 A1 | 10/2019 |
| EP | 3937533 A1 | 1/2022 |
| EP | 4415460 A1 | 8/2024 |
| RU | 2662451 C1 | 7/2018 |

* cited by examiner

200

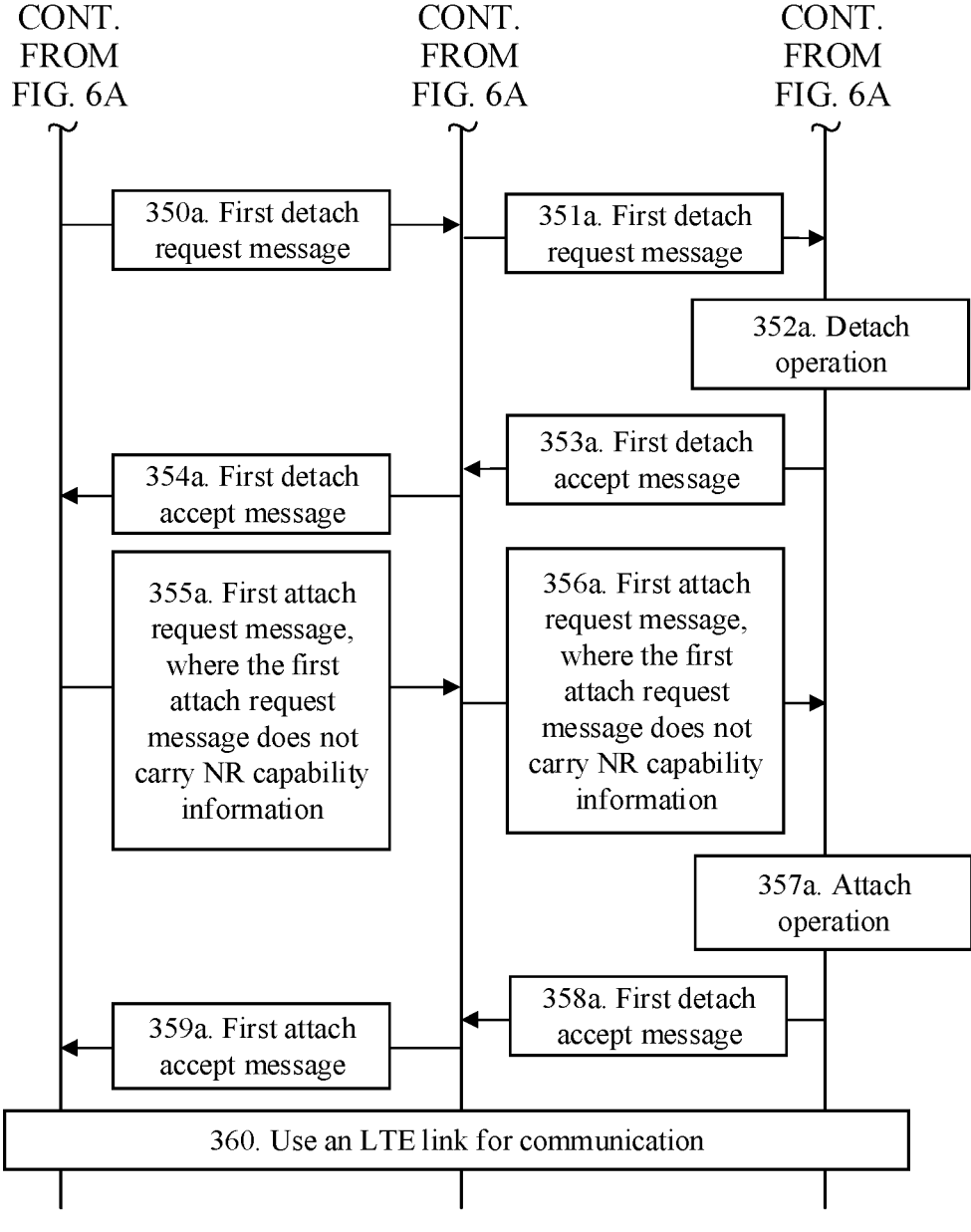

CONT.
FROM
FIG. 6A

CONT.
FROM
FIG. 6A

CONT.
FROM
FIG. 6A

350a. First detach request message

351a. First detach request message

352a. Detach operation

353a. First detach accept message

354a. First detach accept message

355a. First attach request message, where the first attach request message does not carry NR capability information 356a. First attach request message, where the first attach request message does not carry NR capability information 357a. Attach operation 358a. First detach accept message 359a. First attach accept message 360. Use an LTE link for communication

FIG. 6B

Figure 7:
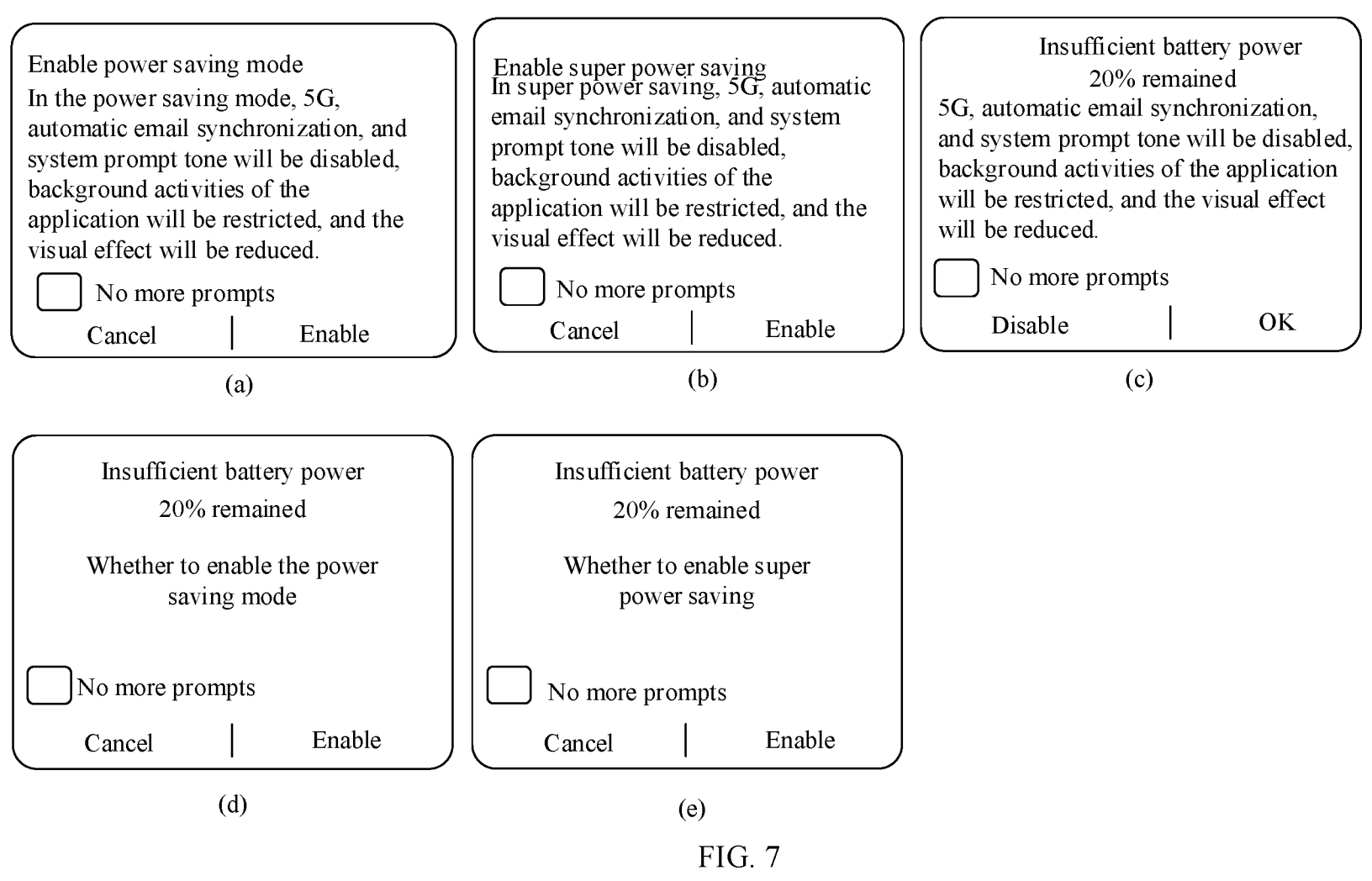

Enable power saving mode
In the power saving mode, 5G,
automatic email synchronization, and
system prompt tone will be disabled,
background activities of the
application will be restricted, and the
visual effect will be reduced.

☐ No more prompts

Cancel | Enable (a)

Enable super power saving
In super power saving, 5G, automatic
email synchronization, and system
prompt tone will be disabled,
background activities of the
application will be restricted, and the
visual effect will be reduced.

☐ No more prompts

Cancel | Enable (b)

Insufficient battery power
20% remained
5G, automatic email synchronization,
and system prompt tone will be disabled,
background activities of the application
will be restricted, and the visual effect
will be reduced.

☐ No more prompts

Disable | OK (c)

Insufficient battery power
20% remained

Whether to enable the power
saving mode

☐ No more prompts

Cancel | Enable (d)

Insufficient battery power
20% remained

Whether to enable super
power saving

☐ No more prompts

Cancel | Enable (e)

← Battery

71%
37 hours and 51 minutes remained ( One-key power saving )

Performance mode
35 hours and 57 minutes remained

Power saving mode
42 hours and 43 minutes remained

Super power saving
138 hours and 41 minutes remained

Power consumption ranking 〉

Battery usage details        Do not display 〉

Power percentage display mode 〉

More battery settings 〉

← Battery                                    🔍

71%
37 hours and 51 minutes remained ( One-key power saving )

Performance mode
35 hours and 57 minutes remained

Power saving mode
42 hours and 43 minutes remained

Super power saving
138 hours and 41 minutes remained

Power consumption ranking                      >

Battery usage details          Do not display  >

Power percentage display mode                  >

More battery settings                          >

Figure 16:
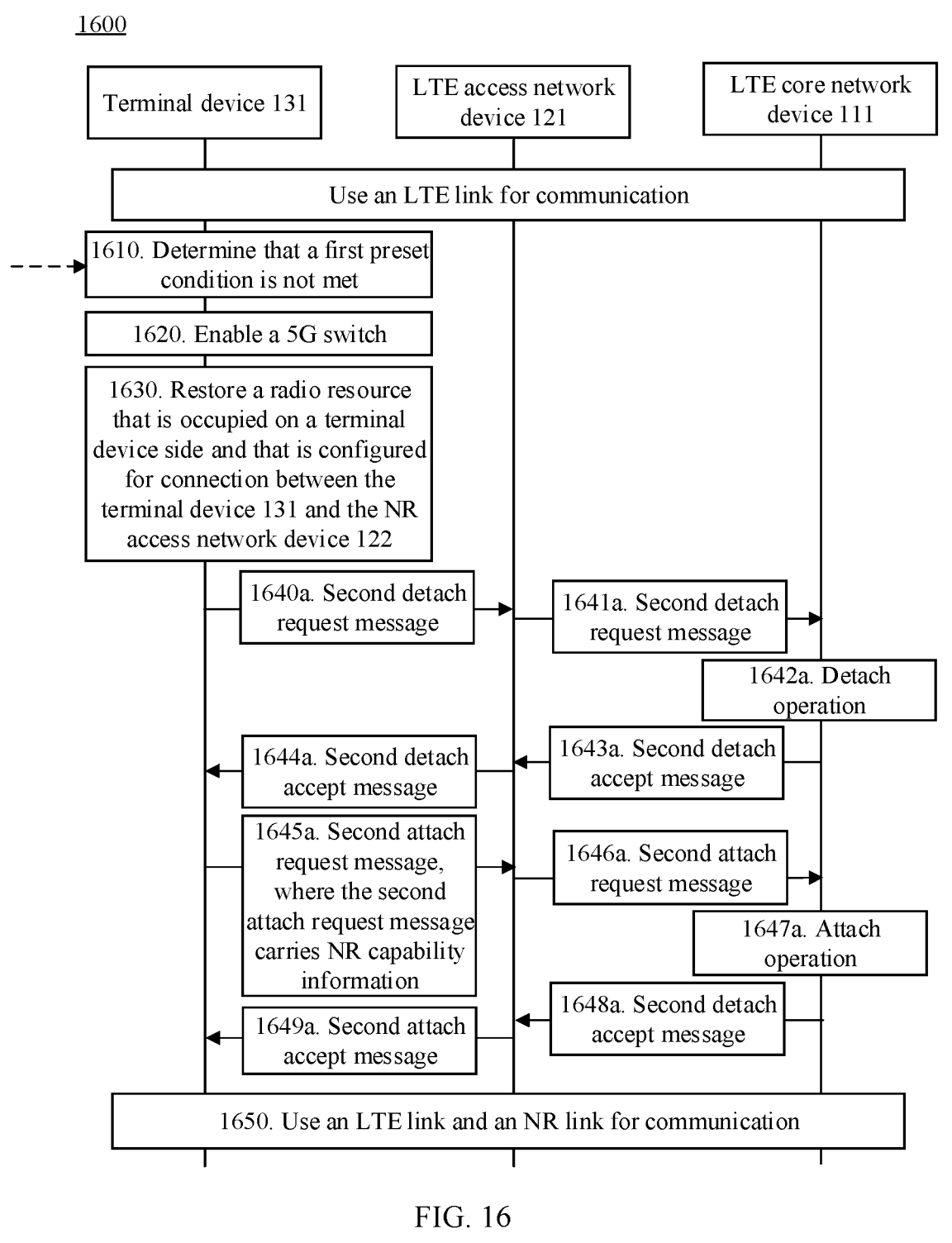

| Terminal device 131 | LTE access network device 121 | LTE core network device 111 |

Use an LTE link for communication

1610. Determine that a first preset condition is not met

1620. Enable a 5G switch

1630. Restore a radio resource that is occupied on a terminal device side and that is configured for connection between the terminal device 131 and the NR access network device 122

1640a. Second detach request message

1641a. Second detach request message

1642a. Detach operation

1644a. Second detach accept message

1643a. Second detach accept message

1645a. Second attach request message, where the second attach request message carries NR capability information 1646a. Second attach request message 1647a. Attach operation 1649a. Second attach accept message 1648a. Second detach accept message 1650. Use an LTE link and an NR link for communication

REDUCTION OF POWER CONSUMPTION OF A TERMINAL DEVICE IN DUAL CONNECTIVITY

CROSS-REFERENCE TO RELATED APPLICATIONS

This application is a National Stage of International Application No. PCT/CN2020/128944, filed on Nov. 16, 2020, which claims priority to Chinese Patent Application No. 201911259929.5, filed on Dec. 10, 2019, the disclosures of which are hereby incorporated by reference in their entireties.

TECHNICAL FIELD

This application relates to the field of electronic devices, and more specifically, to a terminal device and a communication method.

BACKGROUND

In an existing communications system, to improve a data transmission rate, a terminal device may perform data transmission with a core network device by using a plurality of access network devices. For example, in existing 5G non-standalone (NSA) networking, a terminal device performs data transmission with a core network device by using two access network devices, one of the two access network devices support a new radio (NR) network, and the other access network device supports a long-term evolution (LTE) network. Compared with a conventional manner in which a terminal device performs data transmission with a core network device by using one access network device, the manner in which a terminal device performs data transmission with a core network device by using a plurality of access network devices increases power consumption of the terminal device.

SUMMARY

This application provides a terminal device and a communication method. The terminal device is in a dual-connectivity network including an LTE link and an NR link, and when the terminal device detects that the terminal device is in a power saving mode, and/or when the terminal device detects that battery power of the terminal device is less than or equal to a first preset value, and/or when the terminal device detects that temperature of a rear cover of the terminal device is greater than or equal to a second preset value, the terminal device releases the NR link, and uses the LTE link for communication; or when the terminal device detects that the terminal device is in a non-power saving mode, and/or when the terminal device detects that the battery power of the terminal device is greater than the first preset value, and/or when the terminal device detects that the temperature of the rear cover of the terminal device is less than the second preset value, the terminal device restores the NR link and uses both the NR link and the LTE link for communication. In the foregoing technical solution, power consumption of the terminal device is reduced while a user requirement is met, thereby improving user experience.

According to a first aspect, this application provides a terminal device. The terminal device includes: a processor; and a computer storage medium, where the computer storage medium includes an instruction. When the processor executes the instruction, the terminal device is enabled to perform the following actions: camping on a dual-connectivity network, where the dual-connectivity network includes a long term evolution (LTE) link and a new radio (NR) link; determining that the terminal device meets a first preset condition, and releasing the NR link, where the first preset condition includes at least one of the following: the terminal device is in a power saving mode, or battery power of the terminal device is less than or equal to a first preset value, or temperature of a rear cover of the terminal device is greater than or equal to a second preset value; and after the NR link is released, using the LTE link for communication.

The LTE link may also be referred to as a 4G link, and the NR link may also be referred to as a 5G link.

That the terminal device camps on the dual-connectivity network may be understood as that the terminal device is in communication connection with a 4G access network device, and the terminal device is in communication connection with a 5G access network device, and uses the NR link and the LTE link for communication. The 4G access network device provides an LTE network for the terminal device, and the 5G access network device provides a 5G network for the terminal device.

When the terminal device camps on the dual-connectivity network, a mobile network identifier displayed on a display interface of the terminal device is "5G".

That the terminal device is in the power saving mode may be understood as that a switch of the power saving mode of the terminal device is in the enabled state. That the power saving mode of the terminal device is enabled may be that the user enables the switch of the power saving mode of the terminal device; or that the power saving mode of the terminal device is enabled may be that the terminal device enables the switch of the power saving mode of the terminal device.

Optionally, the power saving mode may further include a super power saving mode. That the terminal device detects that the terminal device is in the power saving mode may also be understood as that the switch of the power saving mode of the terminal device is in the enabled state and/or the switch of the super power saving mode of the terminal device is in the enabled state, that is, the terminal device considers that the terminal device is in the power saving mode only if the terminal device detects that at least one of the switch of the power saving mode of the terminal device or the switch of the super power saving mode is in the enabled state.

The first preset value may be a preset value. For example, the first preset value may be 20%.

The second preset value may be a preset value. For example, the second preset value may be 43° C.

A sensor is disposed on a rear cover of the terminal device, and the sensor on the terminal device may detect temperature of the rear cover of the terminal device.

The terminal device is in a dual-connectivity network including an LTE link and an NR link, and when the terminal device detects that the terminal device is in the power saving mode, and/or when the terminal device detects that battery power of the terminal device is less than or equal to the first preset value, and/or when the terminal device detects that the temperature of the rear cover of the terminal device is greater than or equal to the second preset value, the terminal device releases the NR link, and uses the LTE link for communication, so that power consumption of the terminal device is reduced while a user requirement is met, thereby improving user experience.

With reference to the first aspect, in a possible implementation, when the processor executes the instruction, the terminal device is enabled to further perform the following action: reporting NR capability change information of the terminal device, where the NR capability change information is used to indicate that the terminal device does not support an NR capability.

When the terminal device camps on the dual-connectivity network, the terminal device supports the NR capability.

The terminal device reports the NR capability change information of the terminal device, so as to release the NR link, so that a radio resource that is occupied on the 5G access network device side and that is configured for connection between the terminal device and the 5G access network device is released.

With reference to the first aspect, in a possible implementation, when the processor executes the instruction, the terminal device is enabled to further perform the following action: sending a first attach request message, where the first attach request message does not carry information indicating that the terminal device supports an NR capability, so as to release the NR link.

That the first attach request message does not carry information indicating that the terminal device supports an NR capability means that no field in the first attach request message indicates that the terminal device supports the NR capability, and the terminal device does not support the NR capability. For example, the first attach request message does not include a field "dCNR: dual-connectivity-with-nr-supported".

In this case, the terminal device indicates, by using the first attach request message, that the terminal device does not support the NR capability. Therefore, the mobile network identifier displayed on the display interface of the terminal device changes from "5G" to "4G" (in this case, the terminal device 131 successfully camps on 4G, and the mobile network identifier may not be displayed on the display interface of the terminal device 131). The first attach request message may be sent by the terminal device to the 4G access network device, and the 4G access network device then forwards the first attach request message to the 4G core network device, so that the 4G core network device releases the NR link, so that the radio resource that is occupied on the 5G access network device side and that is configured for the connection between the terminal device and the 5G access network device is released.

The terminal device indicates, by using the first attach request message, that the terminal device does not support the NR capability, so that the NR link is released.

With reference to the first aspect, in a possible implementation, when the processor executes the instruction, the terminal device is enabled to further perform the following actions: before the sending a first attach request message, sending a first detach request message, where the first detach request message is used to request to perform a detach operation on the terminal device; and receiving a first detach accept message, where the first detach accept message is used to indicate that the detach operation on the terminal device has been completed.

The sending the first detach message may be that the terminal device sends the first detach message to the 4G access network device, and the 4G access network device then forwards the first detach message to the 4G core network device, so that the 4G core network device performs the detach operation on the terminal device.

With reference to the first aspect, in a possible implementation, when the processor executes the instruction, the terminal device is enabled to further perform the following action: after the sending a first attach request message, receiving a first attach accept message, where the first attach accept is used to indicate that an attach operation on the terminal device has been completed.

The first attach accept message may be sent by the 4G core network device to the 4G access network device after the 4G core network device completes the detach operation on the terminal device. The 4G access network device then forwards the first attach accept message to the terminal device.

With reference to the first aspect, in a possible implementation, when the processor executes the instruction, the terminal device is enabled to further perform the following actions: sending a first tracking area update (TAU) request message, where the first TAU request message carries information indicating that the terminal device does not support an NR capability, so as to release the NR link.

The terminal device indicates, by using the first TAU request message, that the terminal device does not support the NR capability. Therefore, the mobile network identifier displayed on the display interface of the terminal device changes from "5G" to "4G" (in this case, the terminal device 131 successfully camps on 4G, and the mobile network identifier may not be displayed on the display interface of the terminal device 131).

The first TAU request message may be sent by the terminal device to the 4G access network device, and the 4G access network device then forwards the first TAU request message to the 4G core network device, so that the 4G core network device releases the NR link. In this way, the radio resource that is occupied on the 5G access network device side and that is configured for the connection between the terminal device and the 5G access network device is released.

With reference to the first aspect, in a possible implementation, when the processor executes the instruction, the terminal device is enabled to further perform the following action: before sending the first TAU request message, determining that an SCG is added, and sending a first SCG failure request message, where the first SCG request message is used to request to release the NR link.

With reference to the first aspect, in a possible implementation, when the processor executes the instruction, the terminal device is enabled to further perform the following action: before reporting the NR capability change information of the terminal device, disabling a 5G switch.

Optionally, that the terminal device disables the 5G switch may be that the terminal device actively disables the 5G switch and that the terminal device passively disables the 5G switch. That the terminal device actively disables the 5G switch may be understood as that the terminal device disables the 5G switch. That the terminal device passively disables the 5G switch may be understood as that the terminal device disables the 5G switch only after detecting a user operation of disabling 5G.

That the terminal device disables 5G may be understood as that the 5G switch on a "Settings" interface of the terminal device is in the disabled state. If the 5G switch is added to the shortcut, in this case, the c presented in a drop-down status bar of the display interface of the terminal device is also in the disabled state.

After the terminal device disables the 5G switch, the 5G switch on the "Settings" interface of the terminal device is in the disabled state. If the 5G switch is added to the shortcut, in this case, the "5G" shortcut switch presented in a drop-down status bar of the display interface of the terminal device is also in the disabled state.

After it is determined that the terminal device meets the first preset condition, the 5G switch is disabled, thereby saving power of the terminal device and reducing the power consumption of the terminal device.

With reference to the first aspect, in a possible implementation, when the processor executes the instruction, the terminal device is enabled to further perform the following action: sending a first A2 measurement report, where the first A2 measurement report includes a fictional value of reference signal received power (RSRP) of an NR cell on which the terminal device currently camps, and the fictional value of the RSRP of the cell on which the terminal device currently camps is less than a first threshold, so as to release the NR link.

The A2 measurement report is specific to an event A2. The event A2 means that signal quality of a serving cell is lower than a specific threshold.

The first threshold may be carried in a measurement configuration message delivered by the LTE access network device.

For example, if an RSRP threshold for triggering the event A2 is −85 dBm and the fictional value of the RSRP of the 5G cell on which the terminal device currently camps is −95 dBm, the terminal device is triggered to report the event A2, that is, the first A2 measurement report includes that the RSRP of the 5G cell on which the terminal device currently camps is −95 dBm.

The first A2 measurement report may be sent by the terminal device to the 4G access network device. The 4G access network device may notify, by using an X2 interface, the 5G access network device that the NR link is released, so that the radio resource that is occupied on the 5G access network device side and that is configured for the connection between the terminal device and the 5G access network device is released.

In this case, the terminal device does not indicate that the terminal device does not support the NR capability. Therefore, the mobile network identifier displayed on the display interface of the terminal device is still "5G".

With reference to the first aspect, in a possible implementation, when the processor executes the instruction, the terminal device is enabled to further perform the following action: sending a first secondary cell group (SCG) failure request message, where the first SCG failure request message is used to request to release the NR link.

The first SCG failure request message may be specified differently in different protocol versions. For example, in an R12 protocol version, the first SCG failure request message may be a signaling message SCGFailureInformation-r12-IEs, which includes parameters such as a failure type failureType-r12. The failure type includes any one or a combination of the following parameters: a timer delay (that is, a supported delay for data transmission between a terminal device and a network side), a random access problem randomAccessProblem, a maximum quantity of RLC retransmissions rlc-MaxNumRetx (a maximum quantity of RLC data packet retransmissions allowed), an SCG link change failure scg-ChangeFailure (that is, an SCG link handover is not supported), and the like.

In this case, the terminal device does not indicate that the terminal device does not support the NR capability. Therefore, the mobile network identifier displayed on the display interface of the terminal device is still "5G".

The first SCG failure request message may be sent by the terminal device to the 4G access network device. The 4G access network device notifies, by using an X2 interface, the 5G access network device that the NR link is released, so that the radio resource that is occupied on the 5G access network device side and that is configured for the connection between the terminal device and the 5G access network device is released.

With reference to the first aspect, in a possible implementation, when the processor executes the instruction, the terminal device is enabled to further perform the following action: receiving a first secondary cell group (SCG) release message, where the first SCG release message is used to indicate that the NR link is released.

With reference to the first aspect, in a possible implementation, when the processor executes the instruction, the terminal device is enabled to further perform the following action: after sending the first A2 measurement report or sending the first SCG request message, stopping NR measurement.

Stopping the NR measurement may be understood as that the terminal device stops measurement of a cell of the 5G access network device.

With reference to the first aspect, in a possible implementation, when the processor executes the instruction, the terminal device is enabled to further perform the following actions: displaying a first selection window on a first interface of the terminal device, where the first selection window is used to remind whether to disable 5G; and when a first operation is detected in the first selection window, disabling 5G in response to the first operation, so as to release the NR link.

For example, the first selection window includes a function button such as an "Enable" button or an "OK" button and a function button such as a "Cancel" button or a "Disable" button, so that the terminal device determines whether to disable 5G.

For example, the first operation may be an operation of tapping the "Enable" button by the user; or the first operation may be an operation of tapping the "OK" button by the user.

Optionally, when the terminal device detects that the battery power of the terminal device is less than or equal to the first preset value, before the terminal device displays the first selection window on the display interface of the terminal device, the terminal device 131 may further display a second selection window on the display interface of the terminal device, where the second selection window displays second content, and the second content is used to remind whether to enable the power saving mode; or the second selection window displays second content, and the second content is used to remind whether to enable super power saving.

After 5G is disabled, the terminal device may release the NR link. Releasing the NR link includes disabling the 5G switch, releasing a radio resource that is occupied on the 5G access network device side and that is configured for connection between the terminal device and the 5G access network device, and releasing a radio resource that is occupied on the terminal device side and that is configured for the connection between the terminal device and the 5G access network device; or releasing the NR link includes releasing a radio resource that is occupied on the 5G access network device side and that is configured for the connection between the terminal device and the 5G access network device, and releasing a radio resource that is occupied on the terminal device side and that is configured for the connection between the terminal device and the 5G access network device.

The first selection window for reminding whether to disable 5G is displayed on the terminal device, so that 5G is disabled based on the first operation in the first selection window, and the power consumption of the terminal device is reduced while the user requirement is met.

With reference to the first aspect, in a possible implementation, when the processor executes the instruction, the terminal device is enabled to further perform the following actions: sending, by an application processor (AP) of the terminal device, an attention (AT) command to a NAS layer of the terminal device, where the AT command instructs to release the NR link; and indicating, by the NAS of the terminal device, an RRC layer of the terminal device to release the NR link; and releasing, by the RRC layer of the terminal device, a radio resource that is occupied on the terminal device side and that is configured for connection between the terminal device and the NR access network device.

The terminal device releases the radio resource that is occupied on the terminal device side and that is configured for the connection between the terminal device and the NR access network device, thereby saving the power of the terminal device and reducing the power consumption of the terminal device.

With reference to the first aspect, in a possible implementation, when the processor executes the instruction, the terminal device is enabled to further perform the following actions: determining that the terminal device does not meet the first preset condition, and restoring the NR link; and after the NR link is restored, using the LTE link and the NR link for communication.

The restoring the NR link includes: restoring the NR link by the terminal device side and restoring the NR link by a 4G core network device side.

Specifically, the restoring the NR link by the terminal device side includes: sending, by the AP of the terminal device, an AT command to the NAS layer of the terminal device, where the AT command instructs to restore the NR link; indicating, by the NAS of the terminal device, the RRC layer of the terminal device to restore the NR link; and restoring, by the RRC layer of the terminal device, the radio resource that is occupied on the terminal device side and that is configured for the connection between the terminal device and the NR access network device.

When the terminal device detects that the terminal device is in the non-power saving mode, and/or when the terminal device detects that the battery power of the terminal device is greater than the first preset value, and/or when the terminal device detects that the temperature of the rear cover of the terminal device is less than the second preset value, the terminal device restores the NR link and uses both the NR link and the LTE link for communication, thereby improving user experience.

Restoring the NR link may be an opposite process of releasing the NR link.

Specifically, when the NR link is to be released, the terminal device releases the NR link by reporting information indicating that the terminal device does not support the NR capability. When the NR link is to be restored, the terminal device restores the NR link by reporting information indicating that the terminal device supports the NR capability.

In a possible implementation, when the processor executes the instruction, the terminal device is enabled to further perform the following action: sending a second attach request message, where the second attach request message carries information indicating that the terminal device supports the NR capability, so as to restore the NR link.

That the second attach request message carries information indicating that the terminal device supports the NR capability means that a field in the first attach request message indicates that the terminal device supports the NR capability. For example, the second attach request message includes a field "dCNR: dual-connectivity-with-nr-supported".

In this case, the terminal device indicates, by using the second attach request message, that the terminal device supports the NR capability. Therefore, the mobile network identifier displayed on the display interface of the terminal device changes from "4G" to "5G" (in this case, the terminal device 131 successfully camps on 5G, and the mobile network identifier may not be displayed on the display interface of the terminal device 131). The second attach request message may be sent by the terminal device to the 4G access network device, and the 4G access network device then forwards the second attach request message to the 4G core network device, so that the 4G core network device restores the NR link, and the radio resource that is occupied on the NR access network device side and that is configured for the connection between the terminal device and the 5G access network device is restored.

When the processor executes the instruction, the terminal device is enabled to further perform the following actions: before sending the second attach request message, sending, by the terminal device, a second detach request message, where the second detach request message is used to request to perform a detach operation on the terminal device; and receiving a second detach accept message, where the second detach accept message is used to indicate that the detach operation on the terminal device has been completed.

The sending the second detach message may be that the terminal device sends the second detach message to the 4G access network device, and the 4G access network device then forwards the second detach message to the 4G core network device, so that the 4G core network device performs the detach operation on the terminal device.

Optionally, when the processor executes the instruction, the terminal device is enabled to further perform the following action: after sending the second attach request message, receiving a second attach accept message, where the second attach accept is used to indicate that the attach operation on the terminal device has been completed.

The second attach accept message may be sent by the 4G core network device to the 4G access network device after the 4G core network device completes the detach operation on the terminal device. The 4G access network device then forwards the second attach accept message to the terminal device.

In another possible implementation, when the processor executes the instruction, the terminal device is enabled to further perform the following action: sending, by the terminal device, a second TAU request message, where the second TAU message carries information indicating that the terminal device supports NR, so as to restore the NR link.

The sending the second TAU request message may be that the terminal device sends the second TAU request message to the 4G access network device, and the 4G access network device then forwards the second TAU request message to the 4G core network device, so that the 4G core network device restores the radio resource that is occupied on the NR access network device side and that is configured for the connection between the terminal device and the 5G access network device.

The terminal device indicates, by using the second TAU request message, that the terminal device supports the NR capability. Therefore, the mobile network identifier displayed on the display interface of the terminal device changes from "4G" to "5G" (in this case, the terminal device 131 successfully camps on 5G, and the mobile network identifier may not be displayed on the display interface of the terminal device 131). Optionally, when the processor executes the instruction, the terminal device is enabled to further perform the following actions: after sending the second TAU request message, receiving an NR measurement reconfiguration message periodically sent by the 4G access network device, where the NR measurement reconfiguration message carries measurement information of at least one first cell, the measurement information includes a frequency channel number, a reference signal, and a measurement threshold, and the first cell is a cell covered by the 5G access network device.

The at least one first cell is an inter-RAT neighboring cell of a cell on which the terminal device currently camps.

For example, the reference signal may be a synchronization signal block (SSB) and a channel state information-reference signal (CSI-RS).

The B1 measurement report is specific to an event B1. The event B1 means that quality of the inter-RAT neighboring cell is higher than a specific threshold.

The terminal device sends the second TAU request message to the LTE access network device, where the second TAU request message carries information indicating that the terminal device supports NR, the 4G access network device forwards the second TAU request message to the 4G core network device, and triggers the 4G access network device to deliver the NR measurement reconfiguration message, so that the terminal device measures the at least one first cell based on the NR measurement reconfiguration message, thereby implementing restoration of the NR link.

Optionally, when the processor executes the instruction, the terminal device is enabled to further perform the following action: before reporting the information indicating that the terminal device supports the NR capability, enabling the 5G switch.

After the terminal device enables the 5G switch, the 5G switch on the "Settings" interface of the terminal device is in the enabled state. If the 5G switch is added to the shortcut, in this case, the "5G" shortcut switch presented in a drop-down status bar of the display interface of the terminal device is also in the enabled state.

Specifically, when the NR link is to be released, the terminal device releases the NR link by stopping the NR measurement. When the NR link is to be restored, the terminal device restores the NR link by restoring the NR measurement.

Restoring the NR measurement may be understood as that the terminal device restores measurement of a cell of the 5G access network device.

When the processor executes the instruction, the terminal device is enabled to further perform the following actions: after restoring the NR measurement, receiving an NR measurement reconfiguration message periodically sent by the 4G access network device, where the NR measurement reconfiguration message carries measurement information of the at least one first cell, and the measurement information includes a frequency channel number, a reference signal, and a measurement threshold; and sending a first B1 measurement report, where the first B1 measurement report includes a measurement value of the RSRP of the at least one first cell.

In this case, the terminal device does not indicate that the terminal device does not support the NR capability. Therefore, the mobile network identifier displayed on the display interface of the terminal device is still "5G". The terminal device restores the NR measurement, so that the terminal device may receive the NR measurement reconfiguration message, and may measure the at least one first cell based on the NR measurement reconfiguration message, so as to implement restoration of the NR link.

With reference to the first aspect, in a possible implementation, when the processor executes the instruction, the terminal device is enabled to further perform the following actions: sending, by the AP of the terminal device, an AT command to the NAS layer of the terminal device, where the AT command instructs to restore the NR link; and indicating, by the NAS of the terminal device, the RRC layer of the terminal device to restore the NR link; and restoring, by the RRC layer of the terminal device, the radio resource that is occupied on the terminal device side and that is configured for the connection between the terminal device and the NR access network device.

According to a second aspect, this application provides a communication method, where the method is applied to a terminal device, and the method includes: camping on a dual-connectivity network, where the dual-connectivity network includes a long term evolution (LTE) link and a new radio (NR) link; determining that the terminal device meets a first preset condition, and releasing the NR link, where the first preset condition includes at least one of the following: the terminal device is in a power saving mode, or battery power of the terminal device is less than or equal to a first preset value, or temperature of a rear cover of the terminal device is greater than or equal to a second preset value; and after the NR link is released, using the LTE link for communication.

With reference to the second aspect, in a possible implementation, the releasing the NR link includes: reporting NR capability change information of the terminal device, where the NR capability change information is used to indicate that the terminal device does not support an NR capability.

With reference to the second aspect, in a possible implementation, the reporting NR capability change information of the terminal device includes: sending a first attach request message, where the first attach request message does not carry information indicating that the terminal device supports an NR capability, so as to release the NR link.

With reference to the second aspect, in a possible implementation, the reporting NR capability change information of the terminal device includes: sending a first tracking area update (TAU) request message, where the first TAU request message carries information indicating that the terminal device does not support an NR capability, so as to release the NR link.

With reference to the second aspect, in a possible implementation, before the reporting NR capability change information of the terminal device, the method further includes: disabling a 5G switch.

With reference to the second aspect, in a possible implementation, releasing the NR link includes: sending a first A2 measurement report, where the first A2 measurement report includes a fictional value of reference signal received power (RSRP) of an NR cell on which the terminal device currently camps, and the fictional value of the RSRP of the cell on which the terminal device currently camps is less than a first threshold, so as to release the NR link.

With reference to the second aspect, in a possible implementation, releasing the NR link includes: sending a first secondary cell group (SCG) failure request message, where the first SCG request message is used to request to release the NR link.

With reference to the second aspect, in a possible implementation, before the disabling a 5G switch, the method further includes: displaying a first selection window on a first interface of the terminal device, where the first selection window is used to remind whether to disable 5G; and in the first selection window, detecting a first operation, and disabling 5G in response to the first operation, so as to release the NR link.

With reference to the second aspect, in a possible implementation, the method further includes: determining that the terminal device does not meet the first preset condition, and restoring the NR link; and after the NR link is restored, using the LTE link and the NR link for communication.

According to a third aspect, this application provides an apparatus, where the apparatus is included in a terminal device, and the apparatus has a function of implementing actions of the terminal device in the foregoing aspects and the possible implementations of the foregoing aspects. The function may be implemented by hardware, or may be implemented by hardware by executing corresponding software. The hardware or software includes one or more modules or units corresponding to the foregoing function, for example, a processing module or unit, a communications module or unit.

According to a fourth aspect, this application provides a terminal device, including: a touchscreen, where the touchscreen includes a touch-sensitive surface and a display; a camera; one or more processors; one or more memories; a plurality of application programs; and one or more computer programs. The one or more computer programs are stored in a memory, and the one or more computer programs include an instruction. When the instruction is executed by one or more processors, the terminal device is enabled to perform the method according to any one of the second aspect or the possible implementations of the second aspect.

According to a fifth aspect, this application provides a terminal device, including one or more processors and one or more memories. The one or more memories are coupled to the one or more processors, and the one or more memories are configured to store computer program code. The computer program code includes a computer instruction. When the one or more processors execute the computer instruction, the terminal device is enabled to perform the method according to any one of the second aspect or the possible implementations of the second aspect.

According to a sixth aspect, this application provides a computer storage medium, including a computer instruction. When the computer instruction is run on a terminal device, the terminal device is enabled to perform the method according to any one of the second aspect or the possible implementations of the second aspect.

According to a seventh aspect, this application provides a computer program product. When the computer program product runs on a terminal device, the terminal device is enabled to perform the method according to any one of the second aspect or the possible implementations of the second aspect.

According to an eighth aspect, a chip is provided, including: a processor, configured to invoke and run, from a memory, the method according to any one of the second aspect or the possible implementations of the second aspect that is stored in the memory.

According to a ninth aspect, another chip is provided, including: an input interface, an output interface, a processor, and a memory, where the input interface, the output interface, the processor, and the memory are connected by using an internal connection path, and the processor is configured to perform the method according to any one of the second aspect or the possible implementations of the second aspect that is stored in the memory.

BRIEF DESCRIPTION OF DRAWINGS

FIG. 6A-FIG. 6B are a schematic flowchart of a communication method according to an embodiment of this application;

FIG. 7 is a schematic diagram of a selection window according to an embodiment of this application;

FIG. 11A-FIG. 11I are a schematic diagram of a group of GUIs of a terminal device according to an embodiment of this application;

FIG. 12A-FIG. 12G are a schematic diagram of another group of GUIs of a terminal device according to an embodiment of this application;

FIG. 16 is a schematic flowchart of still another communication method according to an embodiment of this application;

DESCRIPTION OF EMBODIMENTS

The following describes technical solutions in this application with reference to accompanying drawings.

The technologies described in this application may be applied to various communications systems and communications systems integrating various communications systems. For example, the communications system may be a long term evolution (LTE) communications system (or referred to as a 4G communications system), a new radio (NR) system (or referred to as a 5G communications system), a wireless-fidelity (Wi-Fi) system, a 3rd generation partnership project (3GPP) related cellular system, a future evolved communications system, and other similar communications systems.

Figure 1:
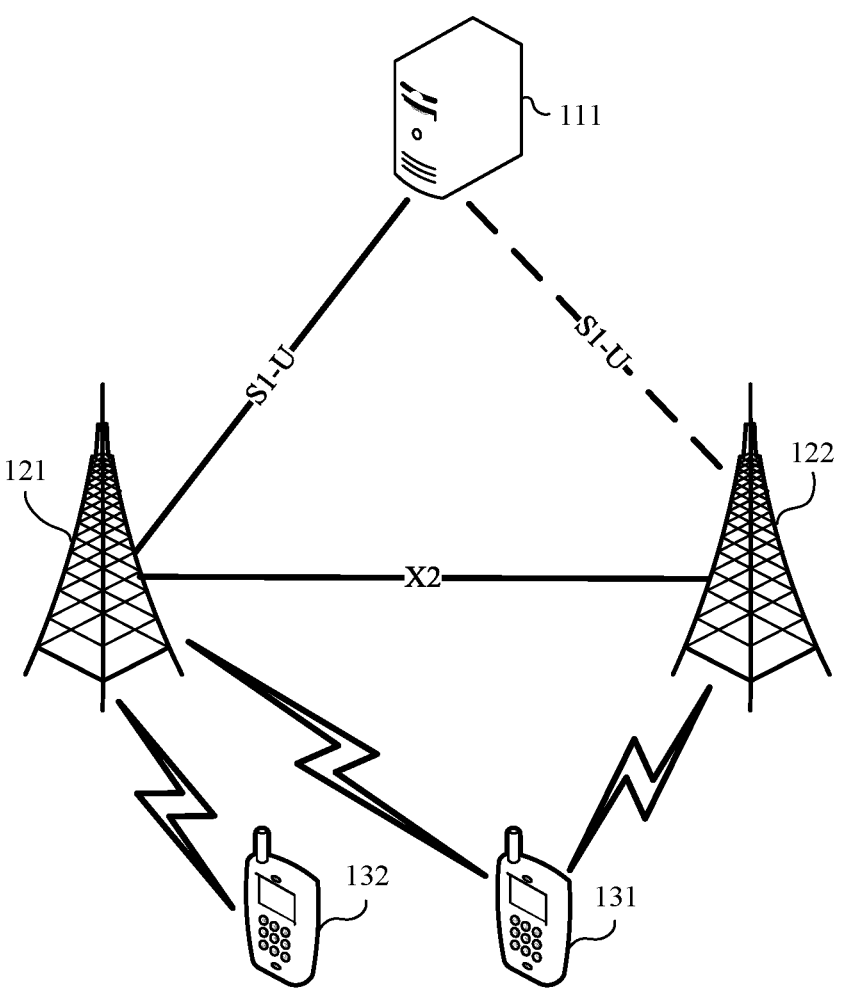
FIG. 1 is a schematic diagram of a possible architecture of a communications system according to this application.

FIG. 1 is a schematic diagram of a possible architecture of a communications system applicable to an embodiment of this application. As shown in FIG. 1, the communications system includes at least an LTE core network device 111, an LTE access network device 121, an NR access network device 122, and a terminal device 131. An architecture of the communications system may be a 5G NSA network architecture. In the 5G NSA network architecture, there is a 4G radio access network and a 5G NR dual connection (EU-TRA-NR Dual Connection, EN-DC) architecture. The LTE access network device 121 is a device that supports an LTE network; the NR access network device 122 is a device that supports an NR network; and the terminal device 131 is a device that supports both the LTE network and the NR network. The LTE access network device 121 may be a master node, which is referred to as a master eNodeB (MeNB) in the EN-DC; and the NR access network device 122 may be a secondary node, which is referred to as a secondary gNodeB (SgNB) in the EN-DC. The LTE access network device 121 and the NR access network device 122 are in communication connection by using the X2 interface. The LTE access network device 121 may be in communication connection with the LTE core network device 111 by using the S1-U interface. The NR access network device 122 may also be in communication connection with the LTE core network device 111 by using the S1-U interface.

Optionally, the communications system may further include a terminal device 132. The terminal device 132 is in communication connection with the LTE access network device 121, and the terminal device 132 is a device that supports only an LTE network. FIG. 1 is merely a schematic diagram. The communications system may further include other network devices, for example, may further include a wireless relay device and a wireless backhaul device, which are not shown in FIG. 1. This embodiment of this application imposes no limitation on a quantity of core network devices, a quantity of access network devices, and a quantity of terminal devices included in the communications system. For example, the terminal device 131 may be further in communication connection with one or more access network devices.

The communication connection between devices in the EN-DC network architecture may be implemented in a wireless or wired manner. The core network device and the access network device may be separate and different physical devices, or functions of the core network device and logical functions of the access network device may be integrated into a same physical device, or some functions of the core network device and some functions of the access network device may be integrated into one physical device.

The access network device in this application may be any device having a wireless transceiver function, including but not limited to an evolved NodeB (NodeB, eNB, or e-NodeB) in LTE, a base station (gNodeB or gNB) or a transmission receiving point/transmission reception point (TRP) in NR, a subsequently evolved base station, an access node in a Wi-Fi system, a wireless relay node, a wireless backhaul node, or the like. The base station may be a macro base station, a micro base station, a picocell base station, a small cell, a relay station, a balloon station, or the like. The base station may include one or more co-site or non-co-site TRPs.

The terminal device in this application is a device having the wireless transceiver function, and may be deployed on land, including indoor or outdoor, handheld, wearable or vehicle-mounted, may be deployed on water (for example, on a ship), or may be deployed in the air (for example, on an airplane, a balloon, or a satellite). The terminal device may be a mobile phone, a Pad, a computer having the wireless transceiver function, a virtual reality (VR) terminal device, an augmented reality (AR) terminal device, a wireless terminal in industrial control, an in-vehicle terminal device, a wireless terminal in self driving, a wireless terminal in remote medical, a wireless terminal in a smart grid, a wireless terminal in transportation safety, a wireless terminal in a smart city, a wireless terminal in a smart home, a wearable terminal device, or the like. This embodiment of this application imposes no limitation on application scenarios. The terminal device may sometimes be referred to as a terminal, a user equipment (UE), an access terminal device, an in-vehicle terminal, an industrial control terminal, a UE unit, a UE station, a mobile station, a mobile console, a remote station, a remote terminal device, a mobile device, a UE terminal device, a terminal device, a wireless communications device, a UE proxy, a UE apparatus, or the like. The terminal device may alternatively be fixed or mobile.

In addition, the terminal device may alternatively be a terminal device in an internet of things (IoT) system. The IoT is an important part of the development of information technologies in the future. A main technical feature of the IoT is that an object is connected to a network by using a communications technology, so as to implement an intelligent network of human-machine interconnection and interconnection of everything. The terminal device in this embodiment of this application may alternatively be a terminal device in machine type communication (MTC). The terminal device in this application may alternatively be an in-vehicle module, an in-vehicle component, an in-vehicle chip, or an in-vehicle unit that is built into a vehicle as one or more components or units, and the vehicle may implement the method in this application by using the built-in in-vehicle module, in-vehicle component, in-vehicle chip, or in-vehicle unit. Therefore, this embodiment of this application may be applied to the internet of vehicles, for example, vehicle to everything (V2X), long term evolution-vehicle (LTE-V), and vehicle-to-vehicle (V2V).

Figure 2:
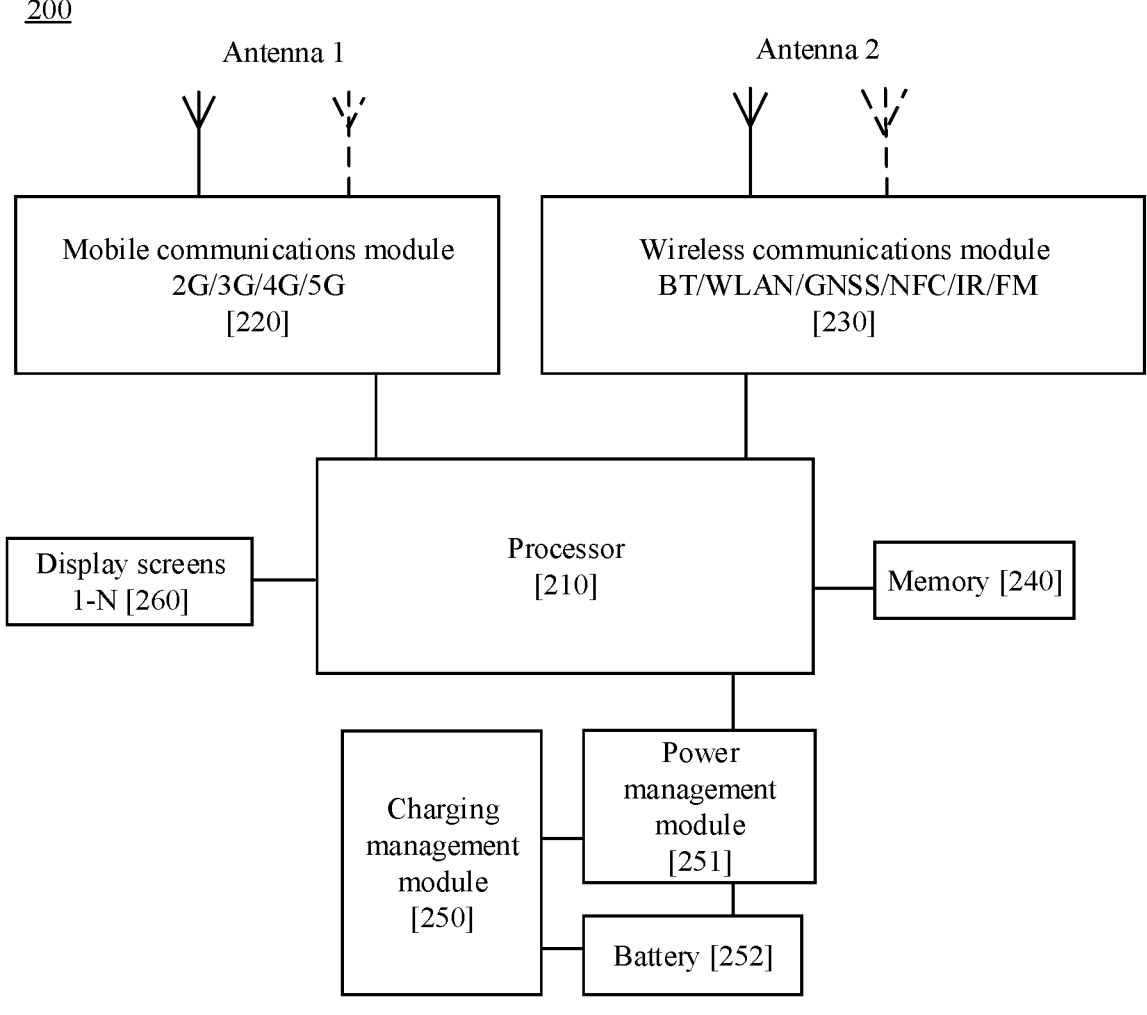
FIG. 2 is a schematic structural diagram of a terminal device according to this application.

FIG. 2 is a schematic structural diagram of a terminal device 200 according to this application. The terminal device 200 may be corresponding to the terminal device 131 or the terminal device 132 shown in FIG. 1. The terminal device 200 may include a processor 210, an antenna 1, an antenna 2, a mobile communications module 220, a wireless communications module 230, a memory 240, a charging management module 250, a power management module 251, a battery 252, and a display 260.

It may be understood that the structure shown in this embodiment of this application does not constitute a specific limitation on the terminal device 200. In some other embodiments of this application, the terminal device 200 may include more or fewer components than those shown in the figure, or some components are combined, or some components are split, or a different component arrangement is used. The components shown may be implemented by hardware, software, or a combination of software and hardware.

The processor 210 may include one or more processing units. For example, the processor 210 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a nerve center and a command center of the terminal device 200. The controller may generate an operation control signal based on an instruction operation code and a time sequence signal, so as to control instruction retrieval and instruction execution.

A memory may be further disposed in the processor 210 to store an instruction and data. In some embodiments, the memory in the processor 210 is a cache memory. The memory may store an instruction or data that is just used or used cyclically by the processor 210. If the processor 210 needs to use the instruction or data again, the instruction or data may be directly invoked from the memory. Repeated access is avoided, and a waiting time of the processor 210 is reduced, thereby improving system efficiency.

In some embodiments, the processor 210 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI) interface, a general-purpose input/output (GPIO) interface, a subscriber identity module (SIM) interface, a universal serial bus (USB) interface, and/or the like.

The antenna 1 and the antenna 2 are configured to transmit and receive electromagnetic wave signals. Each antenna in the terminal device 200 may be configured to cover a single or a plurality of communication bands. Different antennas may be multiplexed to improve antenna utilization. For example, the antenna 1 may be multiplexed into a diversity antenna of a wireless local area network. In some other embodiments, the antenna may be used in combination with a tuning switch.

The terminal device 200 may include a communications module, configured to communicate with an external device. For example, the communications module may include a mobile communications module 220 and a wireless communications module 230.

The mobile communications module 220 may provide a wireless communication solution that is applied to the terminal device 200, including 2G/3G/4G/5G. The mobile communications module 220 may include at least one filter, a switch, a power amplifier, a low noise amplifier (LNA), and the like. The mobile communications module 220 may receive an electromagnetic wave from the antenna 1, perform processing such as filtering and amplification on the received electromagnetic wave, and send the processed electromagnetic wave to the modem processor for demodulation. The mobile communications module 220 may further amplify a signal that is modulated by the modem processor, and convert the signal into an electromagnetic wave and radiate the electromagnetic wave by using the antenna 1. In some embodiments, at least some of the functional modules of the mobile communications module 220 may be disposed in the processor 210. In some embodiments, at least some of the functional modules of the mobile communications module 220 and at least some of the modules of the processor 210 may be disposed in a same device.

The wireless communications module 230 may provide a wireless communication solution that is applied to the terminal device 200, including wireless local area network (WLAN) (such as a wireless fidelity (Wi-Fi) network), Bluetooth (BT), global navigation satellite system (GNSS), frequency modulation (FM), near field communication (NFC), infrared (IR), and the like. The wireless communications module 230 may be one or more devices that integrate at least one communication processing module. The wireless communications module 230 receives an electromagnetic wave by using the antenna 2, modulates and filters the electromagnetic wave signal, and sends the processed signal to the processor 210. The wireless communications module 230 may further receive a to-be-sent signal from the processor 210, perform frequency modulation and amplification on the signal, and convert the signal into an electromagnetic wave and radiate the electromagnetic wave by using the antenna 2.

In some embodiments, the antenna 1 of the terminal device 200 is coupled to the mobile communications module 220, and the antenna 2 is coupled to the wireless communications module 230, so that the terminal device 200 may communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, GNSS, WLAN, NFC, FM, an IR technology, and the like. The GNSS may include a global positioning system (GPS), a global navigation satellite system (GLONASS), a Beidou navigation satellite system (BDS), a quasi-zenith satellite system (QZSS), and/or a satellite based augmentation system (SBAS).

The memory 221 may be configured to store computer executable program code, where the executable program code includes an instruction. The processor 210 executes various functional applications and data processing of the terminal device 200 by running an instruction stored in the memory 221. The memory 221 may include a program storage area and a data storage area. The program storage area may store an operating system, an application program required by at least one function (for example, a sound play function or an image play function), or the like. The data storage area may store data (such as audio data or a phone book) created during use of the terminal device 200. In addition, the memory 221 may include a high-speed random access memory, and may further include a non-volatile memory, such as at least one magnetic disk storage device, a flash memory device, or a universal flash storage (UFS).

The charging management module 250 is configured to receive a charging input from a charger. The charger may be a wireless charger, or may be a wired charger. In some wired charging embodiments, the charging management module 250 may receive a charging input of the wired charger by using a USB interface. In some wireless charging embodiments, the charging management module 250 may receive a wireless charging input by using a wireless charging coil of the terminal device 200. In addition to charging the battery 252, the charging management module 250 may further supply power to the terminal device by using the power management module 251.

The power management module 251 is configured to connect the battery 252, the charging management module 250, and the processor 210. The power management module 251 receives an input of the battery 252 and/or the charging management module 250, and supplies power to the processor 210, the memory 221, the display 260, the mobile communications module 220, the wireless communications module 230, and the like. The power management module 251 may be further configured to monitor parameters such as a battery capacity, a quantity of battery cycles, and a battery health state (leakage or impedance). In some other embodiments, the power management module 251 may alternatively be disposed in the processor 210. In some other embodiments, the power management module 251 and the charging management module 250 may alternatively be disposed in a same device.

The terminal device 200 implements a display function by using a GPU, the display 260, the application processor, and the like. The GPU is a microprocessor for image processing, and is connected to the display 260 and the application processor. The GPU is configured to perform mathematical and geometric calculations to render graphics. The processor 210 may include one or more GPUs that execute a program instruction to generate or change display information.

The display 260 is configured to display an image, a video, and the like. The display 260 includes a display panel. The display panel may be a liquid crystal display (LCD), an organic light emitting diode (OLED), an active matrix organic light emitting diode (AMOLED), a flex light emitting diode (FLED), a Miniled, a MicroLed, a Micro-oLed, quantum dot light emitting diodes (QLED), or the like. In some embodiments, the terminal device 200 may include one or N displays 260, where N is a positive integer greater than 1.

Figure 3:
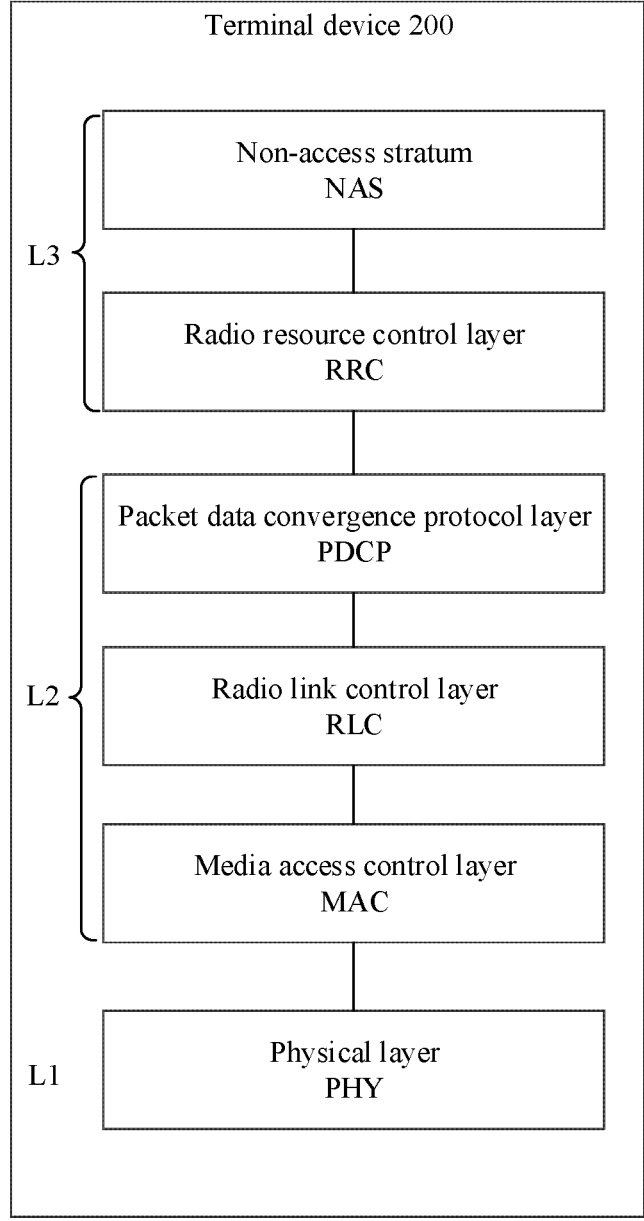
FIG. 3 is a schematic diagram of hierarchical communication of an interface protocol of a terminal device according to this application.

FIG. 3 is a schematic diagram of hierarchical communication of an interface protocol of a terminal device 200 according to this application. As shown in FIG. 3, the terminal device 200 may be corresponding to the terminal device 131 or the terminal device 132 shown in FIG. 1. The terminal device 200 may include an L1 physical layer (PHY), an L2 data link layer, and an L3 network layer.

The L1 physical layer (PHY) is located at the lowest layer, and is mainly responsible for performing modulation and demodulation, antenna mapping, or other telecom physical layer functions.

The L2 data link layer includes a packet data convergence protocol (PDCP) layer, a radio link control (RLC) layer, and a medium access control (MAC) layer. The PDCP layer is mainly responsible for performing packet header compression, so as to reduce bit traffic transmitted by a radio interface. The RLC layer is mainly responsible for processing such as segmentation and connection, and sequence control of higher layer data. The MAC layer is mainly responsible for hybrid automatic repeat request (HARQ) retransmission, uplink and downlink scheduling, and the like.

The L3 network layer includes a non-access stratum (NAS) layer and a radio resource control (RRC) layer. The NAS may be used to transmit user information or control information, such as information used for establishing or releasing a 4G/5G communication link or service and mobility management information. A protocol layer below the NAS layer may also be referred to as an access stratum (AS). The RRC layer supports signaling protocols for a plurality of functions between the terminal device and the access network device, broadcasts system messages of the NAS layer and the AS layer, establishes, maintains, and releases an RRC connection, establishes, modifies, and releases an end-to-end wireless connection, and performs mobility management functions such as measurement reporting, cell handover, and cell reselection of the terminal device. In actual application, the terminal device may communicate with the network side by using the L3 network layer, so as to implement operations such as establishment and releasing of the 4G and 5G access networks. Details are described below in this application.

In a network architecture of the EN-DC, a cell group configured for a terminal device is divided into two groups: one group includes cells covered by an MeNB, and the other group includes cells covered by an SgNB. The group including the cells covered by the MeNB is referred to as a master cell group (MCG), and the group including the cells covered by the SgNB is referred to as a secondary cell group (SCG). For example, as shown in FIG. 1, a group including cells covered by the LTE access network device 121 is referred to as an MCG, and a group including cells covered by the NR access network device 122 is referred to as an SCG.

In one cell group, radio link control (RLC) configuration and logical channel configuration of a radio bearer are referred to as an RLC bearer. Among RLC bearers, a radio bear that is configured only on the MCG is referred to as an MCG bearer. Among the RLC bearers, a radio bear that is configured only on the SCG is referred to as an SCG bearer. Among the RLC bears, a radio bear that is configured on both the MCG and the SCG is referred to as a split bearer. A radio bearer of a packet data convergence protocol (PDCP) in the MeNB is referred to as a bearer terminated by a master node (MN). A radio bearer of the PDCP in the SgNB is referred to as a radio bearer of a secondary node (SN).

Figure 4:
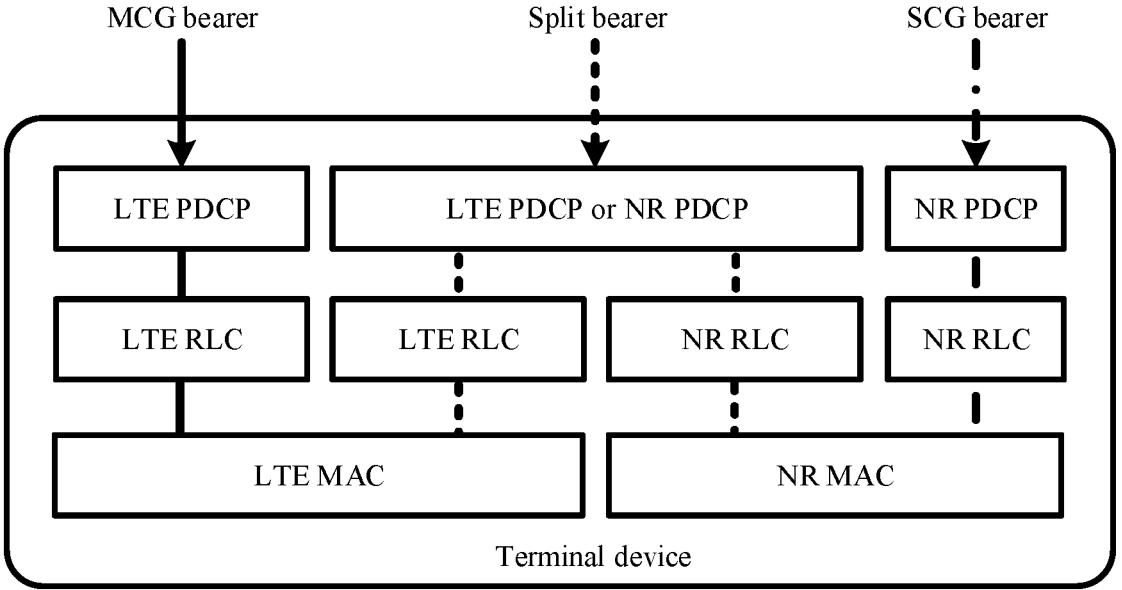
FIG. 4 is a schematic diagram of a bearer perceived by a terminal device according to this application.

FIG. 4 shows bearers that can be perceived by a terminal device in a network architecture of the EN-DC, where a terminal device may be corresponding to the terminal device 131 shown in FIG. 1. The bearers include an MCG bearer, an SCG bearer, and a split bearer. The MCG bearer means that data is transmitted from a core network device to the MeNB, and is directly forwarded by the MeNB to the terminal device. The SCG bearer means that data is transmitted from the core network device to the SeNB, and is directly forwarded by the SeNB to the terminal device. The split bearer means that data is split on the base station side, and may be forwarded by the MeNB or the SeNB to the terminal device, or the data is transmitted by both the MeNB and the SeNB to the terminal device based on a preset split ratio, so as to provide a service. When the terminal device perceives that the data bearer is an MCG bearer, a communication link (which may also be referred to as an MCG link) used for data communication is: LTE PDCP-LTE RLC-LTE MAC. When the terminal device perceives that the data bearer is an SCG bearer, a communication link (which may also be referred to as an SCG link) used for data communication is: NR PDCP-NR RLC-NR MAC. When the terminal device perceives that the data bearer is a split bearer, a communication link (which may also be referred to as a split link) used for data communication is: LTE PDCP-LTE RLC-LTE MAC or NR PDCP-NR RLC-NR MAC. Because the SCG link uses only a network resource of the 5G NR, the SCG link may also be referred to as an NR link. Because the MCG link uses a network resource of the 4G LTE, the MCG link may also be referred to as an LTE link.

Figure 5:
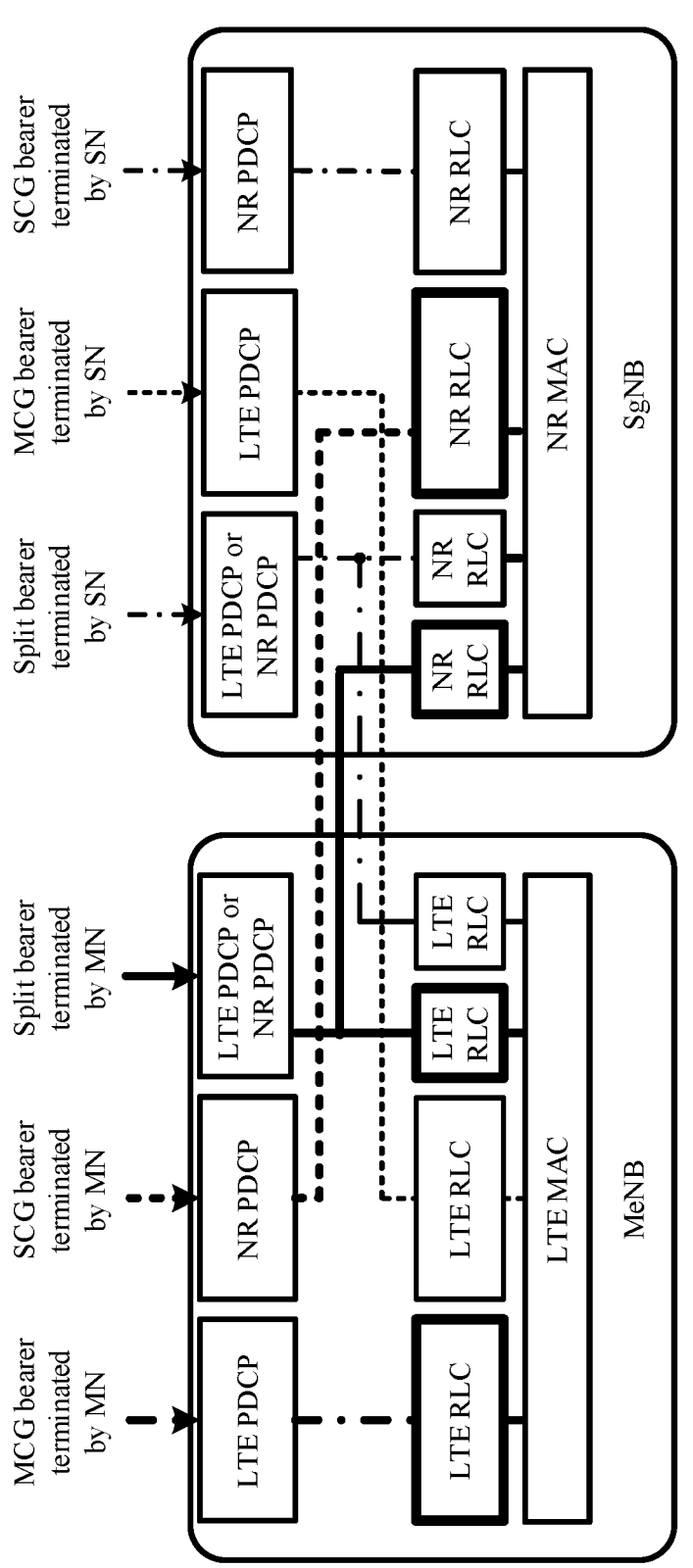
FIG. 5 is a schematic diagram of a bearer perceived by a base station according to this application.

FIG. 5 shows bearers that can be perceived by a network side in a network architecture of the EN-DC, where an MeNB may be corresponding to the access network device 131 shown in FIG. 1, and an SgNB may be corresponding to the access network device 132 shown in FIG. 1. The bearers include an MCG bearer terminated by the MN, an SCG bearer terminated by the MN, a split bearer terminated by the MN, an MCG bearer terminated by the SN, an SCG bearer terminated by the SN, and a split bearer terminated by the SN. The bearer terminated by the MN refers to a radio bearer whose PDCP layer is in the MeNB other than the SeNB. On the contrary, the bearer terminated by the SN refers to a radio bearer whose PDCP layer is in the SeNB rather than the MeNB. When the data bearer perceived by the network side is an MCG bearer terminated by the MN, a communication link during data communication is LTE PDCP-LTE RLC-LTE MAC. When the data bearer perceived by the network side is a split bearer terminated by the MN, a communication link during data communication is LTE PDCP-LTE RLC-LTE MAC or LTE PDCP-NR RLC-NR MAC. A specific selection may be performed based on an actual requirement, and is not limited. For communication links corresponding to various data bearers that are perceived by the network side, details are shown in the figure. Details are not described herein again.

For ease of understanding, in this application, a terminal device having a structure shown in FIG. 2 is used as an example, and a communication method provided in this embodiment of this application is described in detail with reference to the accompanying drawings and an application scenario.

For example, in the communications system shown in FIG. 1, to improve a data transmission rate, the terminal device 131 may perform data transmission with the LTE core network device 111 by using the LTE access network device 121 and the NR access network device 122. Compared with a manner in which the terminal device 132 performs data transmission with the LTE core network device 111 by using only the LTE access network device 121, power consumption of the terminal device 131 is higher.

Based on this, an embodiment of this application provides a communication method. In a communications system in which the terminal device 131 is in communication connection with both the LTE access network device 121 and the NR access network device 122, the terminal device 131 determines whether to release an NR link based on whether the terminal device 131 is in a power saving mode, and/or whether the power consumption of the terminal device 131 is less than a first preset value, and/or whether temperature of a rear cover of the terminal device 131 is greater than or equal to a second preset value. After the NR link is released, the power consumption of the terminal device 131 is reduced, thereby improving user experience.

To facilitate understanding of this embodiment of this application, the following descriptions are provided before this embodiment of this application is described.

First, in this embodiment of this application, an "indication" may include a direct indication and an indirect indication, or may include an explicit indication and an implicit indication.

Second, in the embodiment shown in the following, "the first", "the second", and various numerical numbers are merely described for convenient differentiation, and are not used to limit the scope of the embodiments of this application. For example, the numerical numbers are used to distinguish between different indication information.

Third, "LTE" in this embodiment of this application may refer to 4G. For example, an "LTE network" may refer to a "4G network". For another example, an "LTE link" may refer to a "4G link". For another example, an "LTE access network device" may refer to a "4G access network device".

Fourth, "NR" in this embodiment of this application may refer to 5G. For example, an "NR network" may refer to a "5G network"; for another example, an "NR link" may refer to a "5G link"; for another example, an "NR access network device" may refer to a "5G access network device".

Fifth, an "NR link" in this embodiment of this application refers to a link between the terminal device and the NR access network device, a link between the NR access network device and the LTE core network device, a link between the terminal device and the LTE access network device, or a link between the LTE access network device and the LTE core network device.

Sixth, an "LTE link" in this embodiment of this application refers to a link between the terminal device and the LTE access network device, or a link between the LTE access network device and the LTE core network device.

The following describes the communication methods provided in the embodiments of this application with reference to the accompanying drawings.

Figure 6A:
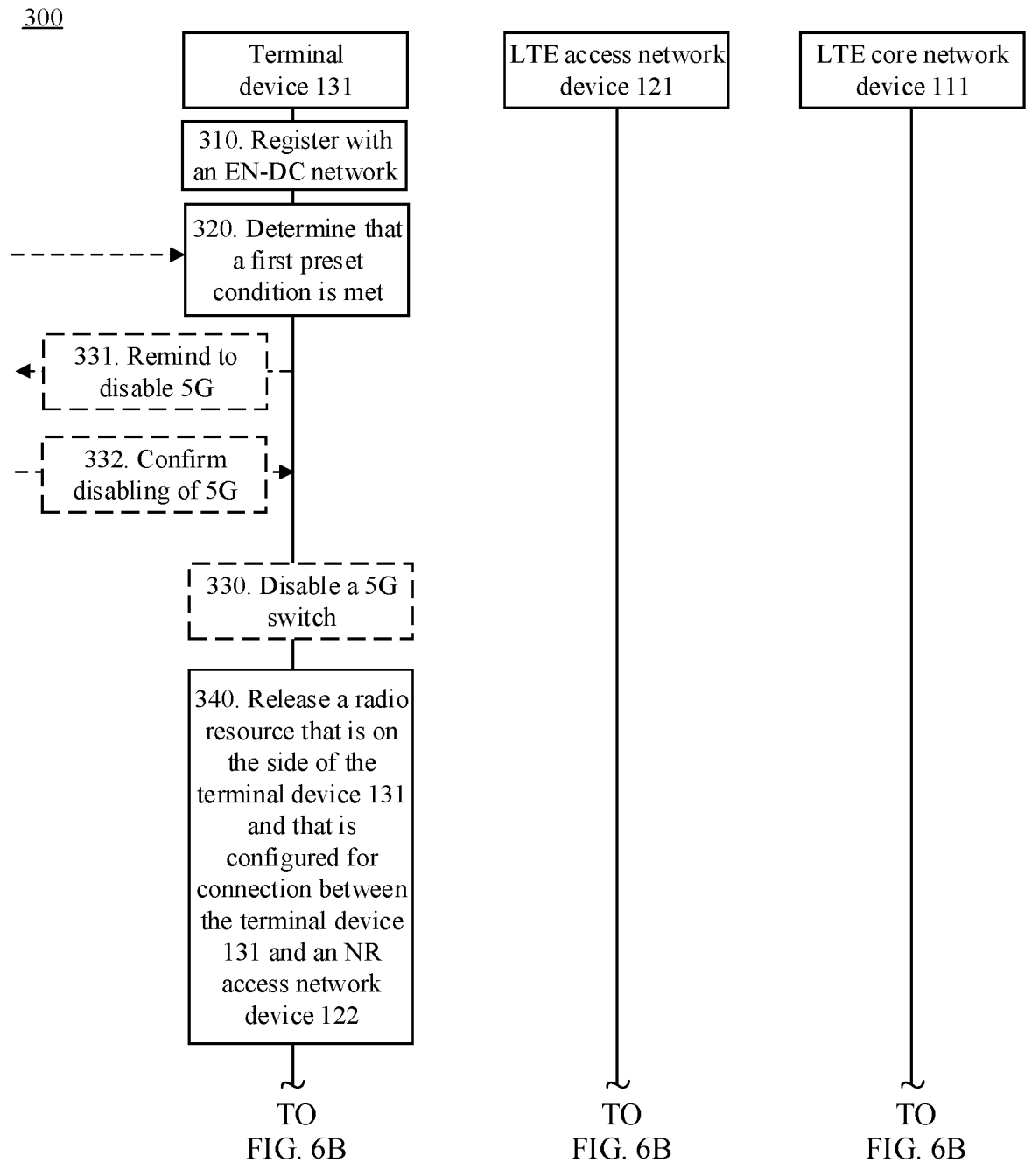
Figure 10:
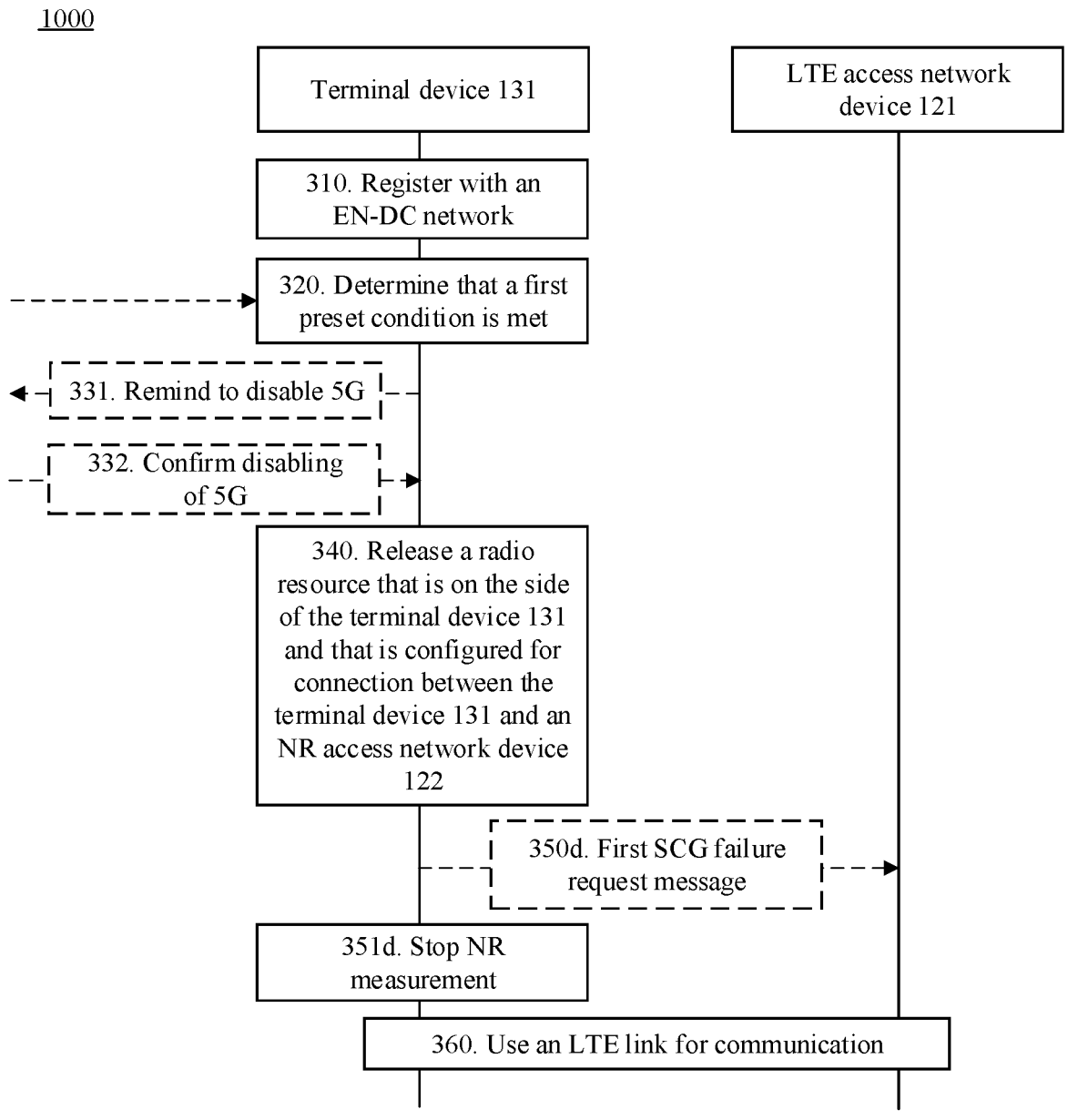
FIG. 10 is a schematic flowchart of still another communication method according to an embodiment of this application.

FIG. 6A-FIG. 6B to FIG. 10 describe in detail the following process: In a communications system in which the terminal device 131 is in communication connection with both the LTE access network device 121 and the NR access network device 122, the terminal device 131 releases an NR link when the terminal device 131 is in a power saving mode, and/or when the power consumption of the terminal device 131 is less than a first preset value, and/or when temperature of a rear cover of the terminal device 131 is greater than or equal to a second preset value.

FIG. 6A-FIG. 6B are a schematic flowchart of a communication method 300 according to an embodiment of this application.

Step 310: The terminal device 131 registers with an EN-DC network.

That the terminal device 131 registers with the EN-DC network may be understood as establishment of an LTE link between the terminal device 131 and the LTE access network device 121, and establishment of an NR link between the terminal device 131 and the NR access network device 122. The terminal device 131 may directly complete establishment of the LTE link and the NR link after power-on; or the terminal device 131 may complete establishment of the LTE link after power-on, and then complete establishment of the NR link. The terminal device 131 may complete establishment of the LTE link and the NR link at any time after power-on, and this is not limited in this application.

After the terminal device 131 registers with the EN-DC network, the terminal device 131 camps on the EN-DC network, where the EN-DC network includes an LTE link and an NR link. The terminal device 131 may detect an operation of a user, and then transmit related data of a service required by the user, so as to implement a service request of the user.

In the EN-DC network, the terminal device 131 implements signaling transmission by using the LTE link, and the terminal device 131 implements data transmission by using the NR link. For example, that the terminal device 131 registers with the EN-DC network may include step a to step f.

Step a: The terminal device 131 sends an attach request message to the LTE access network device 121 by using the NAS layer of the terminal device 131, where the attach request message carries an identifier and an NR capability of the terminal device 131, and the attach request message is used to request to perform an attach operation based on the identifier of the terminal device 131.

Step b: The LTE access network device 121 sends the attach request message received in step a to the LTE core network device 111; and the LTE core network device 111 performs the attach operation on the terminal device 131 based on the attach request message, and sends an attach accept message to the LTE access network device 121 after the attach operation is completed, where the attach accept message is used to indicate that the attach operation on the terminal device 131 has been completed. Alternatively, the LTE core network device 111 may not perform an attach operation on the terminal device 131 based on the attach request message, and send an attach reject message to the LTE access network device 121, where the attach reject message is used to indicate that no attach operation is performed on the terminal device 131.

Step c: The LTE access network device 121 sends the attach accept message or attach reject message to the RRC layer of the terminal device 131.

After the terminal device 131 receives an attach accept message, that is, after the terminal device 131 registers with the EN-DC network, the terminal device 131 may perform signaling transmission by using the LTE link, that is, the terminal device may perform signaling transmission with the LTE access network device 121; and the terminal device 131 may perform data transmission by using the NR link, that is, the terminal device 131 may perform data transmission with the NR access network device 122.

After the terminal device 131 registers with the EN-DC network, when the 5G switch of the terminal device 131 is in an enabled state, a mobile network identifier "5G" may be displayed on the display interface of the terminal device 131, and the 5G switch presented in a drop-down status bar of the display interface of the terminal device 131 may also be in the enabled state.

Step 320: The terminal device 131 determines that the terminal device 131 meets a first preset condition.

The first preset condition includes at least one of the following: The power saving mode of the terminal device 131 is enabled; battery power of the terminal device 131 is less than or equal to a first preset value; or temperature of a rear cover of the terminal device 131 is greater than or equal to a second preset value.

That the terminal device 131 is in the power saving mode may be understood as that a switch of the power saving mode of the terminal device 131 is in an enabled state. That the power saving mode of the terminal device 131 is in an enabled state may be that the user turns on the switch of the power saving mode of the terminal device 131; or that the power saving mode of the terminal device 131 is in the enabled state may be that the terminal device 131 turns on the switch of the power saving mode of the terminal device 131.

Optionally, the power saving mode may further include a super power saving mode. That the terminal device 131 detects that the terminal device 131 is in the power saving mode may also be understood as that the switch of the power saving mode of the terminal device 131 is in the enabled state and/or the switch of the super power saving mode of the terminal device 131 is in the enabled state; that is, the terminal device 131 considers that the terminal device 131 is in the power saving mode provided that the terminal device 131 detects that at least one of the switch of the power saving mode of the terminal device 131 and the switch of the super power saving mode is in the enabled state.

A sensor is disposed on the rear cover of the terminal device 131, and the sensor on the terminal device 131 may detect the temperature of the rear cover of the terminal device 131.

For example, the terminal device 131 may determine that the first preset condition is met in the following seven cases:

(1) The terminal device 131 detects that the terminal device 131 is in the power saving mode.

(2) The terminal device 131 detects that the battery power of the terminal device 131 is less than or equal to the first preset value.

(3) The sensor on the rear cover of the terminal device 131 detects that the temperature of the rear cover of the terminal is greater than or equal to the second preset value.

(4) The terminal device 131 detects that the terminal device 131 is in the power saving mode, and the terminal device 131 detects that the battery power of the terminal device 131 is less than or equal to the first preset value.

(5) The terminal device 131 detects that the terminal device 131 is in the power saving mode, and the sensor on the rear cover of the terminal device 131 detects that the temperature of the rear cover of the terminal is greater than or equal to the second preset value.

(6) The terminal device 131 detects that the battery power of the terminal device 131 is less than or equal to the first preset value, and the sensor on the rear cover of the terminal device 131 detects that the temperature of the rear cover of the terminal is greater than or equal to the second preset value.

(7) The terminal device 131 detects that the terminal device 131 is in the power saving mode, the terminal device 131 detects that the battery power of the terminal device 131 is less than or equal to the first preset value, and the sensor on the rear cover of the terminal device 131 detects that the temperature of the rear cover of the terminal is greater than or equal to the second preset value.

The terminal device 131 determines that the terminal device 131 meets the first preset condition provided that the terminal device 131 detects that the terminal device 131 meets one of the foregoing seven cases. Optionally, in step 330, the terminal device 131 turns off the 5G switch.

That the terminal device 131 turns off the 5G switch may be understood as that the 5G switch on a "Settings" interface of the terminal device 131 is in the disabled state. If the 5G switch is added to the shortcut, in this case, the "5G" shortcut switch presented in the drop-down status bar of the display interface of the terminal device 131 is also in the disabled state. In a possible design, when the terminal device disables the 5G function or the 5G capability, a signal bar of the terminal device may display a network disconnection identifier, for example, "x", and may further display that the terminal device camps on a non-5G network, for example, 2, 3, and 4.

Optionally, that the terminal device 131 turns off the 5G switch may be that the terminal device 131 actively turns off the 5G switch and that the terminal device 131 passively turns off the 5G switch. That the terminal device 131 actively turns off the 5G switch may be understood as that the terminal device 131 turns off the 5G switch. That the terminal device 131 passively turns off the 5G switch may be understood as that the terminal device 131 turns off the 5G switch only after detecting a user operation of disabling 5G.

Optionally, the terminal device may perform step 330, or the terminal device may not perform step 330.

When the terminal device 131 passively turns off the 5G switch, the foregoing method further includes step 331 and step 332.

Step 331: The terminal device 131 displays a first selection window on the display interface of the terminal device 131, where the first selection window displays first content, and the first content is used to remind whether to disable 5G.

The first selection window includes a function button such as an "Enable" button or an "OK" button and a function button such as a "Cancel" button or a "Disable" button. For example, the first selection window may be shown in FIG. 7 part (a), FIG. 7 part (b), and FIG. 7 part (c). As shown in FIG. 7 part (a), the terminal device 131 may detect that the terminal device 131 is in the power saving mode; and the terminal device 131 displays the first selection window, and the first selection window includes the "Enable" button and the "Cancel" button. As shown in FIG. 7 part (b), the terminal device 131 may detect that the terminal device 131 is in the super power saving mode; and the terminal device 131 displays the first selection window, where the first selection window includes the "Enable" button and the "Cancel" button. As shown in FIG. 7 part (c), the terminal device 131 may detect that the battery power of the terminal device 131 is 20%; and the terminal device 131 displays the first selection window, where the first selection window includes the "OK" button and the "Disable" button.

Optionally, when the terminal device 131 detects that the battery power of the terminal device 131 is less than or equal to the first preset value, before the terminal device 131 displays the first selection window (as shown in FIG. 7 part (a) or FIG. 7 part (b)) on the display interface of the terminal device 131, the terminal device 131 may further display a second selection window on the display interface of the terminal device 131, where the second selection window displays second content, and the second content is used to remind whether to enable the power saving mode; or the second selection window displays second content, and the second content is used to remind whether to enable super power saving. For example, as shown in FIG. 7 part (d), the terminal device 131 may detect that the power of the terminal device 131 is 20%. Before the terminal device 131 displays the first selection window (the first selection window is the first selection window displayed by the terminal device 131 in the power saving mode, for example, as shown in FIG. 7 part (a)), the terminal device 131 displays the second selection window, the second content displayed in the second selection window is used to remind whether to enable the power saving mode, and the second selection window includes the "Cancel" button and the "Enable" button. For another example, as shown in FIG. 7 part (e), the terminal device 131 may detect that the power of the terminal device 131 is 20%. Before the terminal device 131 displays the first selection window (the first selection window is the first selection window displayed by the terminal device 131 in the super power saving mode, for example, as shown in FIG. 7 part (b)), the terminal device 131 displays the second selection window, the second content displayed in the second selection window is used to remind whether to enable super power saving, and the second selection window includes the "Cancel" button and the "Enable" button.

Step 332: If the terminal device 131 detects that the user taps the "Enable" button or the "OK" button in the first selection window, the terminal device 131 disables 5G.

After 5G is disabled, the terminal device may release an NR link. Releasing the NR link includes turning off the 5G switch (step 330), releasing a radio resource that is occupied on the 5G access network device side and that is configured for connection between the terminal device and the 5G access network device, and releasing a radio resource that is occupied on the terminal device side and that is configured for connection between the terminal device (step 340) and the 5G access network device (step 350a to step 359a).

When the terminal device 131 actively turns off the 5G switch, the terminal device 131 does not perform the foregoing step 331 to step 332, and the terminal device 131 directly turns off the 5G switch; that is, when the terminal device meets the first preset condition, the terminal device directly disables the 5G function without the user's confirmation operation and interaction.

Specifically, step 310 to step 330 may be performed by the AP of the terminal device 131.

Step 340: The terminal device 131 releases a radio resource that is occupied on the terminal device side and that is configured for connection between the terminal device 131 and the NR access network device 122.

That the terminal device 131 releases a radio resource that is occupied on the terminal device side and that is configured for connection between the terminal device 131 and the NR access network device 122 may be understood as that the terminal device 131 releases the NR link.

Specifically, first, the AP of the terminal device 131 sends an AT command to the NAS layer of the terminal device 131, where the AT command instructs to release the NR link; second, the NAS of the terminal device 131 indicates the RRC layer of the terminal device 131 to release the NR link; and finally, the RRC layer of the terminal device 131 releases the radio resource that is occupied on the terminal device side and that is configured for connection between the terminal device 131 and the NR access network device 122.

Optionally, the terminal device 131 may further indicate the LTE access network device 121 to release the NR link, so as to release a radio resource that is occupied on the NR access network device 122 side and that is configured for the connection between the terminal device 131 and the NR access network device 122. That is, the method 300 further includes step 350a to step 359a.

Step 350a: The terminal device 131 sends a first detach request message to the LTE access network device 121. The first detach message includes the identifier of the terminal device 131, and the first detach request message is used to request to perform a detach operation based on the identifier of the terminal device 131, so as to release the NR link. Correspondingly, the LTE access network device 121 receives the first detach request message sent by the terminal device 131.

Specifically, the NAS layer of the terminal device 131 sends the first detach request message to the LTE access network device 121. Correspondingly, the LTE access network device 121 receives the first detach request message sent by the NAS layer of the terminal device 131.

Currently, the terminal device 131 and an LTE access network device 121 may be in communication connection with each other, and the terminal device 131 and the NR access network device 122 may also be in communication connection with each other. Therefore, the first detach operation may be understood as releasing the radio resource that is occupied on the NR access network device side and that is configured for the connection between the terminal device and the NR access network device 122. That is, a bearer established between the LTE access network device 121 and the terminal device 131 and a bearer established between the NR access network device 122 and the terminal device 131 are released. The bearer may be an MCG bearer terminated by the LTE access network device 121, an SCG bearer terminated by the LTE access network device 121, a split bearer terminated by the LTE access network device 121, an MCG bearer terminated by the NR access network device 122, an SCG bearer terminated by the NR access network device 122, and a split bearer terminated by the NR access network device 122.

Step 351*a*: The LTE access network device 121 sends the first detach request message to the core network device 111. Correspondingly, the core network device 111 receives the first detach request message sent by the LTE access network device 121.

Step 352*a*: The core network device 111 performs a detach operation on the terminal device 131 based on the first detach message.

Step 353*a*: The LTE access network device 121 receives a first detach accept message sent by the core network device 111, where the first detach accept message is used to indicate that the first detach request for the terminal device 131 has been completed. Correspondingly, the core network device 111 sends a first detach accept message to the LTE access network device 121.

Step 354*a*: The NAS layer of the terminal device 131 receives the first detach accept message sent by the LTE access network device 121; and correspondingly, the LTE access network device 121 sends the first detach accept message to the NAS layer of the terminal device 131.

Step 355*a*: The terminal device 131 sends the first attach request message to the LTE access network device 121, where the first attach request message does not carry NR capability information, the first attach request message includes the identifier of the terminal device 131, and the first attach request message is used to request to perform the attach operation based on the identifier of the terminal device 131. Correspondingly, the LTE access network device 121 receives the first attach request message sent by the terminal device 131.

Specifically, the NAS layer of the terminal device 131 sends the first attach request message to the LTE access network device 121. Correspondingly, the LTE access network device 121 receives the first attach request message sent by the NAS layer of the terminal device 131.

For example, if the first attach request message carries the NR capability information, a field in the first attach request message indicates that the terminal device supports the NR capability, for example, the field may be "dCNR: dual-connectivity-with-nr-supported". In this case, the first attach request message does not carry the NR capability information, that is, no field in the first attach request message indicates that the terminal device 131 supports the NR capability. Therefore, the first attach operation may be understood as establishing a bearer between the LTE access network device 121 and the terminal device 131, and skipping establishing a bearer between the NR access network device 122 and the terminal device 131.

Step 356*a*: The LTE access network device 121 sends the first attach request message to the core network device 111. Correspondingly, the core network device 111 receives the first attach request message sent by the LTE access network device 121.

Step 357*a*: The core network device 111 performs the attach operation on the terminal device 131 based on the first attach message.

Step 358*a*: The LTE access network device 121 receives a first attach accept message sent by the core network device 111, where the first attach accept message is used to indicate that the first attach request to the terminal device 131 has been completed. Correspondingly, the core network device 111 sends the first attach accept message to the LTE access network device 121.

Step 359*a*: The terminal device 131 receives the first attach accept message sent by the LTE access network device 121, where the first attach accept message is used to indicate that the LTE access network device completes the attach request of the terminal device 131. Correspondingly, the LTE access network device 121 sends the first attach accept message to the terminal device 131.

Specifically, the NAS layer of the terminal device 131 receives the first attach accept message sent by the LTE access network device 121. Correspondingly, the LTE access network device 121 sends the first attach accept message to the NAS layer of the terminal device 131.

The method 300 may further include step 360.

Step 360: After the NR link is released, the terminal device 131 uses the LTE link for communication.

That the terminal device 131 uses the LTE link for communication may be understood as that the terminal device 131 implements signaling and data transmission by using the LTE link.

In the method 600, the terminal device camps on a dual-connectivity network, and the mobile network identifier displayed on the display interface of the terminal device is "5G". In this case, the 5G switch on the "Settings" interface of the terminal device is in an enabled state. If the 5G switch is added to the shortcut, the "5G" shortcut switch presented in the drop-down status bar of the display interface of the terminal device is also in an enabled state. After the terminal device determines that the terminal device meets the first preset condition, the terminal device turns off the 5G switch. In this case, the 5G switch on the "Settings" interface of the terminal device is in the disabled state. If the 5G switch is added to the shortcut, in this case, the "5G" shortcut switch presented in a drop-down status bar of the display interface of the terminal device is also in the disabled state. The terminal device indicates, by using the first attach request message, that the terminal device does not support the NR capability, so as to release the NR link. After the NR link is released, the mobile network identifier displayed on the display interface of the terminal device changes from "5G" to "4G" (in this case, the terminal device 131 successfully camps on 4G, and the mobile network identifier may not be displayed on the display interface of the terminal device 131).

In the network architecture of the EN-DC, the terminal device may turn off the 5G switch and send the first attach request message to the LTE access network device when the terminal device determines that at least one of the following is met: The terminal device is in the power saving mode; the battery power of the terminal device is less than or equal to the first preset value; or the temperature of the rear cover of the terminal device is greater than or equal to the second preset value, where the first attach request message does not carry the NR capability information. The LTE access network device forwards the first attach request message to the core network device, so as to trigger the core network device to release the radio resource that is occupied on the NR access network device side and that is configured for the connection between the terminal device and the NR access network device, so that the NR link on the NR access network device side is released and the NR link-related power consumption of the terminal device is reduced, thereby improving user experience.

Figure 8:
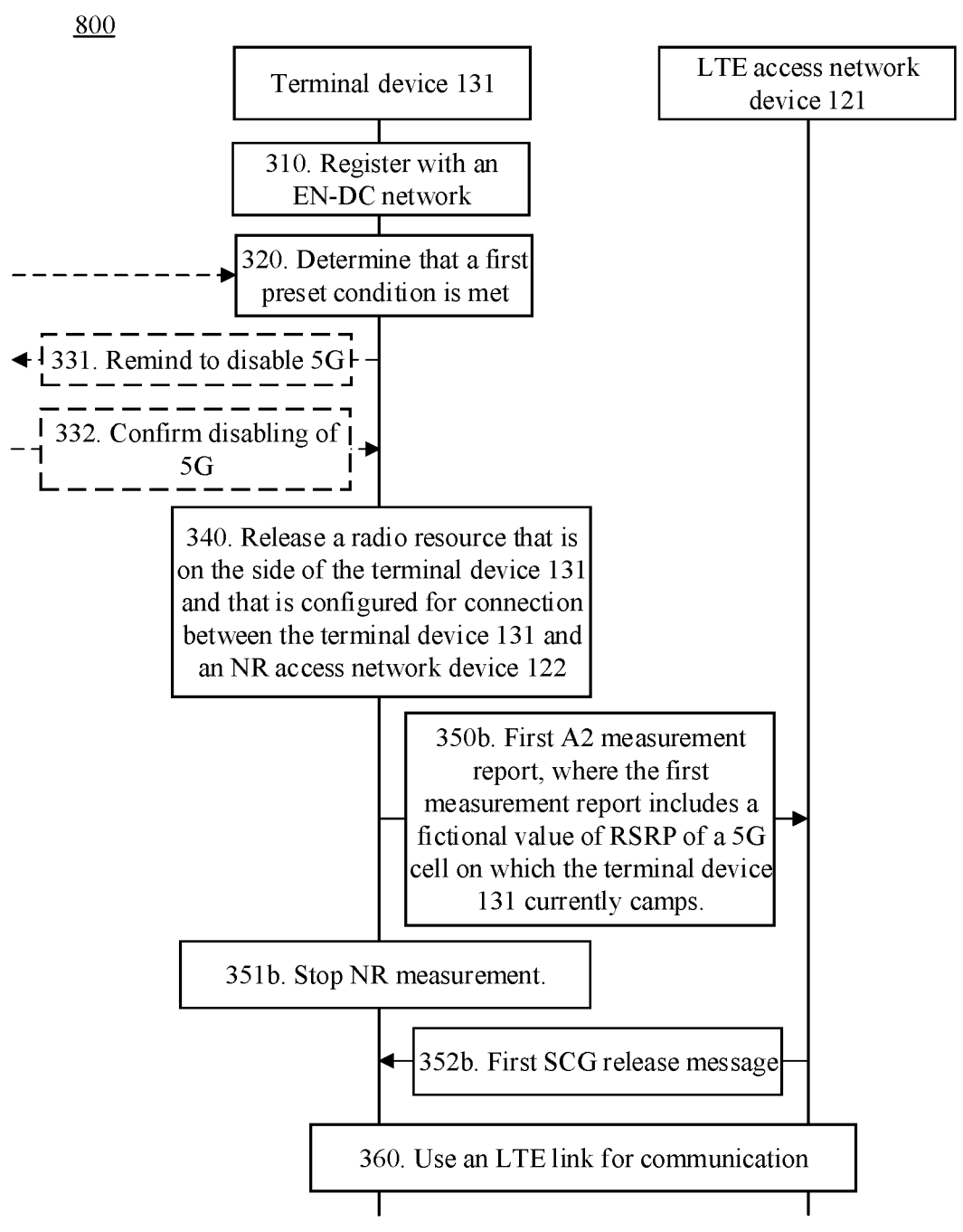
FIG. 8 is a schematic flowchart of another communication method according to an embodiment of this application.

FIG. 8 is a schematic flowchart of another communication method 800 according to an embodiment of this application. With reference to FIG. 8, the following describes in detail the communication method provided in this application. In the method 800, a manner in which the terminal device 131 indicates the LTE access network device 121 to release the NR link is different from the manner in the method 300. That is, the method 800 also includes the foregoing step 310, step 320, step 340, and step 360. Differences from the method 300 are as follows: In the method 800, step 350*b* to step 352*b* are used to replace step 350*a* to step 359*a* in the method 300; and the method 800 does not include the optional step 330 in the method 300, that is, in the method 800, the terminal device 131 does not perform the action of turning off the 5G switch; and after the terminal device 131 performs step 320, the terminal device 131 may directly perform step 340, or the terminal device 131 performs step 331 and step 332 after the terminal device 131 performs step 320, and the terminal device 131 performs step 340 after the terminal device 131 confirms that the terminal device 131 has disabled 5G. For details about step 310, step 320, step 331, step 332, step 340, and step 360, refer to descriptions in the method 300. Details are not described herein again. The following describes step 350*b* to step 352*b* in detail.

Step 350*b*: The terminal device 131 sends a first A2 measurement report to the LTE access network device 121, where the first A2 measurement report includes a fictional value of RSRP of a 5G cell on which the terminal device 131 currently camps, where the fictional value of the RSRP of the 5G cell on which the terminal device 131 currently camps is less than an actual value of the RSRP of the 5G cell on which the terminal device 131 currently camps. Correspondingly, the LTE access network device 121 receives the first A2 measurement report sent by the terminal device 131.

Specifically, the RRC layer of the terminal device 131 sends the first A2 measurement report to the LTE access network device 121. Correspondingly, the LTE access network device 121 receives the first A2 measurement report sent by the RRC layer of the terminal device 131.

The A2 measurement report is specific to an event A2. The event A2 means that signal quality of a serving cell is lower than a specific threshold. The fictional value of the RSRP of the 5G cell on which the terminal device 131 currently camps is less than a first threshold, where the first threshold may be carried in a measurement configuration message delivered by the LTE access network device 121.

For example, if the RSRP of the event A2 trigger threshold is −85 dBm, and the fictional value of the RSRP of the 5G cell on which the terminal device 131 currently camps is −95 dBm, that is, the first A2 measurement report includes that the RSRP of the 5G cell on which the terminal device 131 currently camps is −95 dBm, the terminal device 131 reports the event A2.

Step 351*b*: The terminal device 131 stops NR measurement.

Specifically, the RRC layer of the terminal device 131 stops the NR measurement.

Stopping the NR measurement may be understood as stopping measurement of a cell of the NR access network device 122.

Step 352*b*: The terminal device 131 receives a first SCG release message sent by the LTE access network device 121, where the first SCG release message is used to indicate a radio resource that is occupied on the NR access network device 122 side and that is configured for connection between the terminal device 131 and the NR access network device 122 is released. Correspondingly, the LTE access network device 121 sends the first SCG release message to the NAS layer of the terminal device 131.

Specifically, the NAS layer of the terminal device 131 receives the first SCG release message sent by the LTE access network device 121. Correspondingly, the LTE access network device 121 sends the first SCG release message to the NAS layer of the terminal device 131.

Optionally, the LTE access network device 121 may release, based on the first A2 measurement report, a radio resource that is occupied on the NR access network device 122 side and that is configured for the connection between the terminal device 131 and the NR access network device 122, send the first SCG release message to the terminal device 131, and notify, by using an X2 interface, the NR access network device 122 that the radio resource that is occupied on the NR access network device 122 side and that is configured for the connection between the terminal device 131 and the NR access network device 122 is released. Alternatively, the LTE access network device 121 may indicate, by using an X2 interface, the NR access network device 122 to release the NR link based on the first A2 measurement report obtained in step 351*b*; the NR access network device 122 releases the radio resource that is occupied on the NR access network device 122 side and that is configured for the connection between the terminal device 131 and the NR access network device 122; and the NR access network device 122 notifies, by using the X2 interface, that the radio resource that is occupied on the NR access network device 122 side and that is configured for the connection between the terminal device 131 and the NR access network device 122 is released, so that the LTE access network device 121 sends the first SCG release message to the terminal device 131.

In the method 800, the terminal device camps on a dual-connectivity network, and the mobile network identifier displayed on the display interface of the terminal device is "5G". In this case, the 5G switch on the "Settings" interface of the terminal device is in an enabled state. If the 5G switch is added to the shortcut, the "5G" shortcut switch presented in the drop-down status bar of the display interface of the terminal device is also in an enabled state. After the terminal device determines that the terminal device meets the first preset condition, the terminal device does not turn off the 5G switch. In this case, the 5G switch on the "Settings" interface of the terminal device is in the enabled state. If the 5G switch is added to the shortcut, in this case, the "5G" shortcut switch presented in a drop-down status bar of the display interface of the terminal device is also in the enabled state. The terminal device does not indicate that the terminal device does not support the NR capability, and reports the first A2 measurement report to release the NR link. After the NR link is released, the mobile network identifier displayed on the display interface of the terminal device is still "5G".

In the network architecture of the EN-DC, the terminal device 131 creates a fictional value of the RSRP of the 5G cell on which the terminal device 131 currently camps that is less than a first threshold and sends the A2 measurement report to the LTE access network device 121 when determining that at least one of the following is met: The terminal device 131 is in the power saving mode; the battery power of the terminal device is less than or equal to a first preset value; or the temperature of the rear cover of the terminal device is greater than or equal to a second preset value. The LTE access network device 121 forwards the A2 measurement report to the core network device 111, so as to trigger the core network device 111 to release the radio resource that is occupied on the NR access network device 122 side and that is configured for the connection between the terminal device 131 and the NR access network device 122, so that the NR link on the NR access network device 122 side is released and the NR link-related power consumption of the terminal device is reduced, thereby improving user experience.

Figure 9A:
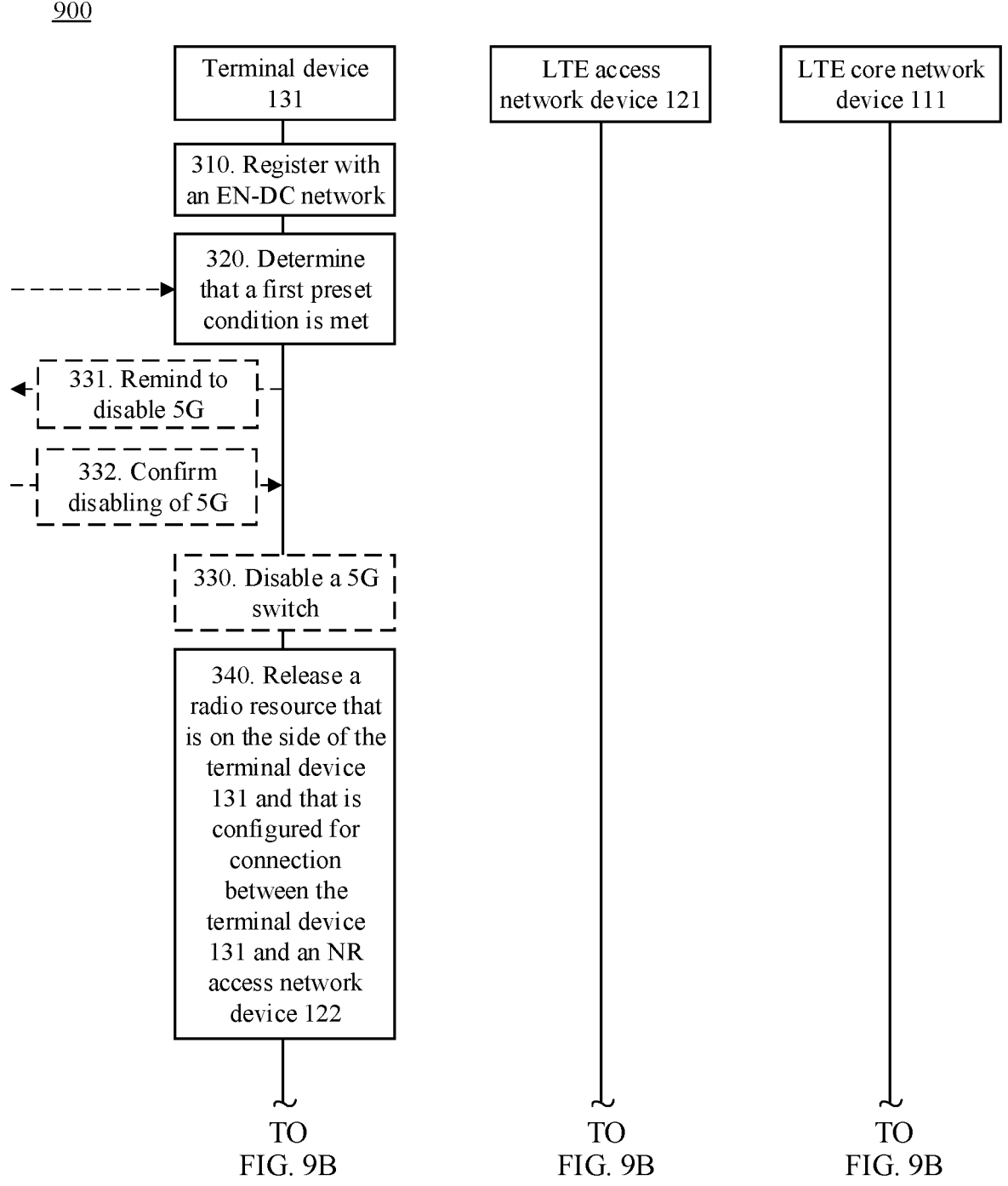
FIG. 9A-FIG. 9B are a schematic flowchart of still another communication method according to an embodiment of this application.
Figure 9B:
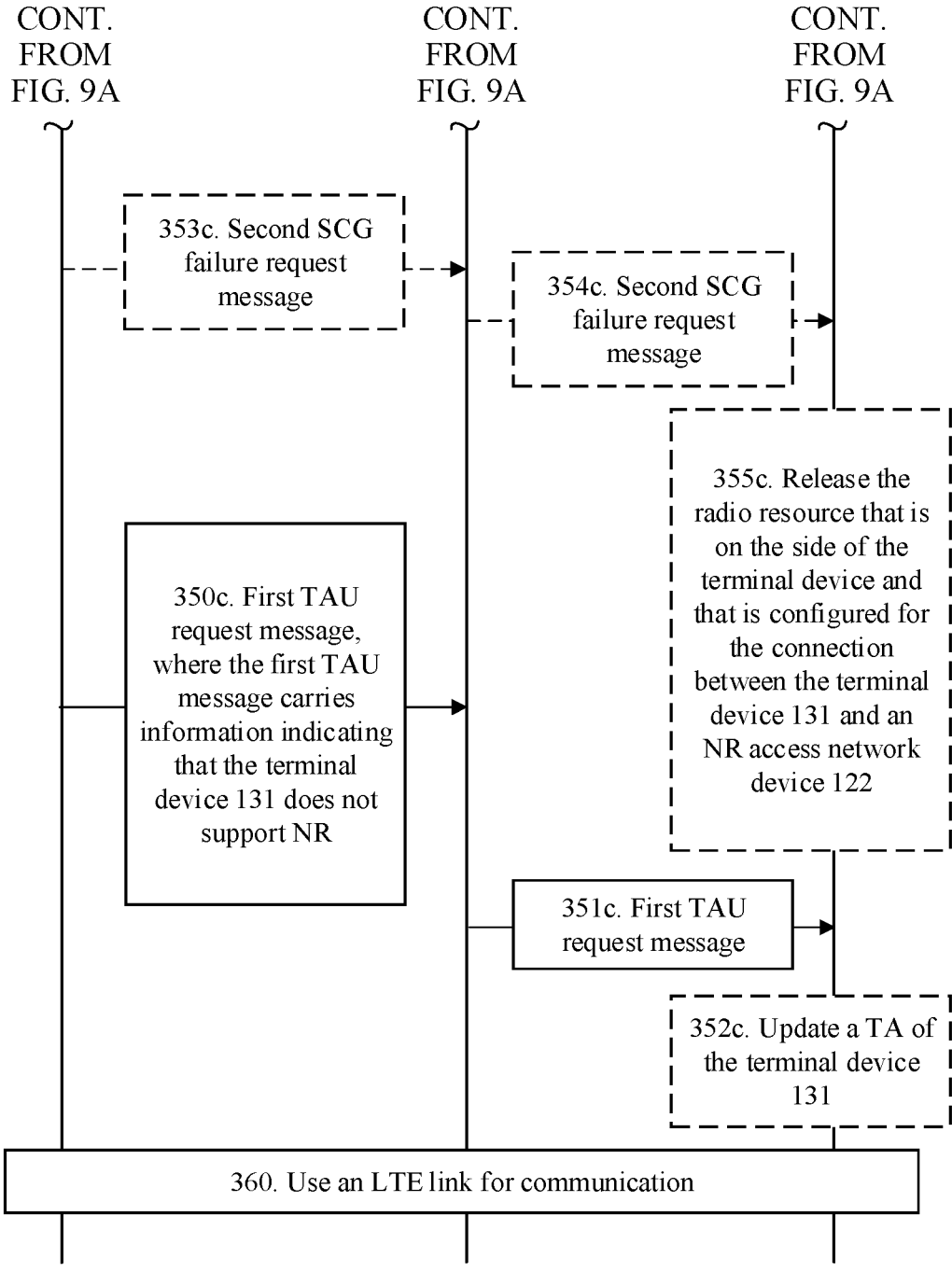

FIG. 9A-FIG. 9B are a schematic flowchart of still another communication method 900 according to an embodiment of this application. With reference to FIG. 9A-FIG. 9B, the following describes in detail the communication method provided in this application. In the method 900, a manner in which the terminal device 131 indicates the LTE access network device 121 to release the NR link is different from the manner in the method 300. That is, the method 900 includes the foregoing step 310, step 320, step 331, step 332, step 340, and step 360. Step 331 and step 332 are also optional steps, that is, in the method 900, the terminal device may perform step 331 and step 332, or the terminal device may not perform step 331 and step 332. Differences from the method 300 are as follows: In the method 900, step 350c to step 355c are used to replace step 350a to step 359a in the method 300; and step 330 in the method 300 is an optional step in the method 900, that is, step 330 may or may not be performed in the method 900. The following describes in detail steps 350b to 355c. For details about step 310, step 320, step 331, step 332, step 340, and step 360, refer to descriptions in the method 300. Details are not described herein again.

Step 350c: The terminal device 131 sends a first TAU request message to the LTE access network device 121, where the first TAU request message is used to request to update a tracking area of the terminal device 131, and the first TAU request message carries information indicating that the terminal device 131 does not support NR. Correspondingly, the LTE access network device 121 receives the first TAU request message sent by the terminal device 131.

Specifically, the NAS layer of the terminal device 131 sends the first TAU request message to the LTE access network device 121. Correspondingly, the LTE access network device 121 receives the first TAU request message sent by the RRC layer of the terminal device 131.

That the terminal device 131 does not support NR may be understood as that the terminal device 131 does not have the NR capability.

A tracking area is a concept established by the LTE/NR system for location management of terminal devices. The tracking area is defined as a free moving area in which the terminal device does not need to update a service. A function of the TA is to implement location management of terminal devices, including paging management and location update management. The terminal device notifies the core network of the TA of the terminal device by registering a tracking area.

When the terminal device is in the RRC idle state, the core network can know the tracking area in which the terminal device is located. In addition, when the terminal device in the RRC idle state needs to be paged, paging needs to be performed in all cells in the tracking area with which the terminal device is registered.

A TA is a cell-level configuration. A plurality of cells may be configured with the same TA, and one cell can belong to only one TA.

A tracking area identity (TAI) includes a PLMN and a tracking area code (TAC), that is, TAI=PLMN+TAC.

A plurality of TAs form a TA list, and are allocated to one UE. When moving in the TA list, the UE does not need to perform a TA update (TAU), so as to reduce frequent interaction with a network. When the terminal device enters a TA not in the TA list registered by the terminal device, TAU needs to be performed. The core network reallocates a group of TAs to the terminal device, and the newly allocated TAs may also include some TAs in the original TA list.

Specifically, a master chip of the terminal device 131 sends an AT instruction to the NAS layer of the terminal device 131, where the AT instruction is used to instruct to disable the NR; and the NAS layer of the terminal device 131 sends a first TAU request message to the LTE access network device 121.

Step 351c: The LTE access network device 121 forwards the first TAU message to the LTE core network device 111. Correspondingly, the LTE core network device 111 receives the first TAU message sent by the LTE access network device 121.

Step 352c: The LTE core network device 111 updates the TA of the terminal device 131 based on the first TAU message. An updated TA of the terminal device 131 is located in a coverage area of the LTE access network device 121.

Optionally, if the current SCG is added, before step 350c to step 352c, the method 1200 further includes step 353c to step 355c.

Step 353c: The terminal device 131 sends a second SCG failure request message to the LTE access network device 121, where the second SCG failure message is used to request to release a radio resource that is occupied on the NR access network device 122 side and that is configured for connection between the terminal device 131 and the NR access network device 122. Correspondingly, the LTE access network device 121 receives the second SCG failure request message sent by the terminal device 131.

The SCG failure request message may be specified differently in different protocol versions. For example, in an R12 protocol version, the SCG failure request message may be a signaling message SCGFailureInformation-r12-IEs, and includes parameters such as a failure type failureType-r12. The failure type includes any one or a combination of the following parameters: a timer delay (that is, a supported delay for data transmission between UE and a network side), a random access problem randomAccessProblem, a maximum quantity of RLC retransmissions rlc-MaxNumRetx (a maximum quantity of RLC data packet retransmissions allowed), an SCG link change failure scg-ChangeFailure (that is, an SCG link handover is not supported), and the like.

Specifically, the RRC layer of the terminal device 131 sends the second SCG failure request message to the LTE access network device 121. Correspondingly, the LTE access network device 121 receives the second SCG failure request message sent by the RRC layer of the terminal device 131.

Step 354c: The LTE access network device 121 forwards the second SCG failure request message to the LTE core network device 111. Correspondingly, the LTE core network device 111 receives the second SCG failure request message sent by the LTE access network device 121.

Step 355c: The LTE core network device 111 releases the radio resource that is occupied on the terminal device side and that is configured for the connection between the terminal device 131 and the NR access network device 122.

In the method 900, the terminal device camps on a dual-connectivity network, and a mobile network identifier displayed on a display interface of the terminal device is "5G". In this case, a 5G switch on a "Settings" interface of the terminal device is in an enabled state. If the 5G switch is added to the shortcut, the "5G" shortcut switch presented in the drop-down status bar of the display interface of the terminal device is also in an enabled state. After the terminal device determines that the terminal device meets the first preset condition, the terminal device does not turn off the 5G switch. In this case, the 5G switch on the "Settings" interface of the terminal device is in the enabled state. If the 5G switch is added to the shortcut, in this case, the "5G" shortcut switch presented in a drop-down status bar of the display interface of the terminal device is also in the enabled state. The terminal device indicates, by using the first TAU request message, that the terminal device does not support the NR capability, so as to release the NR link. After the NR link is released, the mobile network identifier displayed on the display interface of the terminal device changes from "5G" to "4G" (in this case, the terminal device 131 successfully camps on 4G, and the mobile network identifier may not be displayed on the display interface of the terminal device 131). In a network architecture of the EN-DC, the terminal device 131 sends the first TAU request message to the LTE access network device when determining that at least one of the following is met: The terminal device 131 is in a power saving mode, battery power of the terminal device 131 is less than or equal to a first preset value, or temperature of a rear cover of the terminal device 131 is greater than or equal to a second preset value, where the first TAU request message is used to request to release the NR link, and the first TAU request message carries information indicating that the terminal device 131 does not support NR. Therefore, the LTE access network device releases the radio resource that is occupied on the NR access network device side and that is configured for the connection between the terminal device and the NR access network device, so that the NR link is released and the NR link-related power consumption of the terminal device is reduced, thereby improving user experience.

FIG. 10 is a schematic flowchart of still another communication method 1000 according to an embodiment of this application. With reference to FIG. 10, the following describes in detail the communication method provided in this application. In the method 1000, a manner in which the terminal device 131 indicates the LTE access network device 121 to release the NR link is different from the manner in the method 800. That is, the method 1000 also includes the foregoing step 310, step 320, step 331, step 332, step 340, and step 360. A difference from the method 800 is as follows: In the method 1000, step 350*d* and step 351*d* are used to replace step 350*b* to step 352*b* in the method 300. The following describes in detail step 350*d* and step 351*d*. For details about step 310, step 320, step 331, step 332, step 340, and step 360, refer to descriptions in the method 300 and the method 800. Details are not described herein again.

Step 350*d*: The terminal device 131 sends a first SCG failure request message to the LTE access network device 121, where the first SCG failure message is used to request to release a radio resource that is occupied on the NR access network device 122 side and that is configured for connection between the terminal device 131 and the NR access network device 122. Correspondingly, the LTE access network device 121 receives the first SCG failure request message sent by the terminal device 131.

Specifically, the RRC layer of the terminal device 131 sends the first SCG failure request message to the LTE access network device 121. Correspondingly, the LTE access network device 121 receives the first SCG failure request message sent by the RRC layer of the terminal device 131.

Optionally, the LTE access network device 121 may release a radio resource that is occupied on the NR access network device 122 side and that is configured for the connection between the terminal device 131 and the NR access network device 122, and notify, by using an X2 interface, the NR access network device 122 that the radio resource that is occupied on the NR access network device 122 side and that is configured for the connection between the terminal device 131 and the NR access network device

122 is released. Alternatively, after receiving the first SCG failure request message, the LTE access network device 121 indicates, by using an X2 interface, the NR access network device 122 to release the radio resource that is occupied on the NR access network device 122 side and that is configured for the connection between the terminal device 131 and the NR access network device 122, so that the NR access network device 122 releases the radio resource that is occupied on the NR access network device 122 side and that is configured for the connection between the terminal device 131 and the NR access network device 122.

Step 351*d*: The RRC layer of the terminal device 131 stops NR measurement.

In the method 900, the terminal device camps on a dual-connectivity network, and a mobile network identifier displayed on a display interface of the terminal device is "5G". In this case, a 5G switch on a "Settings" interface of the terminal device is in an enabled state. If the 5G switch is added to the shortcut, the "5G" shortcut switch presented in the drop-down status bar of the display interface of the terminal device is also in an enabled state. After the terminal device determines that the terminal device meets the first preset condition, the terminal device does not turn off the 5G switch. In this case, the 5G switch on the "Settings" interface of the terminal device is in the enabled state. If the 5G switch is added to the shortcut, in this case, the "5G" shortcut switch presented in a drop-down status bar of the display interface of the terminal device is also in the enabled state. The terminal device does not indicate that the terminal device does not support the NR capability. The terminal device releases the NR link by sending the first SCG failure request message. After the NR link is released, the mobile network identifier displayed on the display interface of the terminal device is still "5G".

In the network architecture of the EN-DC, the terminal device 131 sends the first SCG failure request message to the LTE access network device when determining that at least one of the following is met: The terminal device 131 is in the power saving mode, the battery power of the terminal device 131 is less than or equal to the first preset value, or the temperature of the rear cover of the terminal device is greater than or equal to the second preset value, where the first SCG failure request message is used to request to release the radio resource that is occupied on the NR access network device side and that is configured for the connection between the terminal device 131 and the NR access network device 122, so that the NR link is released and the NR link-related power consumption of the terminal device 131 is reduced, thereby improving user experience.

Using a mobile phone as an example of the terminal device 131, the following uses case 1, case 2, and case 3 as examples to describe a graphical user interface (GUI) change process of the terminal device 131 with reference to possible schematic scenario diagrams provided in FIG. 11A-FIG. 11I to FIG. 15A-FIG. 15C. In case 1, the mobile phone detects that the mobile phone is in the power saving mode; in case 2, the mobile phone detects that the battery power consumption of the mobile phone is greater than the first preset value; and in case 3, the sensor on the rear cover of the mobile phone detects that the temperature of the rear cover of the mobile phone has risen to the second preset value.

The terminal device camps on a dual-connectivity network. When the terminal device indicates that the terminal device does not support the NR capability (for example, the method 600 or the method 900), after the NR link is released, when the mobile phone uses an LTE link for communication, the mobile network displayed on the mobile phone is "4G".

The terminal device camps on the dual-connectivity network. When the terminal device does not indicate that the terminal device does not support the NR capability (for example, the method 800 or the method 1000), after the NR link is released, when the mobile phone uses the LTE link for communication, the mobile network displayed on the mobile phone is "5G".

It should be noted that the existing protocol does not clearly define a display rule of the 5G icon in the NSA networking. The GSMA defines several states and a display scheme of the icon in each state based on different coverage and different states of the 4G and NR networks. For reference, Table 1 shows various possible configurations of a network in different states. There are four configuration forms in each state, and an operator may negotiate with a terminal manufacturer to use a specific configuration form. Configuration D is relatively radical, and a probability of displaying the NSA is very large. Even if the user does not subscribe to the core network, the 5G icon may be displayed provided that the 5G terminal is available, while configuration A is relatively conservative. The foregoing solution is only a suggestion of the GSMA, and currently, 3GPP does not describe related content.

TABLE 1

| State | Config- uration A | Config- uration B | Config- uration C | Config- uration D |
|---|---|---|---|---|
| IDLE (idle state) in an LTE cell that does not support NAS networking, or IDLE when the LTE cell is connected | 4G | 4G | 4G | 4G |
| IDLE in an LTE cell that supports NAS networking and does not detect an NR coverage area, or IDLE when the LTE cell is connected | 4G | 4G | 4G | 5G |
| LTE is connected only in an LTE cell that supports NAS networking and detects an NR coverage area | 4G | 4G | 5G | 5G |
| IDLE in an LTE cell that supports NAS networking and detects an NR coverage area | 4G | 5G | 5G | 5G |
| LTE and NR are connected in an LTE cell that supports NAS networking | 5G | 5G | 5G | 5G |
| IDLE under NG RAN when 5GC is connected, or IDLE when the NG RAN is connected | 5G | 5G | 5G | 5G |

Figure 14A:
FIG. 14A-FIG. 14E are a schematic diagram of still another group of GUIs of a terminal device according to an embodiment of this application.
Figure 14B:
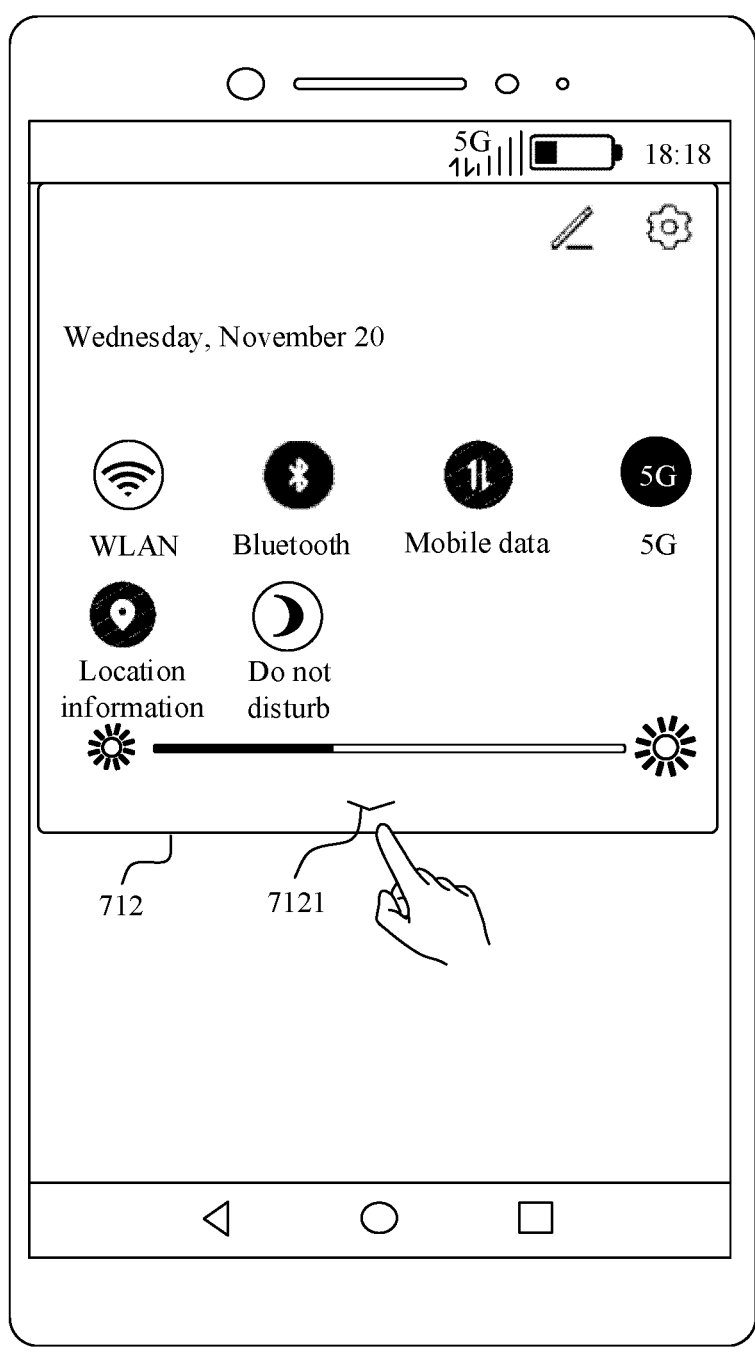
Figure 14C:
Figure 14D:
Figure 14E:
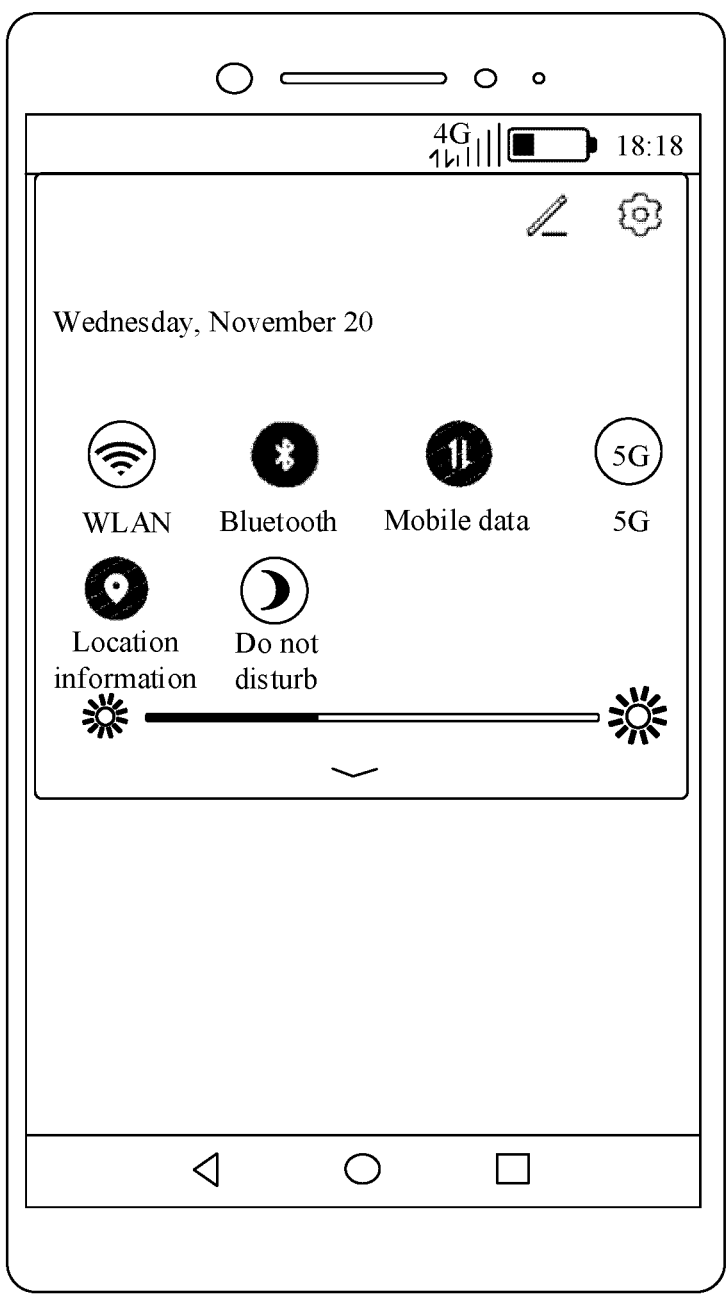
Figure 15A:
FIG. 15A-FIG. 15C are a schematic diagram of still another group of GUIs of a terminal device according to an embodiment of this aFpplication.
Figure 15B:
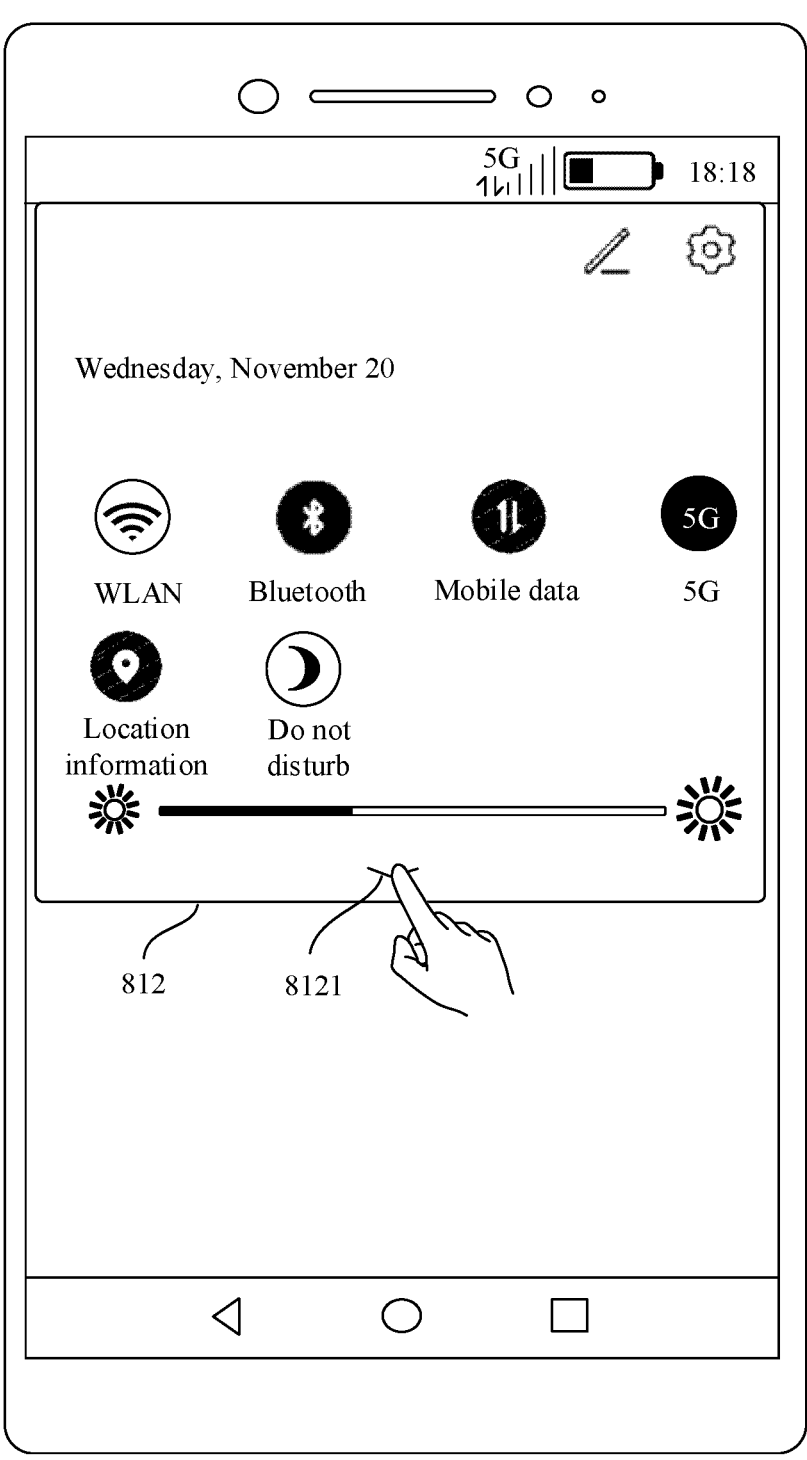
Figure 15C:

With reference to the foregoing cases, the following describes a GUI change process of the terminal device 131 in the scenarios shown in FIG. 11A-FIG. 11I to FIG. 14A-FIG. 14E based on an example in which the terminal device 131 turns off the 5G switch and the terminal device 131 indicates a change of the NR capability of the terminal device 131, and a GUI change process of the terminal device 131 in the scenario shown in FIG. 15A-FIG. 15C based on an example in which the terminal device 131 does not turn off the 5G switch and the terminal device 131 does not indicate a change of the NR capability of the terminal device 131.

Case 1: The terminal device 131 detects that the terminal device 131 is in a power saving mode.

FIG. 11A-FIG. 11I show a group of GUIs of the terminal device 131. FIG. 11A-FIG. 11I show a GUI change process of the terminal device 131 when the terminal device 131 is in the power saving mode and the terminal device 131 passively turns off the 5G switch.

Figure 11A:
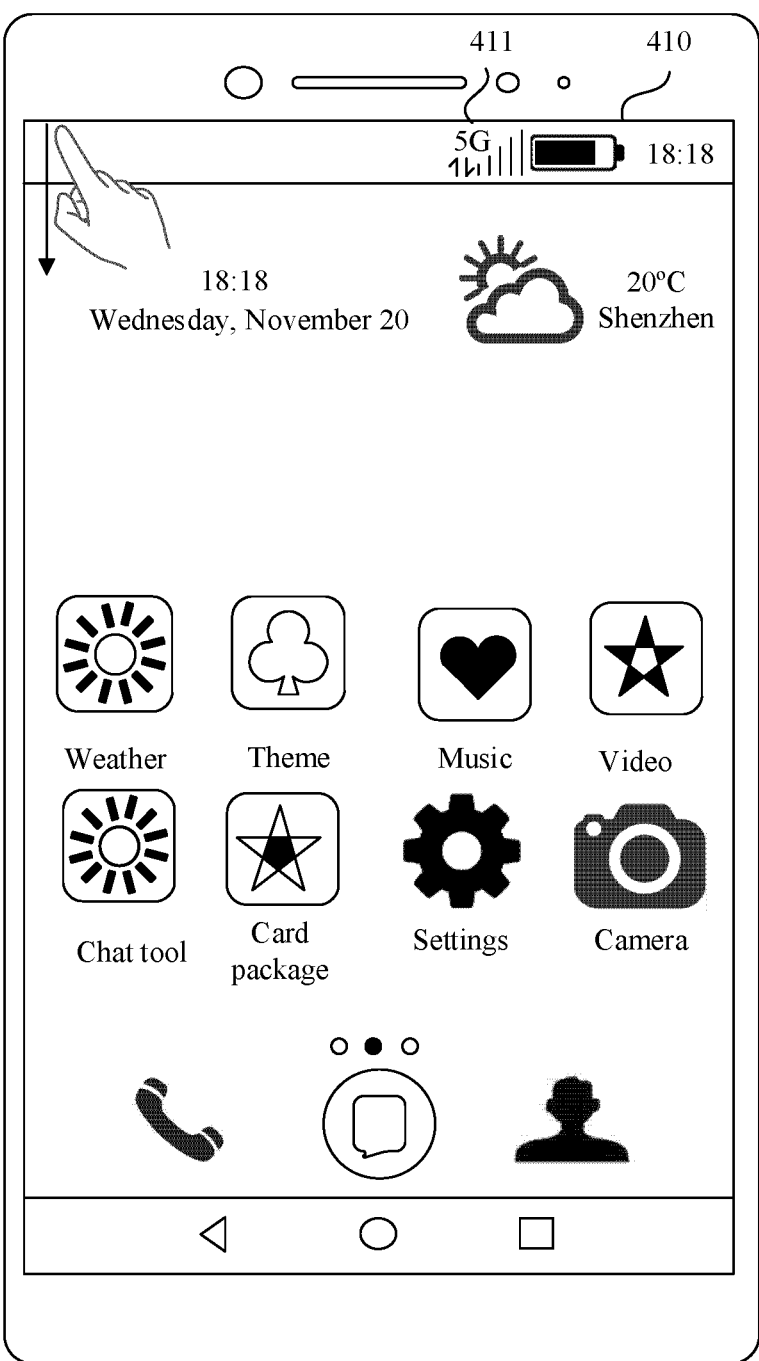
Figure 11B:
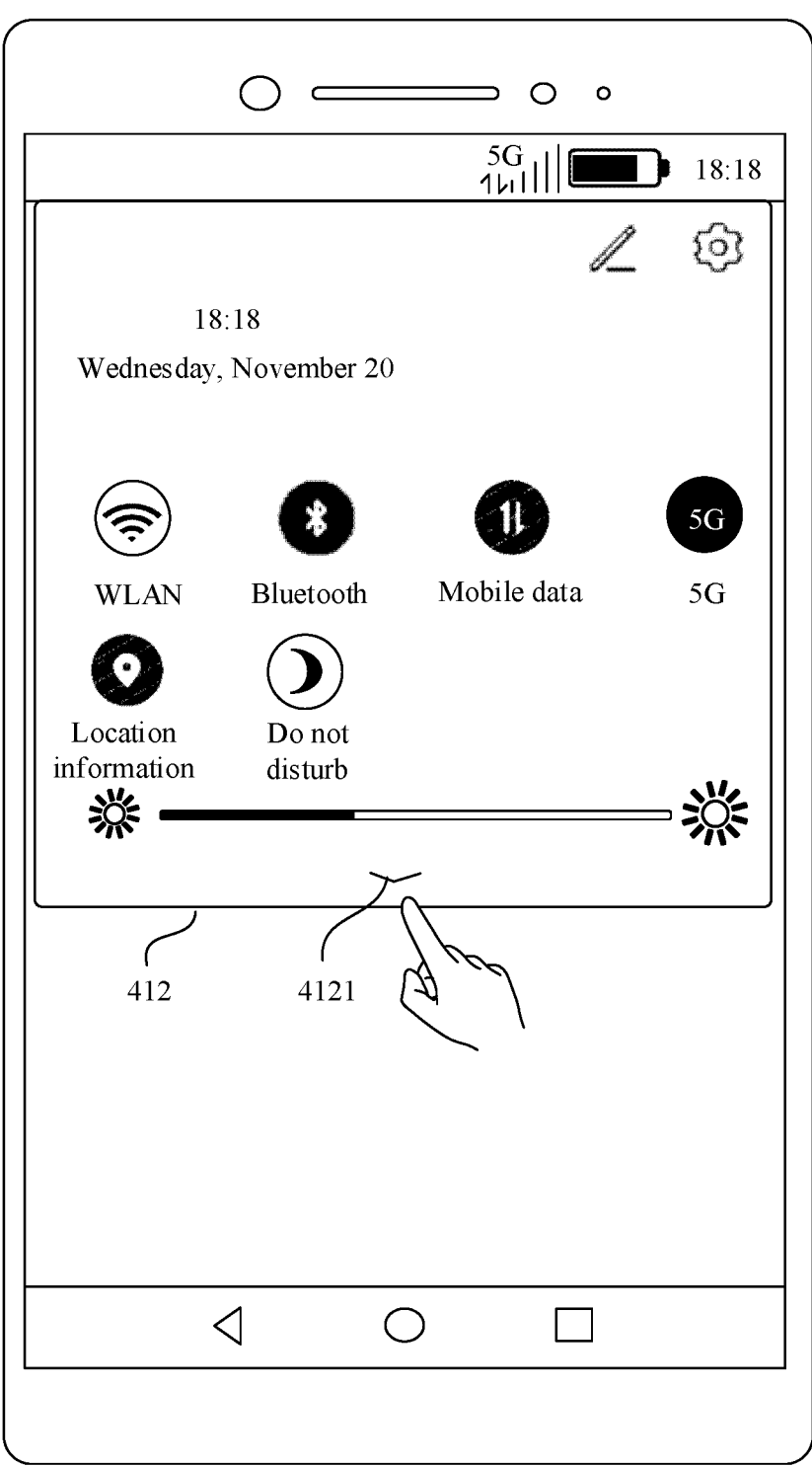
Figure 11C:
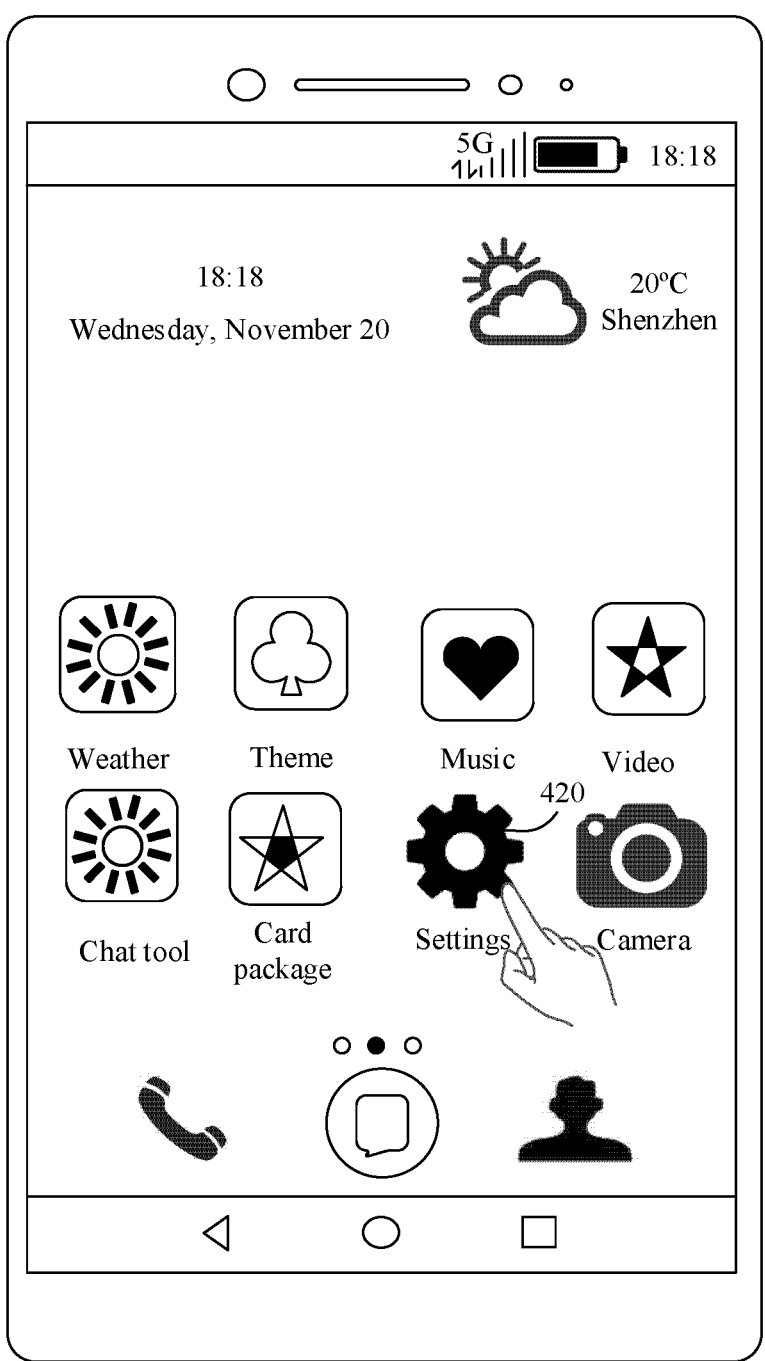
Figure 11D:
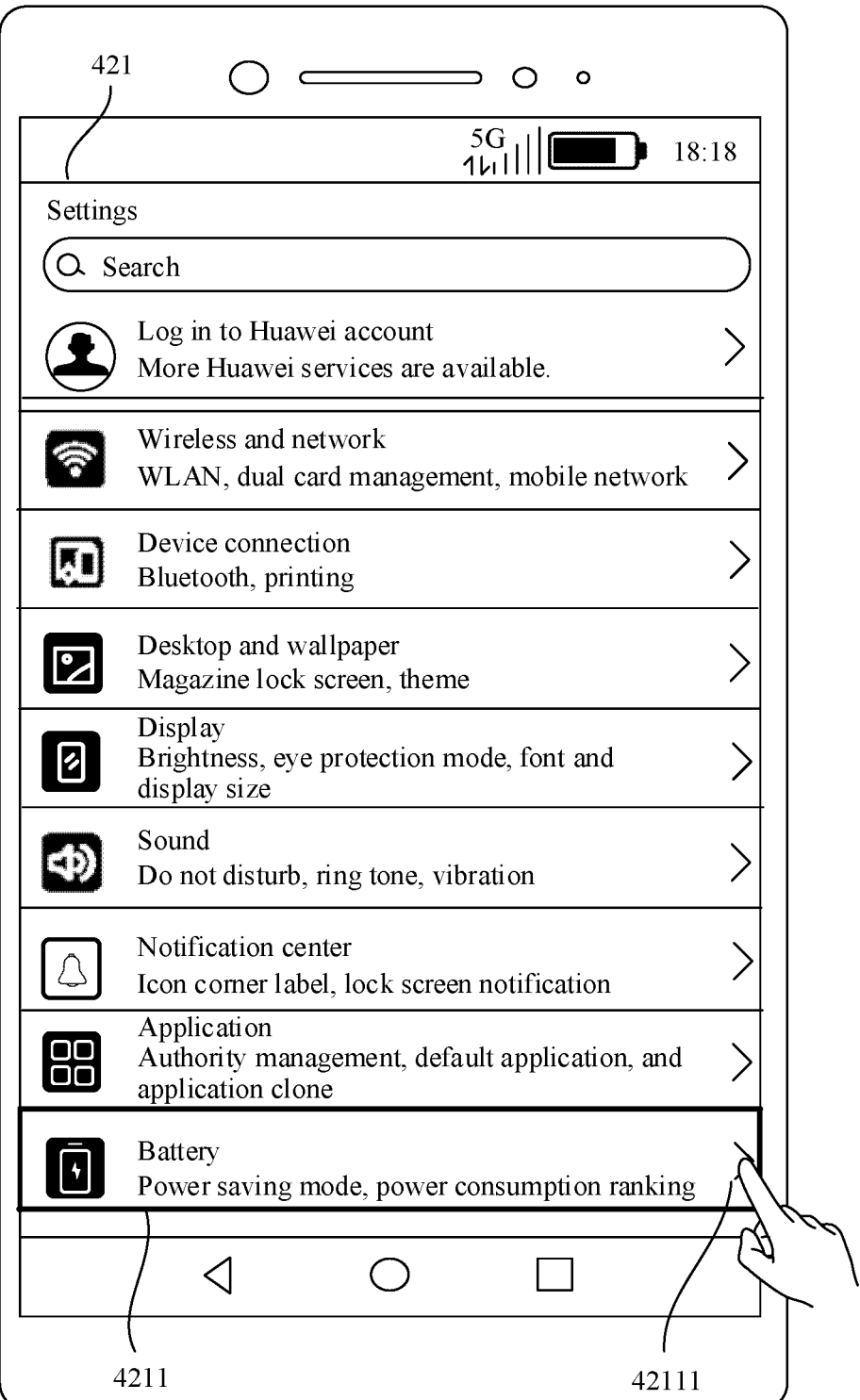
Figure 11E:
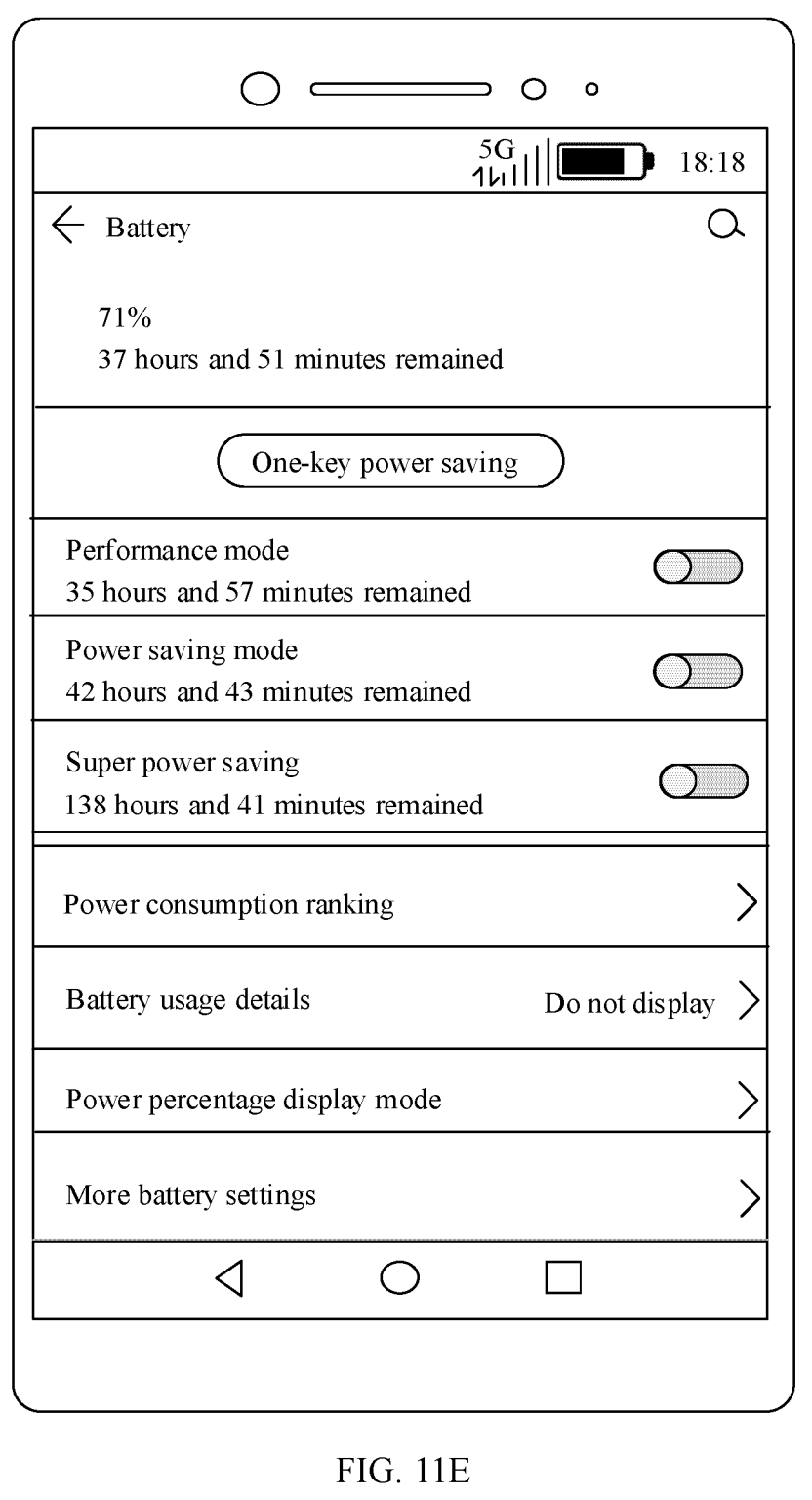
Figure 11F:
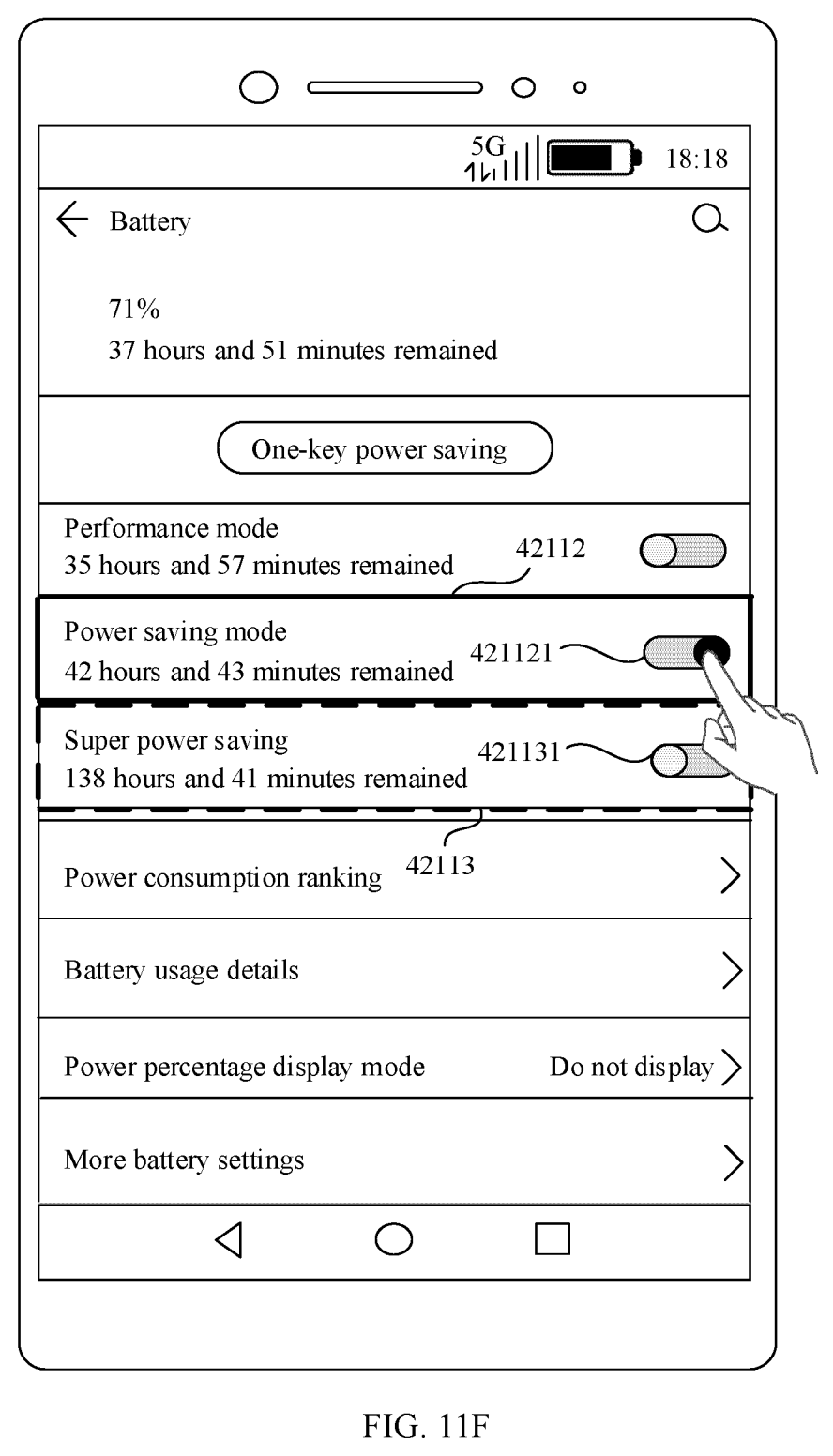
Figure 11G:
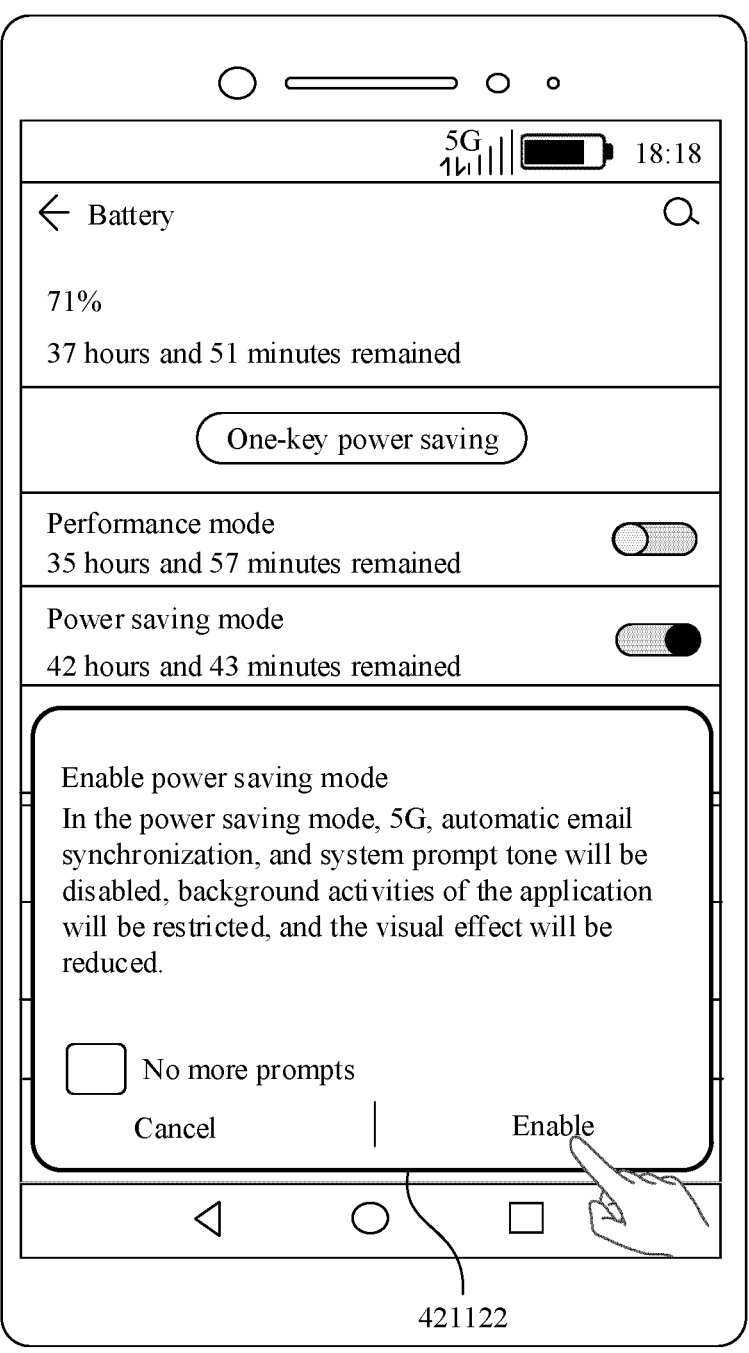
Figure 11H:
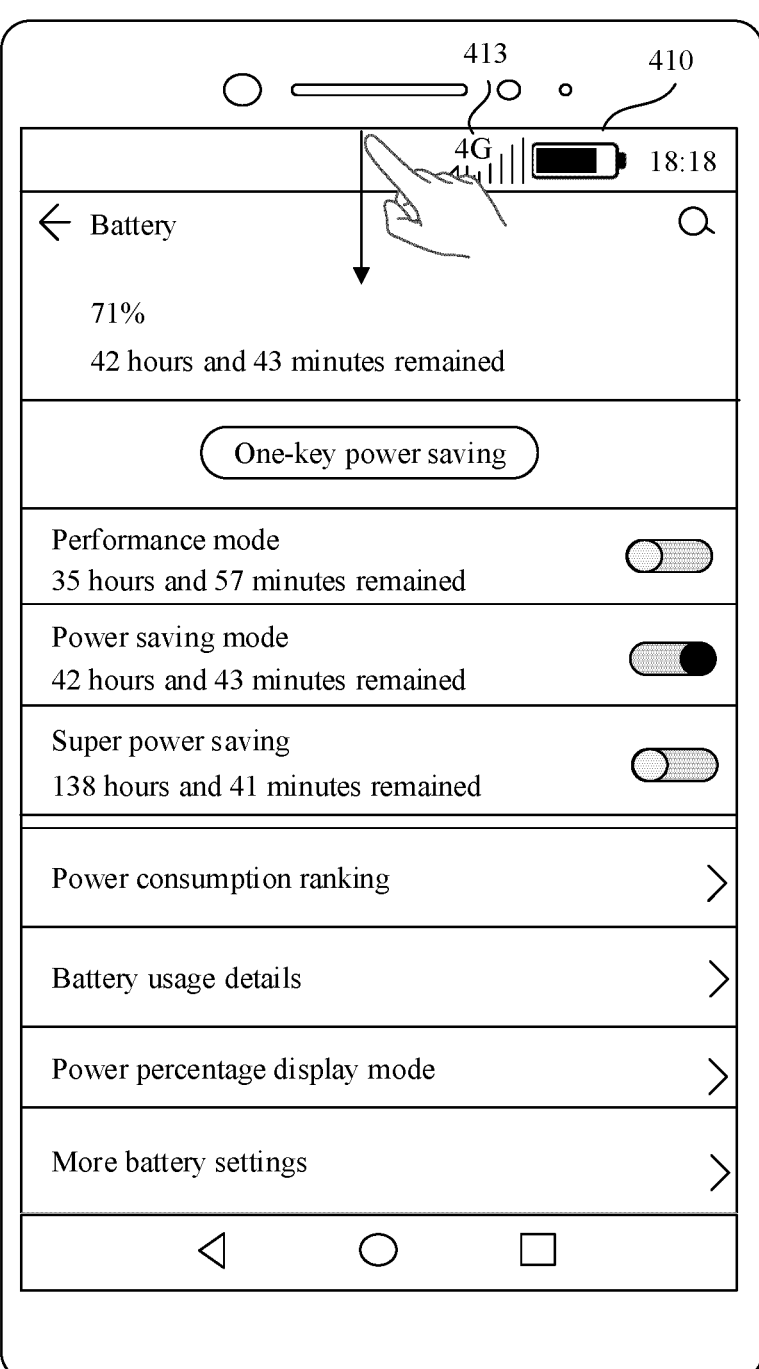
Figure 11I:
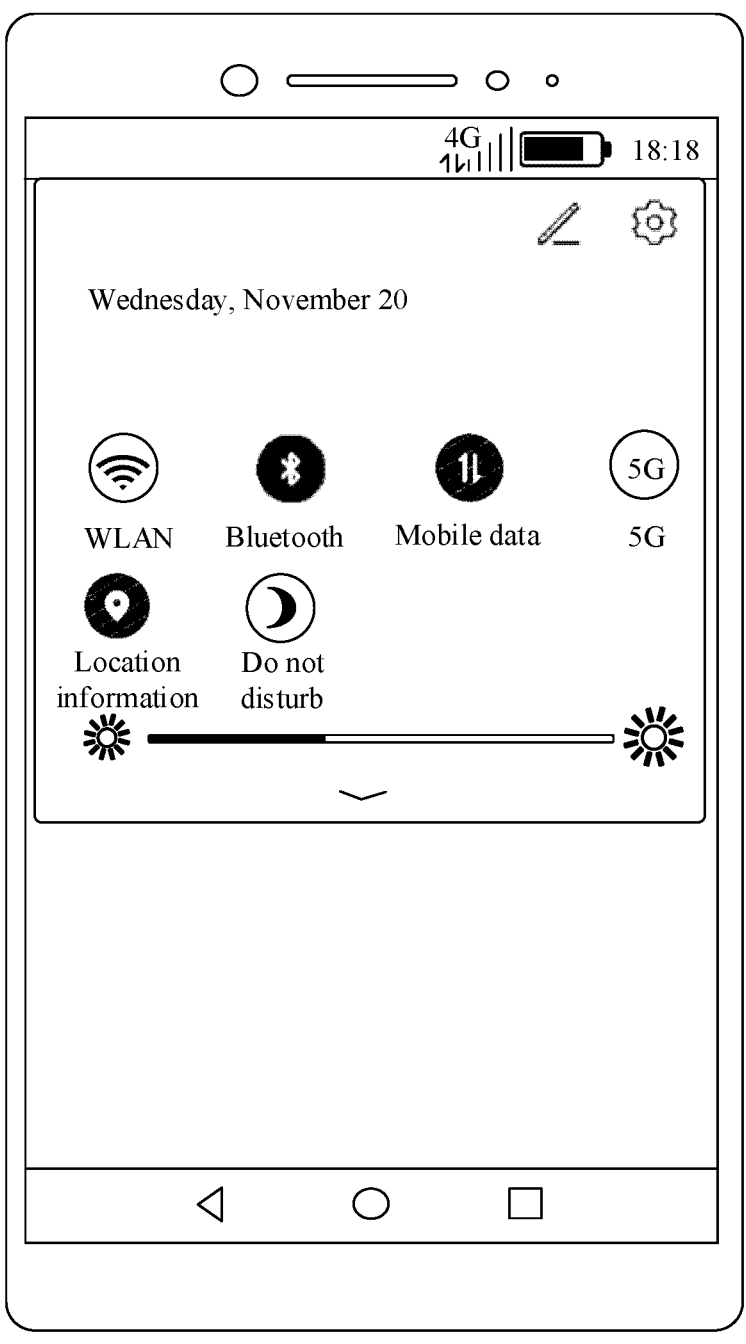

Referring to FIG. 11A, the GUI is a desktop of the terminal device 131. The desktop of the terminal device 131 includes three desktop pages, and each desktop page includes icons of one or more application programs. The current desktop of the mobile phone displays a second desktop page, and the desktop page includes a "Weather" icon, a "Theme" icon, a "Music" icon, a "Video" icon, a "Chat tool" icon, a "Card package" icon, a "Settings" icon, and a "Camera" icon. In this case, an icon 411 of "5G" is displayed in the status bar 410 at the uppermost part of the terminal device 131. When the terminal device 131 detects that the user's finger slides down along the terminal device 131 in the state 410, the display interface of the terminal device 131 is the GUI shown in FIG. 11B. The drop-down status bar 412 displayed on the display interface includes a "WLAN" shortcut switch, a "Bluetooth" shortcut switch, a "Mobile data" shortcut switch, a "5G" shortcut switch, a "Location information" shortcut switch, and a "Do not disturb" shortcut switch. When a shortcut switch is in an enabled state, the shortcut switch is in the on state. When a shortcut switch is in the disabled state, the shortcut switch is in the off state, that is, the shortcut switch is in the gray state. As shown in FIG. 11B, the "Bluetooth" shortcut switch, the "Mobile data" shortcut switch, the "5G" shortcut switch, and the "Location information" shortcut switch in the drop-down status bar 412 are in the enabled state, that is, the "Bluetooth" shortcut switch, the "Mobile data" shortcut switch, the "5G" shortcut switch, and the "Location information" shortcut switch are in the on state. In this case, that the "5G" shortcut switch is in the on state may be understood as that the terminal device 131 communicates with another device by using the 5G network. The "WLAN" shortcut switch and the "Do not disturb" switch in the drop-down status bar 412 are in the disabled state, that is, the "WLAN" shortcut switch and the "Do not disturb" switch are in the off state, that is, the "WLAN" shortcut switch and the "Do not disturb" switch are in the gray state. When the terminal device 131 detects that the user's finger taps the icon 4121, the display interface of the terminal device 131 is the GUI shown in FIG. 11C, that is, the desktop of the terminal device 131. When the terminal device 131 detects that the user taps the "Settings" icon 420, the display interface of the terminal device 131 is the GUI shown in FIG. 11D. The display interface is a "Settings" interface 421. The "Settings" interface 421 includes a "Wireless and network" menu, a "Device connection" menu, a "Desktop and wallpaper" menu, a "Display" menu, a "Sound" menu, a "Notification center" menu, an "Application" menu, a "Battery" menu, and the like. When the terminal device 131 detects that the user taps the enabling button 42111 of the "Battery" menu 4211, the display interface of the terminal device 131 is shown in FIG. 11E. The display interface is the battery setting interface, including the "Remaining power" menu, the "Performance mode" menu, the "Power saving mode" menu, the "Super power saving" menu, the "Power consumption ranking" menu, the "Power usage details" menu, the "Power percentage display form" menu, and the "More battery settings" menu of the battery of the terminal device 131. When the terminal device 131 detects that the user taps the button 421121 in the "Power saving mode" menu 42112, the display interface of the terminal device 131 is shown in FIG. 11F, and the button 421121 is in an enabled state. In this case, the terminal device 131 displays an "Enable power saving mode" prompt window 421122. As shown in FIG. 11G, the "Enable power saving mode" prompt window 421122 displays "In the power saving mode, 5G, automatic email synchronization, and system prompt tone will be disabled, background activities of the application will be restricted, and the visual effect will be reduced." When the terminal device 131 detects that the user taps the "Enable" option in the "Enable power saving mode" prompt window 421122, in this case, because the terminal device indicates that the terminal device does not support the NR capability, the display interface of the terminal device 131 is shown in FIG. 11H. In this case, an icon 413 of "4G" is displayed in the status bar 410 at the uppermost part of the terminal device 131. When the terminal device 131 detects that the user's finger slides down along the terminal device 131 in the state 410, the display interface of the terminal device 131 is the GUI shown in FIG. 11I. In this case, the "5G" shortcut switch is in the disabled state, that is, the "5G" shortcut switch is in the off state, or the "5G" shortcut switch is in the gray state. In this case, that the "5G" shortcut switch is in the off state may be understood as that the terminal device 131 does not communicate with another device by using the 5G network. Therefore, the terminal device 131 implements passive turning off of the 5G switch.

Optionally, as shown in FIG. 11F, when the terminal device 131 detects that the user taps the button 421131 in the "Super power saving" menu 42113, the button 421131 is in an enabled state. In this case, the prompt window 421122 may alternatively be replaced with the first selection window shown in FIG. 7 part (b). After the terminal device 131 detects that the user taps the "Enable" button in the first selection window, the GUI of the terminal device 131 is shown in FIG. 11H.

FIG. 12A-FIG. 12G show a group of graphical user interfaces (GUIs) of the terminal device 131. FIG. 12A-FIG. 12G show a process in which the user enables the power saving mode, the terminal device 131 actively turns off the 5G switch, and the GUI of the terminal device 131 changes.

Figure 12A:
Figure 12B:
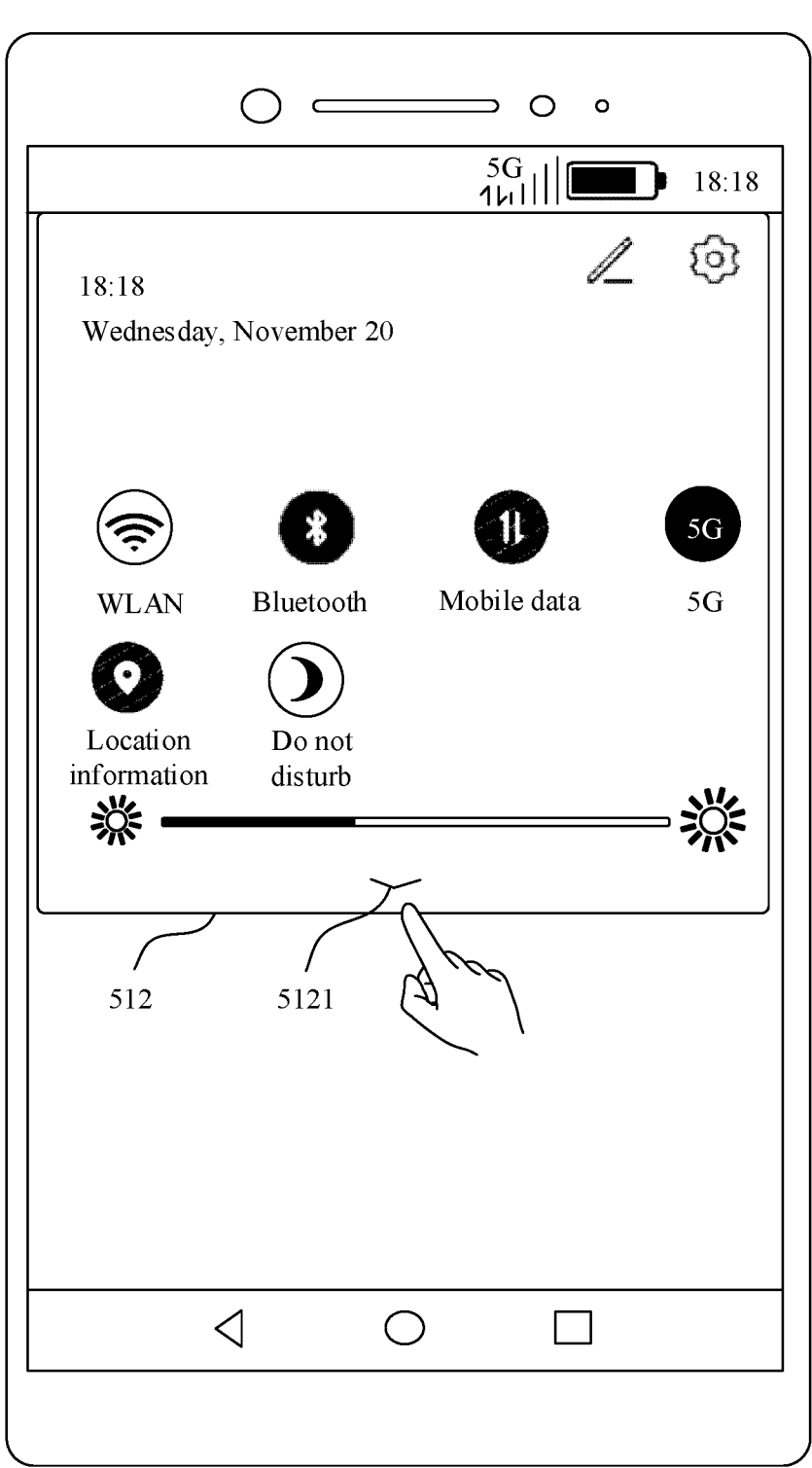
Figure 12C:
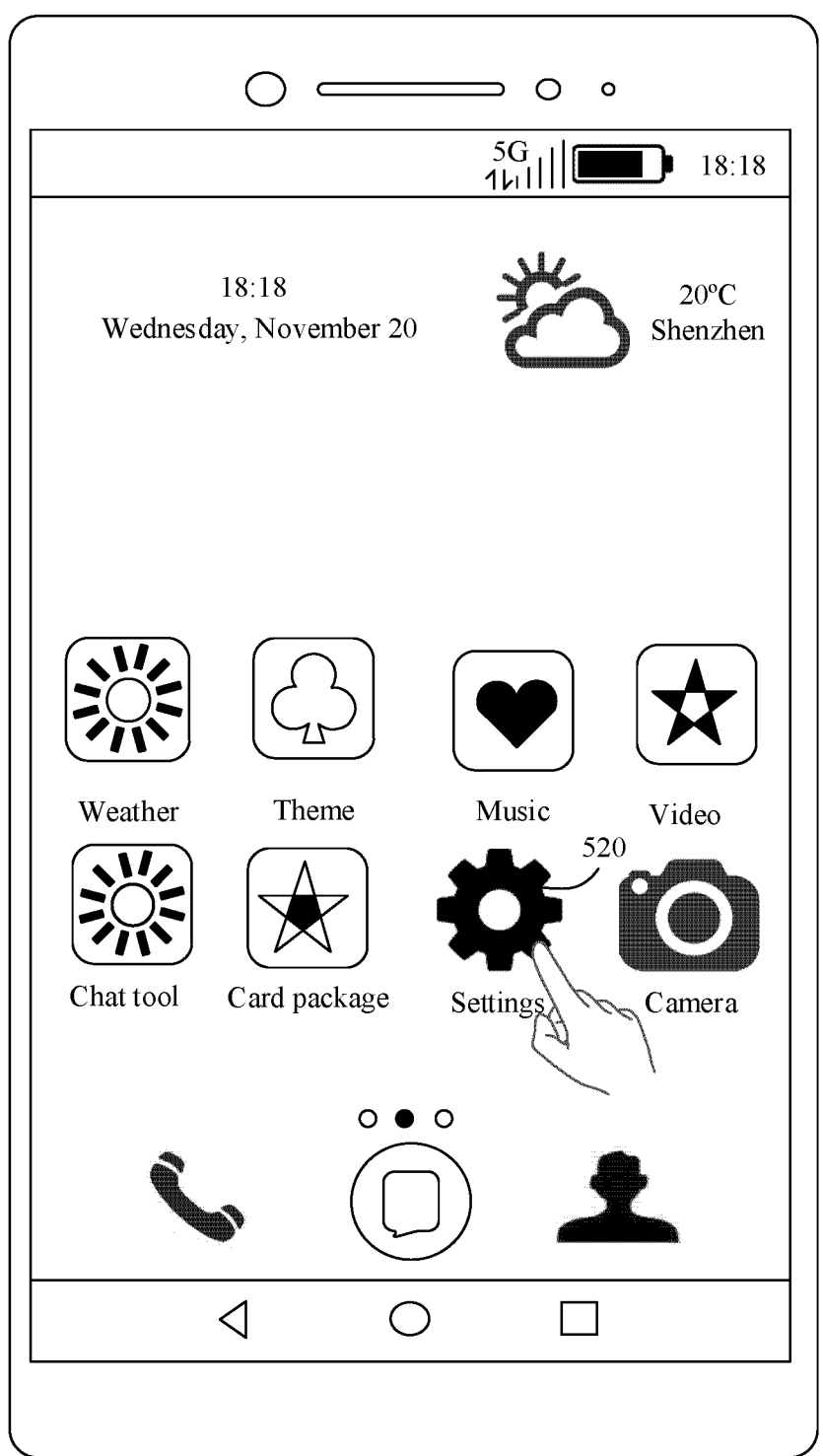
Figure 12D:
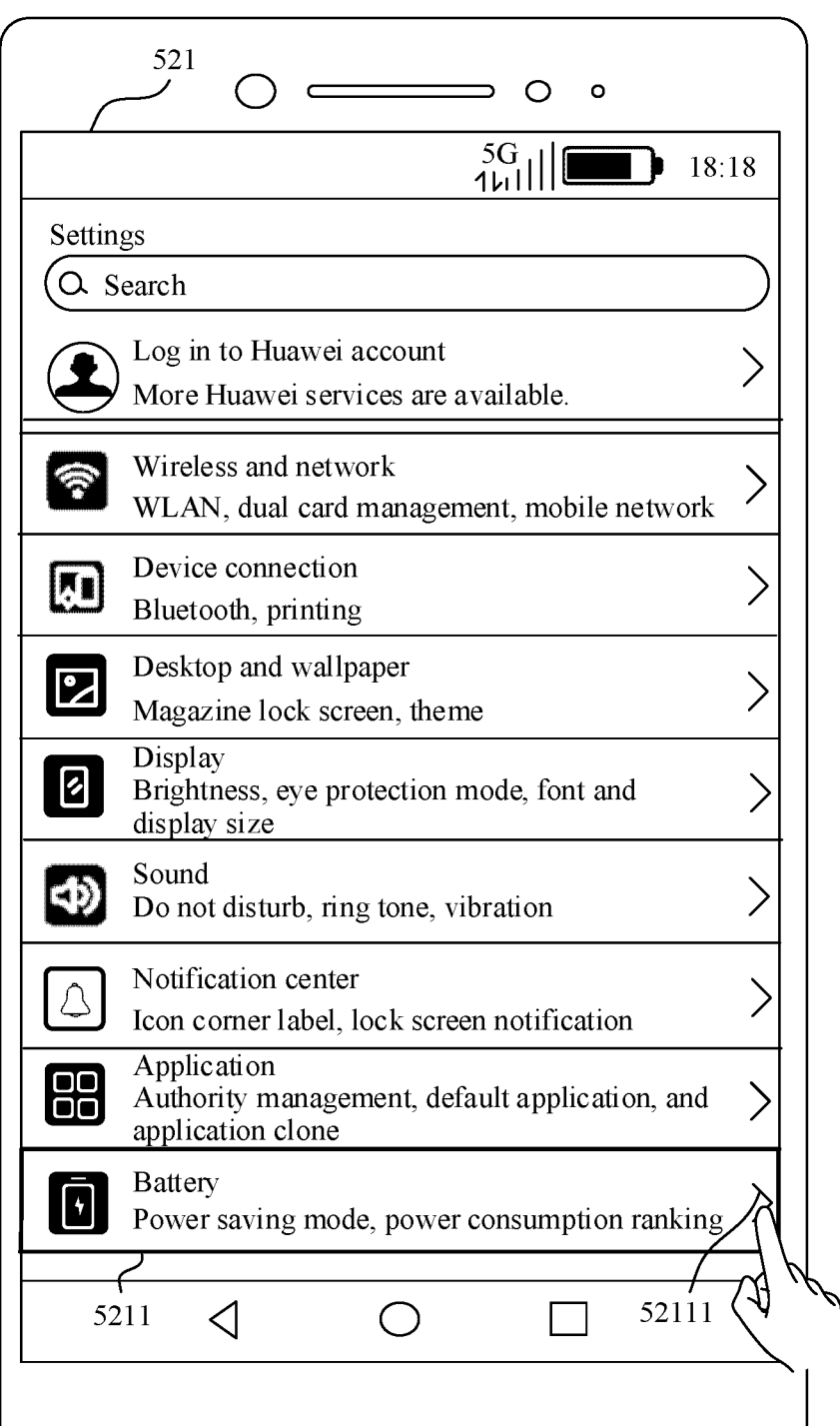
Figure 12E:
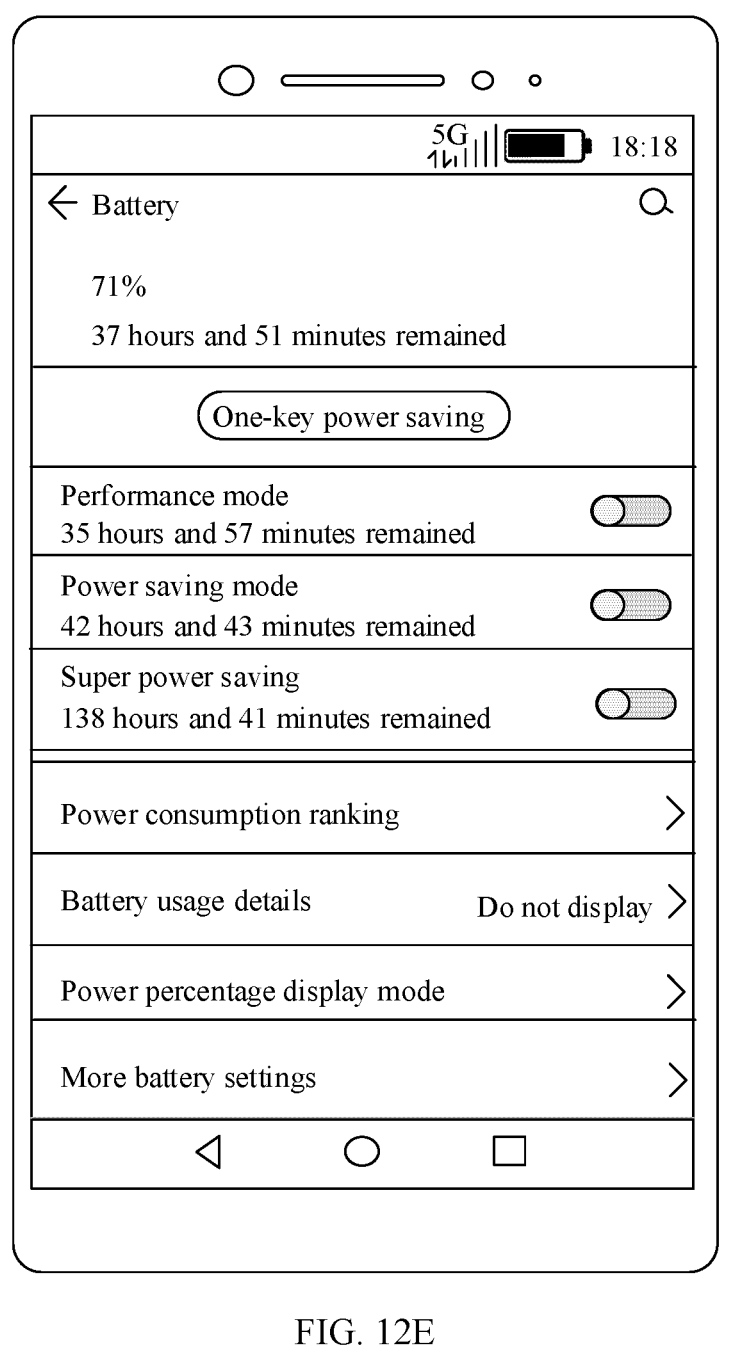
Figure 12F:
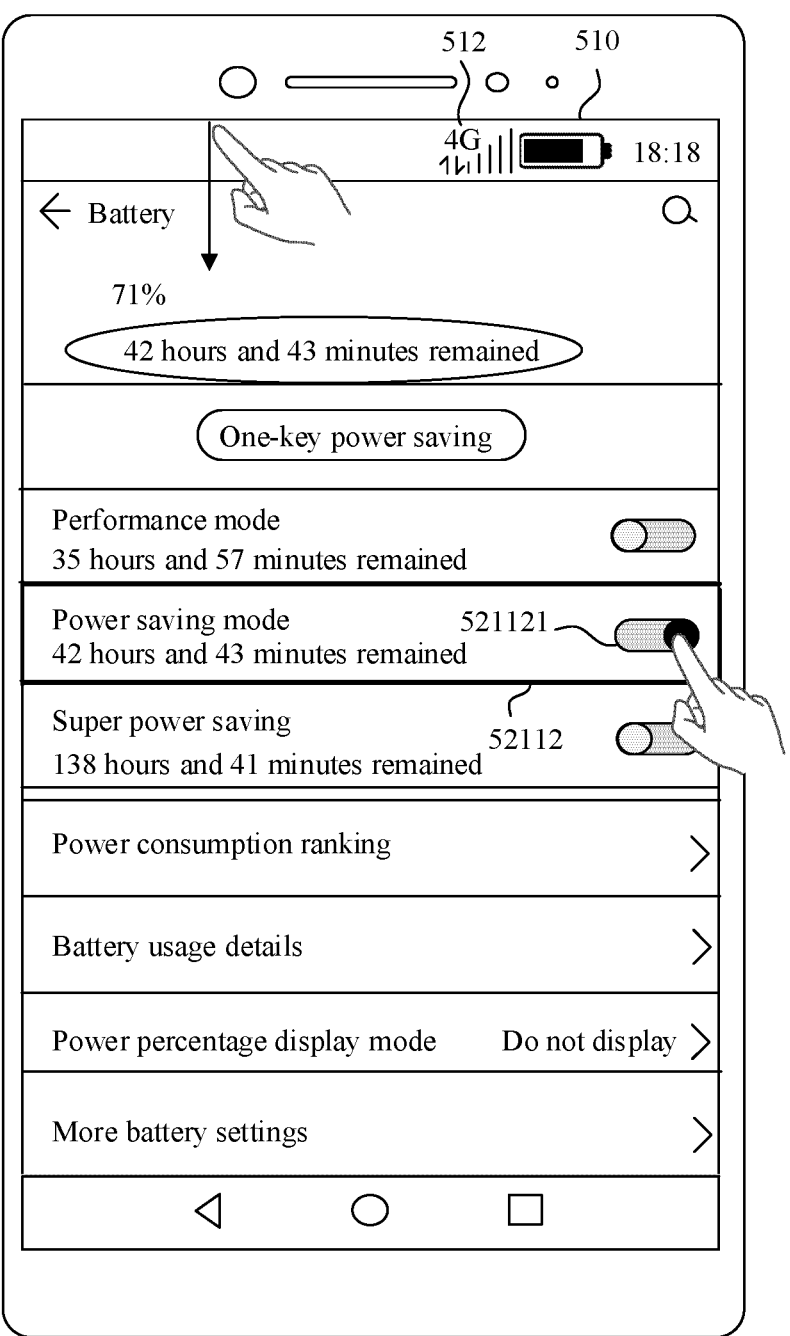
Figure 12G:
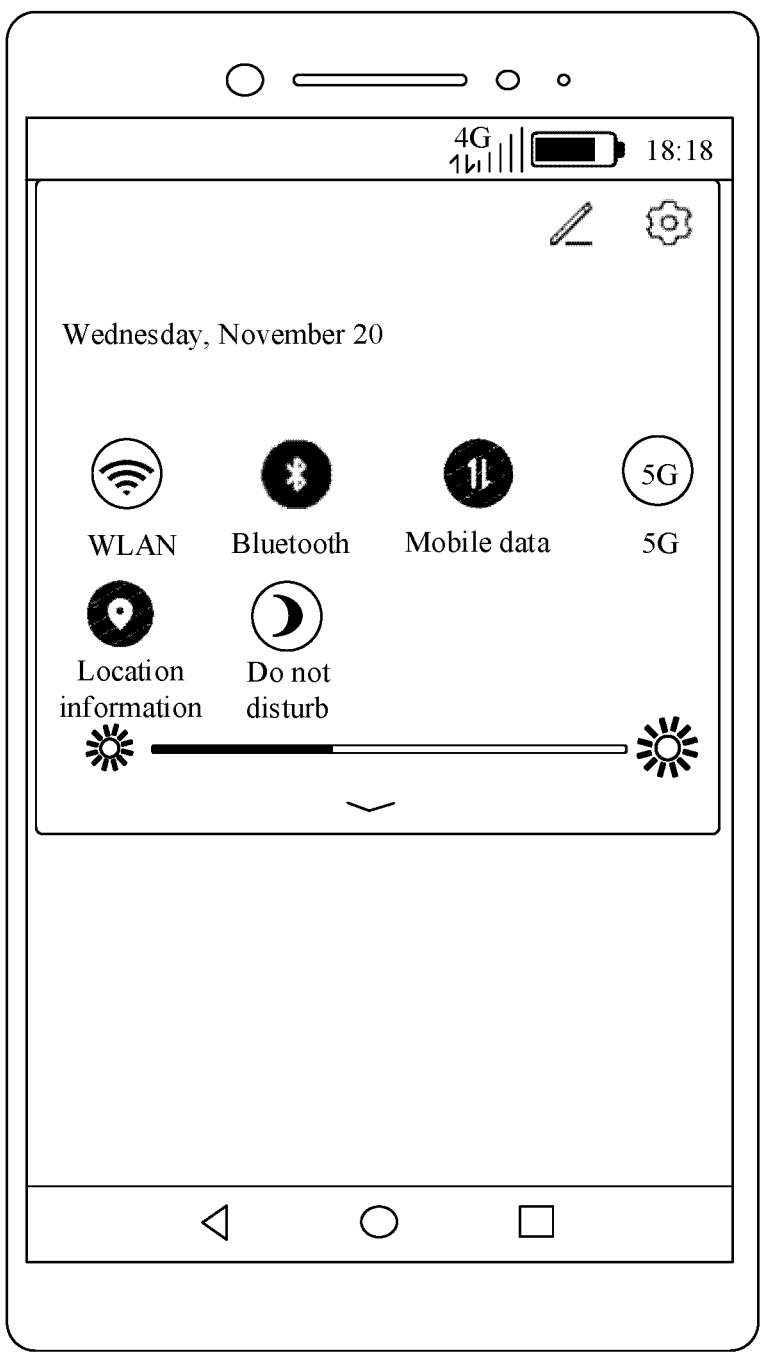

Referring to FIG. 12A, the GUI is a desktop of the terminal device 131. The desktop of the terminal device 131 includes three desktop pages, and each desktop page includes icons of one or more application programs. The current desktop of the mobile phone displays a second desktop page, and the desktop page includes a "Weather" icon, a "Theme" icon, a "Music" icon, a "Video" icon, a "Chat tool" icon, a "Card package" icon, a "Settings" icon, and a "Camera" icon. In this case, an icon 511 of "5G" is displayed in the status bar 510 at the uppermost part of the terminal device 131. When the terminal device 131 detects that the user's finger slides down along the terminal device 131 in the state 510, the display interface of the terminal device 131 is the GUI shown in FIG. 12B. The drop-down status bar 412 displayed on the display interface includes a "WLAN" shortcut switch, a "Bluetooth" shortcut switch, a "Mobile data" shortcut switch, a "5G" shortcut switch, a "Location information" shortcut switch, and a "Do not disturb" shortcut switch. When a shortcut switch is in an enabled state, the shortcut switch is in the on state. When a shortcut switch is in the disabled state, the shortcut switch is in the off state, that is, the shortcut switch is in the gray state. As shown in FIG. 12B, the "Bluetooth" shortcut switch, the "Mobile data" shortcut switch, the "5G" shortcut switch, and the "Location information" shortcut switch in the drop-down status bar 512 are in an enabled state, that is, the "Bluetooth"

shortcut switch, the "Mobile data" shortcut switch, the "5G" shortcut switch, and the "Location information" shortcut switch are in the on state. In this case, that the "5G" shortcut switch is in the on state may be understood as that the terminal device 131 communicates with another device by using the 5G network. The "WLAN" shortcut switch and the "Do not disturb" switch in the drop-down status bar 512 are in the disabled state, that is, the "WLAN" shortcut switch and the "Do not disturb" switch are in the off state, or the "WLAN" shortcut switch and the "Do not disturb" switch are in the gray state. When the terminal device 131 detects that the user's finger taps the icon 5121, a display interface of the terminal device 131 is the GUI shown in FIG. 12C, that is, the desktop of the terminal device 131. When the terminal device 131 detects that the user taps the "Settings" icon 520, the display interface of the terminal device 131 is the GUI shown in FIG. 12D. The display interface is a "Settings" interface 521. The "Settings" interface 521 includes a "Wireless and network" menu, a "Device connection" menu, a "Desktop and wallpaper" menu, a "Display" menu, a "Sound" menu, a "Notification center" menu, an "Application" menu, a "Battery" menu, and the like. When the terminal device 131 detects that the user taps the enabling button 52111 of the "Battery" menu 5211, the display interface of the terminal device 131 is shown in FIG. 12E. The display interface is the battery setting interface, including the "Remaining power" menu, the "Performance mode" menu, the "Power saving mode" menu, the "Super power saving" menu, the "Power consumption ranking" menu, the "Power usage details" menu, the "Power percentage display form" menu, the "More battery settings" menu, and the like of the battery of the terminal device 131. When the terminal device 131 detects that the user taps the button 521121 in the "Power saving mode" menu 52112, in this case, because the terminal device indicates that the terminal device does not support the NR capability, the display interface of the terminal device 131 is shown in FIG. 12F, and the button 521121 is in the enabled state. In this case, an icon 512 of "5G" is displayed in the status bar 510 at the uppermost part of the terminal device 131, and the remaining time of the terminal device 131 in the "Remaining power" menu of the terminal device 131 is updated to the remaining time in the "Power saving mode", that is, "42 hours and 43 minutes remained". When the terminal device 131 detects that the user's finger slides down along the terminal device 131 in the state 510, the display interface of the terminal device 131 is the GUI shown in FIG. 12G. In this case, the "5G" shortcut switch is in the disabled state, that is, the "5G" shortcut switch is in the off state, or the "5G" shortcut switch is in the gray state. In this case, that the "5G" shortcut switch is in the off state may be understood as that the terminal device 131 does not communicate with another device by using the 5G network. Therefore, the terminal device 131 implements active turning off of the 5G switch.

Case 2: The terminal device 131 detects that the power consumption of the terminal device is less than the first preset value. The first preset value may be preset. For example, the first preset value may be 20%.

FIG. 13A-FIG. 13F show a group of GUIs of the terminal device 131. FIG. 13A-FIG. 13F show a process in which the terminal device 131 detects that remaining power of the terminal device 131 is less than 20%, the terminal device 131 passively turns off the 5G switch, and the GUI of the terminal device 131 changes.

Figure 13A:
FIG. 13A-FIG. 13F are a schematic diagram of still another group of GUIs of a terminal device according to an embodiment of this application.
Figure 13B:
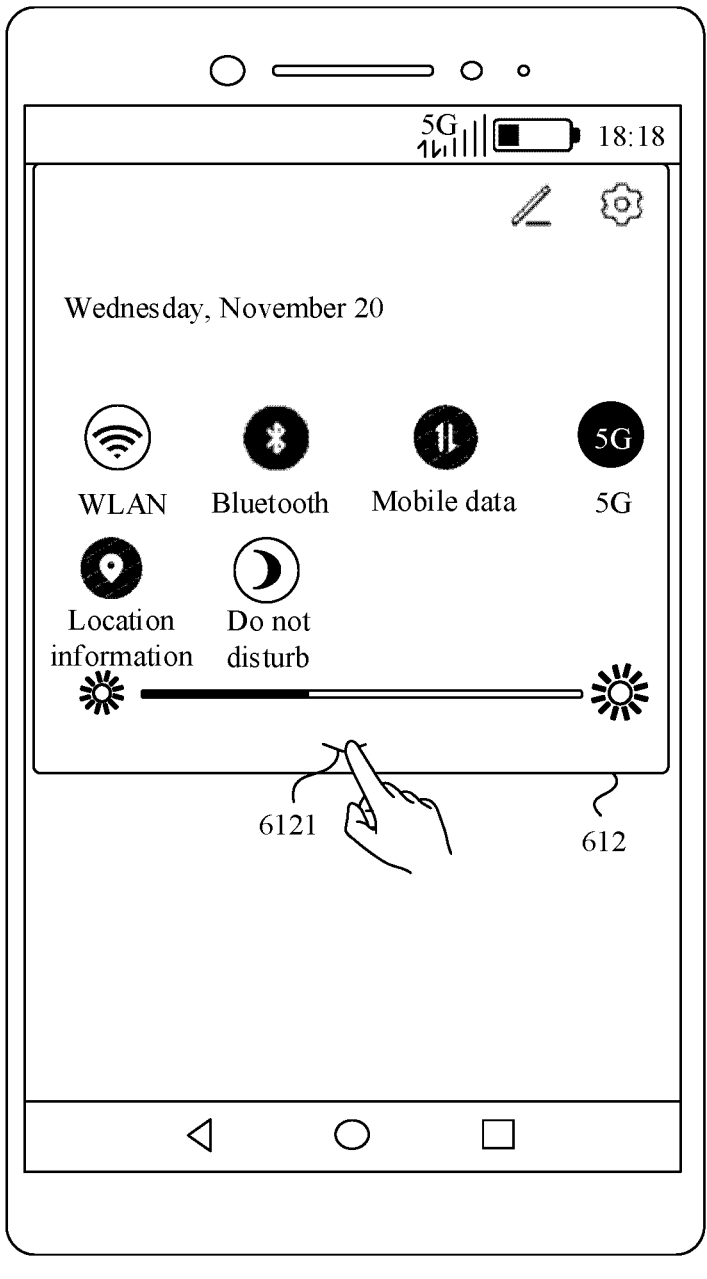
Figure 13C:
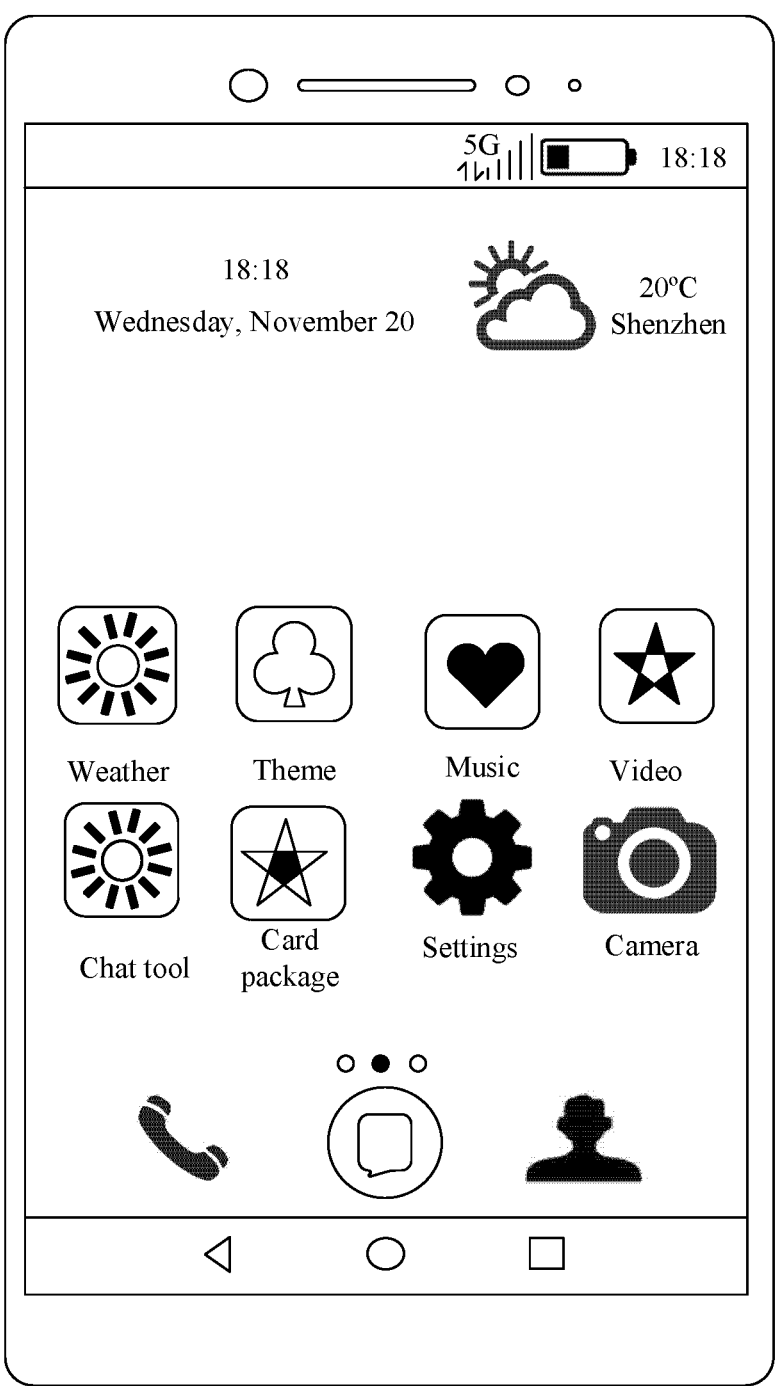
Figure 13D:
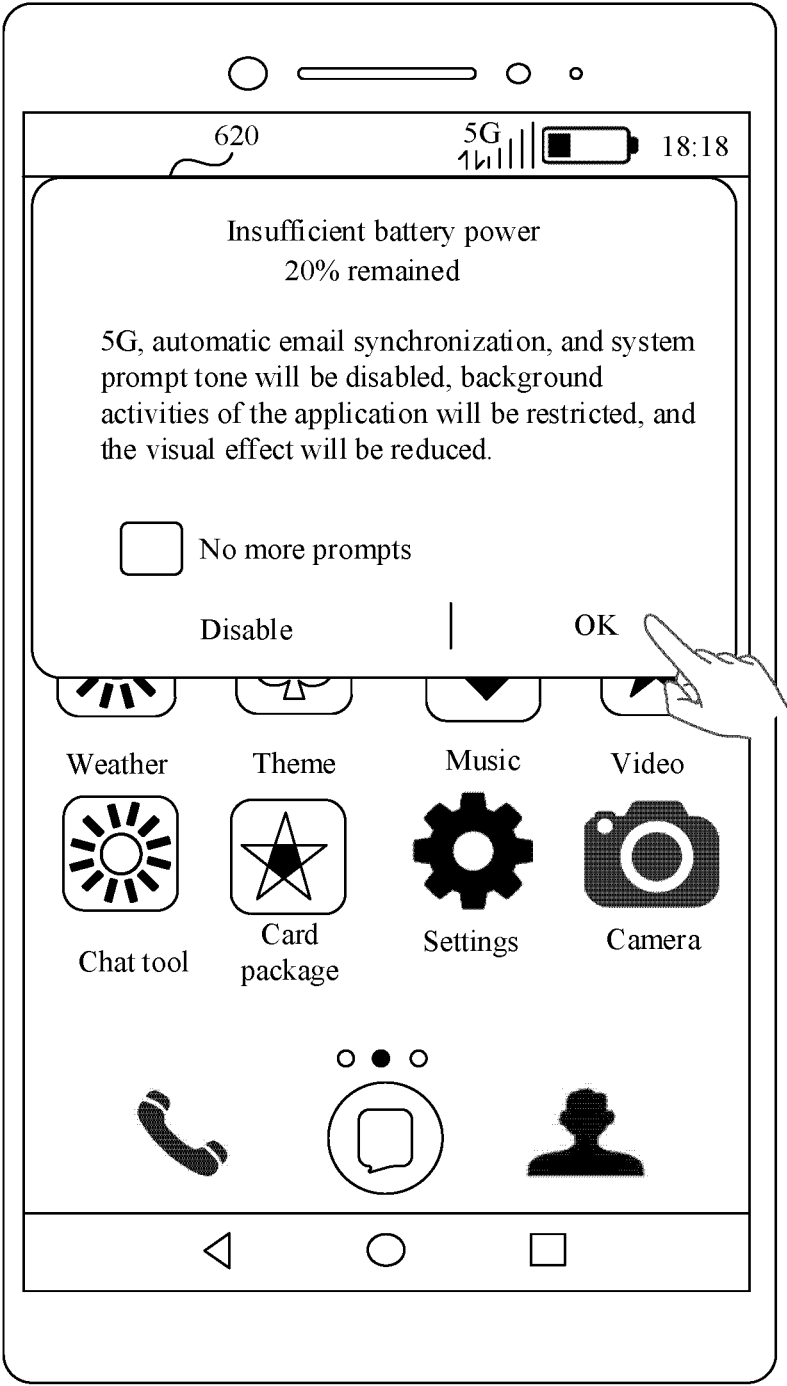
Figure 13E:
Figure 13F:
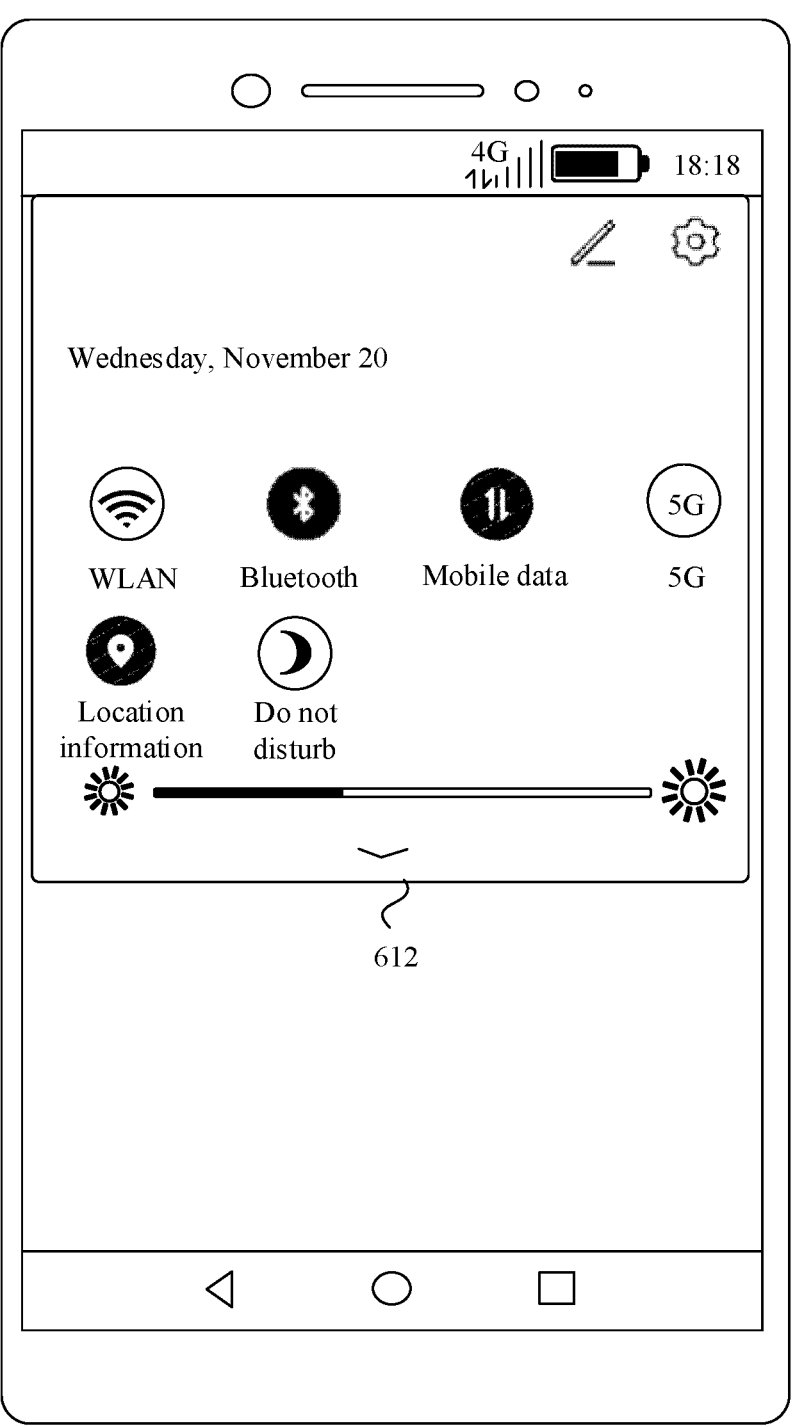

Referring to FIG. 13A, the GUI is a desktop of the terminal device 131. The desktop of the terminal device 131 includes three desktop pages, and each desktop page includes icons of one or more application programs. The current desktop of the mobile phone displays a second desktop page, and the desktop page includes a "Weather" icon, a "Theme" icon, a "Music" icon, a "Video" icon, a "Chat tool" icon, a "Card package" icon, a "Settings" icon, and a "Camera" icon. In this case, an icon 611 of "5G" is displayed in the status bar 610 at the uppermost part of the terminal device 131. When the terminal device 131 detects that the user's finger slides down along the terminal device 131 in the state 610, the display interface of the terminal device 131 is the GUI shown in FIG. 13B. The drop-down status bar 612 displayed on the display interface includes a "WLAN" shortcut switch, a "Bluetooth" shortcut switch, a "Mobile data" shortcut switch, a "5G" shortcut switch, a "Location information" shortcut switch, and a "Do not disturb" shortcut switch. When a shortcut switch is in an enabled state, the shortcut switch is in the on state. When a shortcut switch is in the disabled state, the shortcut switch is in the off state, that is, the shortcut switch is in the gray state. As shown in FIG. 13B, the "Bluetooth" shortcut switch, the "Mobile data" shortcut switch, the "5G" shortcut switch, and the "Location information" shortcut switch in the drop-down status bar 612 are in an enabled state, that is, the "Bluetooth" shortcut switch, the "Mobile data" shortcut switch, the "5G" shortcut switch, and the "Location information" shortcut switch are in the on state. In this case, that the "5G" shortcut switch is in the on state may be understood as that the terminal device 131 communicates with another device by using the 5G network. The "WLAN" shortcut switch and the "Do not disturb" switch in the drop-down status bar 612 are in the disabled state, that is, the "WLAN" shortcut switch and the "Do not disturb" switch are in the off state, or the "WLAN" shortcut switch and the "Do not disturb" switch are in the gray state. When the terminal device 131 detects that the user's finger taps the icon 6121, the display interface of the terminal device 131 is the GUI shown in FIG. 13C, that is, the desktop of the terminal device 131. When the terminal device 131 detects that the remaining battery power of the terminal device 131 is less than 20%, the terminal device 131 displays an "Insufficient battery power" prompt window 620. As shown in FIG. 13D, the "Insufficient battery power" prompt window 620 displays "5G, automatic email synchronization, and system prompt tone will be disabled, background activities of the application will be restricted, and the visual effect will be reduced." When the terminal device 131 detects that the user taps the "OK" option in the "Insufficient battery power" prompt window 620, in this case, because the terminal device indicates that the terminal device does not support the NR capability, an icon 613 of "4G" is displayed in the status bar 610 at the uppermost part of the display interface of the terminal device 131, as shown in FIG. 13E. When the terminal device 131 detects that the user's finger slides down along the terminal device 131 in the state 610, the display interface of the terminal device 131 is the GUI shown in FIG. 13F. In this case, the "5G" shortcut switch in the drop-down status bar 612 is in the disabled state, that is, the "5G" shortcut switch is in the off state, or the "5G" shortcut switch is in the gray state. In this case, that the "5G" shortcut switch is in the off state may be understood as that the terminal device 131 does not communicate with another device by using the 5G network. Therefore, the terminal device 131 implements passive disabling of the 5G switch.

Optionally, the prompt window 620 may alternatively be replaced with the second selection window shown in FIG. 7 part (d). After the terminal device 131 detects that the user taps the "Enable" button in the second selection window, a first selection window shown in FIG. 7 part (a) is displayed. After the terminal device 131 detects that the user taps the "Enable" button in the first selection window, the GUI of the terminal device 131 is shown in FIG. 13E.

Optionally, the prompt window 620 may alternatively be replaced with the second selection window shown in FIG. 7 part (e). After the terminal device 131 detects that the user taps the "Enable" button in the second selection window, a first selection window shown in FIG. 7 part (b) is displayed. After the terminal device 131 detects that the user taps the "Enable" button in the first selection window, the GUI of the terminal device 131 is shown in FIG. 13E.

FIG. 14A-FIG. 14E show a group of GUIs of the terminal device 131. FIG. 14A to FIG. 14E show a process in which the terminal device 131 detects that remaining power of the terminal device 131 is less than 20%, the terminal device 131 actively turns off the 5G switch, and the GUI of the terminal device 131 changes.

Referring to FIG. 14A, the GUI is a desktop of the terminal device 131. The desktop of the terminal device 131 includes three desktop pages, and each desktop page includes icons of one or more application programs. The current desktop of the mobile phone displays a second desktop page, and the desktop page includes a "Weather" icon, a "Theme" icon, a "Music" icon, a "Video" icon, a "Chat tool" icon, a "Card package" icon, a "Settings" icon, and a "Camera" icon. In this case, an icon 711 of "5G" is displayed in the status bar 710 at the uppermost part of the terminal device 131. When the terminal device 131 detects that the user's finger slides down along the terminal device 131 in the state 710, the display interface of the terminal device 131 is the GUI shown in FIG. 14B. The drop-down status bar 712 displayed on the display interface includes a "WLAN" shortcut switch, a "Bluetooth" shortcut switch, a "Mobile data" shortcut switch, a "5G" shortcut switch, a "Location information" shortcut switch, and a "Do not disturb" shortcut switch. When a shortcut switch is in an enabled state, the shortcut switch is in the on state. When a shortcut switch is in the disabled state, the shortcut switch is in the off state, that is, the shortcut switch is in the gray state. As shown in FIG. 14B, the "Bluetooth" shortcut switch, the "Mobile data" shortcut switch, the "5G" shortcut switch, and the "Location information" shortcut switch in the drop-down status bar 712 are in an enabled state, that is, the "Bluetooth" shortcut switch, the "Mobile data" shortcut switch, the "5G" shortcut switch, and the "Location information" shortcut switch are in the on state. In this case, that the "5G" shortcut switch is in the on state may be understood as that the terminal device 131 communicates with another device by using the 5G network. The "WLAN" shortcut switch and the "Do not disturb" switch in the drop-down status bar 712 are in the disabled state, that is, the "WLAN" shortcut switch and the "Do not disturb" switch are in the off state, or the "WLAN" shortcut switch and the "Do not disturb" switch are in the gray state. When the terminal device 131 detects that the user's finger taps the icon 7121, the display interface of the terminal device 131 is the GUI shown in FIG. 14C, that is, the desktop of the terminal device 131. When the terminal device 131 detects that the remaining battery power of the terminal device 131 is less than 20%, in this case, because the terminal device indicates that the terminal device does not support the NR capability, an icon 712 of "4G" is displayed at the status bar 710 at the uppermost part of the display interface of the terminal device 131, as shown in FIG. 14D. When the terminal device 131 detects that the user's finger slides down along the terminal device 131 in the state 710, the display interface of the terminal device 131 is the GUI shown in FIG. 14E. In this case, the "5G" shortcut switch in the drop-down status bar 712 is in the disabled state, that is, the "5G" shortcut switch is in the off state, or the "5G" shortcut switch is in the gray state. In this case, that the "5G" shortcut switch is in the off state may be understood as that the terminal device 131 does not communicate with another device by using the 5G network. Therefore, the terminal device 131 implements active disabling of the 5G switch.

Case 3: The terminal device 131 detects that the temperature of the rear cover of the terminal device 131 has risen above the second preset value. The second preset value may be preset. For example, the second preset value may be 43° C.

FIG. 15A-FIG. 15C show a group of GUIs of the terminal device 131. FIG. 15A-FIG. 15C show a process in which the terminal device 131 detects that temperature of the rear cover of the terminal device 131 has risen above the second preset value and the GUI of the terminal device 131 changes.

Referring to FIG. 15A, the GUI is a desktop of the terminal device 131. The desktop of the terminal device 131 includes three desktop pages, and each desktop page includes icons of one or more application programs. The current desktop of the mobile phone displays a second desktop page, and the desktop page includes a "Weather" icon, a "Theme" icon, a "Music" icon, a "Video" icon, a "Chat tool" icon, a "Card package" icon, a "Settings" icon, and a "Camera" icon. In this case, an icon 811 of "5G" is displayed in the status bar 810 at the uppermost part of the terminal device 131. When the terminal device 131 detects that the user's finger slides down along the terminal device 131 in the state 810, a display interface of the terminal device 131 is the GUI shown in FIG. 12B. The drop-down status bar 812 displayed on the display interface includes a "WLAN" shortcut switch, a "Bluetooth" shortcut switch, a "Mobile data" shortcut switch, a "5G" shortcut switch, a "Location information" shortcut switch, and a "Do not disturb" shortcut switch. When a shortcut switch is in an enabled state, the shortcut switch is in the on state. When a shortcut switch is in the disabled state, the shortcut switch is in the off state, that is, the shortcut switch is in the gray state. As shown in FIG. 15B, the "Bluetooth" shortcut switch, the "Mobile data" shortcut switch, the "5G" shortcut switch, and the "Location information" shortcut switch in the drop-down status bar 812 are in an enabled state, that is, the "Bluetooth" shortcut switch, the "Mobile data" shortcut switch, the "5G" shortcut switch, and the "Location information" shortcut switch are in the on state. In this case, that the "5G" shortcut switch is in the on state may be understood as that the terminal device 131 communicates with another device by using the 5G network. The "WLAN" shortcut switch and the "Do not disturb" switch in the drop-down status bar 812 are in the disabled state, that is, the "WLAN" shortcut switch and the "Do not disturb" switch are in the off state, or the "WLAN" shortcut switch and the "Do not disturb" switch are in the gray state. When the terminal device 131 detects that the user's finger taps the icon 8121, the display interface of the terminal device 131 is the GUI shown in FIG. 15C, that is, the desktop of the terminal device 131. When the terminal device 131 detects that the temperature of the rear cover of the terminal device 131 has risen above the second preset value, the terminal device 131 does not turn off the 5G switch, and the "5G" shortcut switch in the drop-down status bar 812 of the terminal device 131 is in the on state, that is, the "5G" shortcut switch is in the enabled state. In addition, the terminal device 131 does not indicate that the terminal device 131 does not support the NR capability. Therefore, the mobile network identifier displayed in the status bar 810 at the uppermost part of the display interface of the terminal device 131 is still an icon 811 of "5G".

Figure 17:
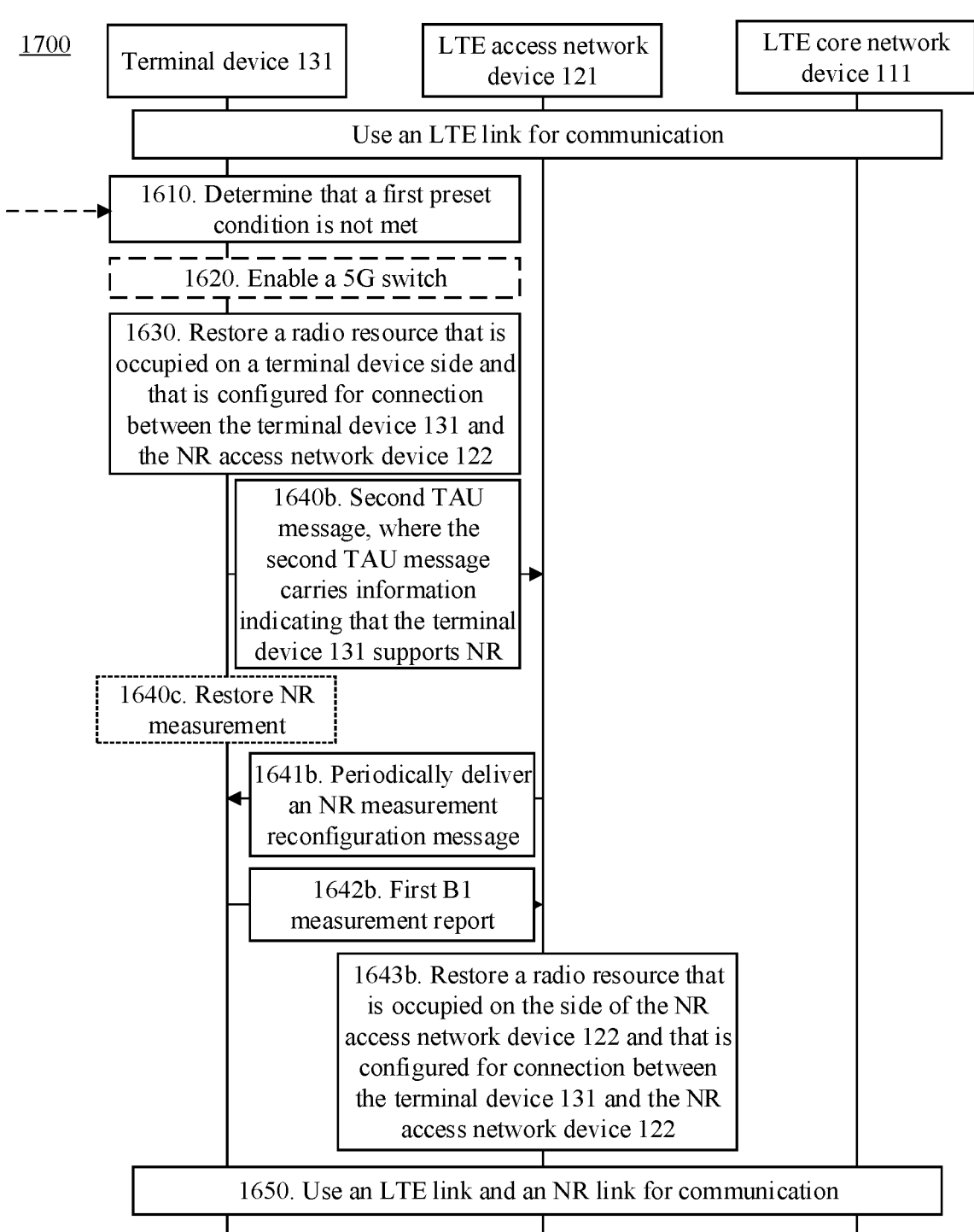
FIG. 17 is a schematic flowchart of still another communication method according to an embodiment of this application.

The following describes in detail, with reference to FIG. 16 and FIG. 17, the following process: When the terminal device 131 camps on a dual-connectivity network, after an NR link is released and the terminal device 131 uses the LTE link for communication, the terminal device 131 restores the NR link when the terminal device 131 determines that the terminal device 131 is in a non-power saving mode, and/or the power of the terminal device 131 is greater than a first preset value, and/or the temperature of the rear cover of the terminal device 131 is less than a second preset value.

A process in which the terminal device 131 restores the NR link is opposite to a process in which the terminal device 131 releases the NR link. Specifically, when the NR link is to be released, the terminal device releases the NR link by reporting information indicating that the terminal device does not support the NR capability; and when the NR link is to be restored, the terminal device restores the NR link by reporting information indicating that the terminal device supports the NR capability. For example, the steps included in the method 1600 may be the steps performed by the terminal device after the method 600 or the method 900 is performed. For another example, the steps included in the method 1700 may also be the steps performed by the terminal device after the method 600 or the method 900 is performed. When the NR link is to be released, the terminal device releases the NR link by stopping NR measurement. When the NR link is to be restored, the terminal device restores the NR link by restoring the NR measurement. For example, the steps included in the method 1700 in which step 1640*b* is replaced with step 1640*c* may be the steps performed by the terminal device after the method 800 or the method 1000 is performed.

FIG. 16 is a schematic flowchart of a communication method 1600 according to an embodiment of this application.

Step 1610: The terminal device 131 determines that the terminal device 131 does not meet the first preset condition.

That the terminal device 131 determines that the terminal device 131 does not meet the first preset condition may be understood as that the terminal device 131 detects that the terminal device 131 is in a non-power saving mode; and/or the terminal device 131 detects that the battery power of the terminal device 131 is greater than a first preset value; and/or the terminal device 131 detects that the temperature of the rear cover of the terminal device 131 is less than a second preset value.

That the terminal device 131 is in the non-power saving mode may be understood as that the switch of the power saving mode of the terminal device 131 is in the disabled state. That the power saving mode of the terminal device 131 is in the disabled state may be that the user turns off the switch of the power saving mode of the terminal device 131; or that the power saving mode of the terminal device 131 is in the disabled state may be that the terminal device 131 turn soff the switch of the power saving mode of the terminal device 131.

Optionally, the power saving mode may further include a super power saving mode. That the terminal device 131 detects that the terminal device 131 is in the non-power saving mode may alternatively be understood as that the switch of the power saving mode of the terminal device 131 is in the disabled state and/or the switch of the super power saving mode of the terminal device 131 is in the disabled state, that is, the terminal device 131 considers that the terminal device 131 is in the non-power saving mode provided that the terminal device 131 detects that at least one of the switch of the power saving mode of the terminal device 131 and the switch of the super power saving mode is in the disabled state.

Optionally, that the battery power of the terminal device 131 is greater than the first preset value may be that in a charging process of the terminal device 131, the terminal device 131 detects that the battery power of the terminal device 131 is greater than the first preset value.

For example, the terminal device 131 may determine that the first preset condition is not met in the following seven cases:

(1) The terminal device 131 detects that the terminal device 131 is in the non-power saving mode.

(2) The terminal device 131 detects that the battery power of the terminal device 131 is greater than the first preset value.

(3) The sensor on the rear cover of the terminal device 131 detects that the temperature of the rear cover of the terminal is less than the second preset value.

(4) The terminal device 131 detects that the terminal device 131 is in the non-power saving mode, and the terminal device 131 detects that the battery power of the terminal device 131 is greater than the first preset value.

(5) The terminal device 131 detects that the terminal device 131 is in the non-power saving mode, and the sensor on the rear cover of the terminal device 131 detects that the temperature of the rear cover of the terminal is less than the second preset value.

(6) The terminal device 131 detects that the battery power of the terminal device 131 is greater than the first preset value, and the sensor on the rear cover of the terminal device 131 detects that the temperature of the rear cover of the terminal is less than the second preset value.

(7) The terminal device 131 detects that the terminal device 131 is in the non-power saving mode, the terminal device 131 detects that the battery power of the terminal device 131 is greater than the first preset value, and the sensor on the rear cover of the terminal device 131 detects that the temperature of the rear cover of the terminal is less than the second preset value.

Optionally, in step 1620, the terminal device 131 turns off the 5G switch.

That the terminal device 131 turn off the 5G switch may be understood as that the mobile network identifier on the display interface of the terminal device 131 is "5G", and the 5G switch presented in the drop-down status bar of the display interface of the terminal device 131 is in an enabled state. If the 5G switch is added to the shortcut, in this case, the "5G" shortcut switch presented in the drop-down status bar of the display interface of the terminal device 131 is also in an enabled state.

Specifically, the foregoing step 1610 and step 1620 may be performed by the AP of the terminal device 131.

Optionally, when the terminal device 131 detects that the 5G switch of the terminal device 131 is in the disabled state, the terminal device 131 may perform the foregoing step 330. When the terminal device 131 detects that the 5G switch of the terminal device 131 is in the enabled state, the terminal device 131 may not perform the foregoing step 330.

Step 1630: The RRC layer of the terminal device 131 restores a radio resource that is occupied on the terminal device side and that is configured for connection between the terminal device 131 and the NR access network device 122.

Specifically, first, the AP of the terminal device 131 sends an AT command to the NAS of the terminal device 131, where the AT command instructs to restore the NR link; second, the NAS of the terminal device 131 indicates the RRC layer of the terminal device 131 to restore the NR link; and finally, the RRC layer of the terminal device 131 restores the radio resource that is occupied on the terminal device side and that is configured for the connection between the terminal device 131 and the NR access network device 122.

Optionally, the terminal device 131 may further indicate the LTE access network device 121 to restore the NR link, so as to restore the radio resource that is occupied on the NR access network device 122 side and that is configured for the connection between the terminal device 131 and the NR access network device 122. That is, the method 1600 includes step 1640*a* to step 1649*a*.

Step 1640*a*: The terminal device 131 sends a second detach request message to the LTE access network device 121. The second detach message includes an identifier of the terminal device 131, and the second detach request message is used to request to perform a detach operation based on the identifier of the terminal device 131. Correspondingly, the LTE access network device 121 receives the second detach request message sent by the terminal device 131.

Specifically, the NAS layer of the terminal device 131 sends the second detach request message to the LTE access network device 121. Correspondingly, the LTE access network device 121 receives the second detach request message sent by the NAS layer of the terminal device 131.

Because currently the terminal device 131 and an LTE access network device 121 may be in communication connection, the second detach operation may be understood as releasing a bearer established between the LTE access network device 121 and the terminal device 131, and a bearer established between the LTE access network device 121 and the LTE core network device 111.

Step 1641*a*: The LTE access network device 121 sends the second detach request message to the core network device 111. Correspondingly, the core network device 111 receives the second detach request message sent by the LTE access network device 121.

Step 1642*a*: The core network device 111 performs the detach operation on the terminal device 131 based on the second detach message.

Step 1643*a*: The LTE access network device 121 receives a second detach accept message sent by the core network device 111, where the second detach accept message is used to indicate that the second detach request for the terminal device 131 has been completed. Correspondingly, the core network device 111 sends the second detach accept message to the LTE access network device 121.

Step 1644*a*: The terminal device 131 receives the second detach accept message sent by the LTE access network device 121, and correspondingly, the LTE access network device 121 sends the second detach accept message to the terminal device 131.

Specifically, the NAS layer of the terminal device 131 receives the second detach accept message sent by the LTE access network device 121, and correspondingly, the LTE access network device 121 sends the second detach accept message to the NAS layer of the terminal device 131.

Step 1645*a*: The terminal device 131 sends a second attach request message to the LTE access network device 121, where the second attach request message carries NR capability information, the second attach request message includes an identifier of the terminal device 131, and the second attach request message is used to request to perform an attach operation based on the identifier of the terminal device 131. Correspondingly, the LTE access network device 121 receives the second attach request message sent by the terminal device 131.

Specifically, the NAS layer of the terminal device 131 sends the second attach request message to the LTE access network device 121. Correspondingly, the LTE access network device 121 receives the second attach request message sent by the NAS layer of the terminal device 131.

For example, if the second attach request message carries the NR capability information, a field in the second attach request message indicates that the terminal device supports the NR capability, for example, the field may be "dCNR: dual-connectivity-with-nr-supported". The foregoing attach operation may be understood as establishing the bearer between the LTE access network device 121 and the terminal device 131, and establishing the bearer between the NR access network device 122 and the terminal device 131.

Step 1646*a*: The LTE access network device 121 sends the second attach request message to the core network device 111. Correspondingly, the core network device 111 receives the second attach request message sent by the LTE access network device 121.

Step 1647*a*: The core network device 111 performs the attach operation on the terminal device 131 based on the second attach message.

Step 1648*a*: The LTE access network device 121 receives a second attach accept message sent by the core network device 111, where the second attach accept message is used to indicate that the second attach request for the terminal device 131 has been completed. Correspondingly, the core network device 111 sends the second attach accept message to the LTE access network device 121.

Step 1649*a*: The terminal device 131 receives the second attach accept message sent by the LTE access network device 121, where the second attach accept message is used to indicate that the LTE access network device has completed the attach request of the terminal device 131. Correspondingly, the LTE access network device 121 sends the second attach accept message to the terminal device 131.

Specifically, the NAS layer of the terminal device 131 receives the second attach accept message sent by the LTE access network device 121. Correspondingly, the LTE access network device 121 sends the second attach accept message to the NAS layer of the terminal device 131.

The foregoing method further includes step 1650.

Step 1650: After the NR link is restored, use the LTE link and the NR link for communication.

The terminal device camps on the LTE link and the NR link. When the terminal device determines that the terminal device meets the first preset condition, the terminal device turns off the 5G switch. In this case, the 5G switch on the "Settings" interface of the terminal device is in the disabled state. If the 5G switch is added to the shortcut, the "5G" shortcut switch presented in the drop-down status bar of the display interface of the terminal device is also in the disabled state. In addition, the terminal device indicates that the terminal device does not support the NR capability, so as to release the NR link. After the NR link is released, the mobile network identifier displayed on the display interface of the terminal device is "4G". In the method 1600, after the terminal device determines that the terminal device does not meet the first preset condition, the terminal device enables the 5G switch. In this case, the 5G switch on the "Settings" interface of the terminal device is in the enabled state. If the 5G switch is added to the shortcut, in this case, the "5G"

shortcut switch presented in a drop-down status bar of the display interface of the terminal device is also in the enabled state. In addition, the terminal device indicates, by using the second attach request message, that the terminal device supports the NR capability, so as to restore the NR link. After the NR link is restored, the mobile network identifier displayed on the display interface of the terminal device changes from "4G" to "5G" (in this case, the terminal device 131 successfully camps on 5G, and the mobile network identifier may not be displayed on the display interface of the terminal device 131). When the terminal device releases the NR link and uses the LTE link for communication, the terminal device sends the second attach request message to the LTE access network device when determining that at least one of the following is met: The terminal device is in the non-power saving mode, the battery power of the terminal device is greater than the first preset value, or the temperature of the rear cover of the terminal device is less than the second preset value, where the second attach request message is used to request to restore the radio resource that is occupied on the NR access network device side and that is configured for the connection between the terminal device and the NR access network device 122, thereby implementing restoration of the NR link. After the NR link is restored, the LTE link and the NR link are used for communication, thereby improving user experience.

FIG. 17 is a schematic flowchart of still another communication method 1700 according to an embodiment of this application. With reference to FIG. 17, the following describes in detail the communication method 1700 provided in this application. In the method 1700, a manner in which the terminal device 131 indicates the LTE access network device 121 to restore the NR link is different from the manner in the method 1600. That is, the method 1700 also includes the foregoing step 1610, step 1620, and step 1630, where step 1620 is also an optional step. Differences from the method 1600 are as follows: In the method 1700, step 1640*b* to step 1643*b* are used to replace step 1640*a* to step 1649*a* in the method 300; and step 1620 in the method 1600 is an optional step in the method 1700, that is, step 1620 may not be performed in the method 1700. When the 5G switch is in the disabled state, the method 1700 includes step 1620. When the 5G switch is in the enabled state, the method 1700 does not include step 1620; and after the terminal device 131 performs step 1610, the terminal device 131 may directly perform step 1630. For details about step 1610 and step 1630, refer to descriptions in the method 1600. Details are not described herein again. The following describes in detail steps 1640*b* to 1643*b*.

Step 1640*b*: The terminal device 131 sends a second TAU request message to the LTE access network device 121, where the second TAU request message is used to request to update the TA of the terminal device 131, and the second TAU request message carries information indicating that the terminal device 131 supports NR. Correspondingly, the LTE access network device 121 receives the second TAU request message sent by the terminal device 131.

Specifically, the NAS layer of the terminal device 131 sends the second TAU request message to the LTE access network device 121. Correspondingly, the LTE access network device 121 receives the second TAU request message sent by the NAS layer of the terminal device 131.

That the terminal device 131 supports NR may be understood as that the terminal device 131 has the NR capability.

After step 1640*b* is performed, step 1641*b* is performed.

Step 1641*b*: The terminal device 131 receives an NR measurement reconfiguration message periodically sent by the LTE access network device 121, where the NR mea-
surement reconfiguration message carries measurement
information of at least one first cell, the measurement
information includes a frequency channel number, a refer-
ence signal, and a measurement threshold, and the first cell
is a cell covered by the NR access network device 122.
Correspondingly, the LTE access network device 121 peri-
odically sends the NR measurement reconfiguration mes-
sage to the terminal device 131.

Specifically, the RRC layer of the terminal device 131
receives the NR measurement reconfiguration message peri-
odically sent by the LTE access network device 121. Cor-
respondingly, the LTE access network device 121 periodi-
cally sends the NR measurement reconfiguration message to
the RRC layer of the terminal device 131.

The at least one first cell is an inter-RAT neighboring cell
of the cell on which the terminal device 131 currently
camps.

For example, the reference signal may be a synchroniza-
tion signal block (SSB) and a channel state information
reference signal (CSI-RS).

For example, when there is one first cell, the NR mea-
surement reconfiguration message carries measurement
information of one first cell. For another example, when
there are a plurality of first cells, the NR measurement
reconfiguration message carries measurement information
of a plurality of first cells.

Step 1642b: The terminal device 131 sends a first B1
measurement report to the LTE access network device 121,
where the first B1 measurement report includes a measure-
ment value of RSRP of the at least one first cell. Corre-
spondingly, the LTE access network device 121 receives the
first B1 measurement report sent by the terminal device 131.

Specifically, the RRC layer of the terminal device 131
sends the first B1 measurement report to the LTE access
network device 121. Correspondingly, the LTE access net-
work device 121 receives the first B1 measurement report
sent by the RRC layer of the terminal device 131.

The B1 measurement report is specific to an event B1. The
event B1 means that quality of the inter-RAT neighboring
cell is higher than a specific threshold.

Specifically, after receiving the NR measurement recon-
figuration message, the terminal device 131 reports the
measurement report of the first cell when the terminal device
131 measures the at least one first cell in the NR measure-
ment reconfiguration message by using the RSRP that meets
the threshold of the at least one first cell.

When there is one first cell, the first B1 measurement
report includes the measurement value of the RSRP of the
first cell. For example, there is only one first cell, the first
cell is a cell 1, and a measurement threshold of the cell 1 is
−104 dBm. When the terminal device 131 measures that a
signal of the cell 1 is greater than ~104 dBm, the terminal
device 131 reports a B1 measurement report, where the B1
measurement report includes the measurement value of the
RSRP of the cell 1.

When there are a plurality of first cells, the first B1
measurement report includes measurement values of the
RSRP of the cells that are in the plurality of first cells and
whose measurement values reach a measurement threshold.
For example, there are three first cells: a cell 1, a cell 2, and
a cell 3; and a measurement threshold of the cell 1 is −104
dBm, a measurement threshold of the cell 2 is −94 dBm, and
a measurement threshold of the cell 3 is −84 dBm. When the
terminal device 131 measures that a signal of the cell 1 is
greater than −104 dBm, the terminal device 131 reports a B1
measurement report, where the B1 measurement report includes a measurement value of the RSRP of the cell 1.
When the terminal device 131 measures that a signal of the
cell 1 is greater than −104 dBm, the terminal device 131
reports a B1 measurement report, where the B1 measure-
ment report includes a measurement value of the RSRP of
the cell 1. When the terminal device 131 measures that a
signal of the cell 2 is greater than ~94 dBm, the terminal
device 131 reports a B1 measurement report, where the B1
measurement report includes a measurement value of the
RSRP of the cell 2. When the terminal device 131 measures
that a signal of the cell 3 is greater than ~84 dBm, the
terminal device 131 reports a B1 measurement report, where
the B1 measurement report includes a measurement value of
the RSRP of the cell 3.

Step 1643b: After the LTE access network device 121
receives the first B1 measurement report, restore a radio
resource that is occupied on the NR access network device
122 side and that is configured for connection between the
terminal device 131 and the NR access network device 122.

The terminal device camps on the LTE link and the NR
link. When the terminal device determines that the terminal
device meets the first preset condition, the terminal device
turns off the 5G switch. In this case, the 5G switch on the
"Settings" interface of the terminal device is in the disabled
state. If the 5G switch is added to the shortcut, the "5G"
shortcut switch presented in the drop-down status bar of the
display interface of the terminal device is also in the disabled
state. In addition, the terminal device indicates that the
terminal device does not support the NR capability, so as to
release the NR link. After the NR link is released, the mobile
network identifier displayed on the display interface of the
terminal device is "4G". In the method 1700, after the
terminal device determines that the terminal device does not
meet the first preset condition, the terminal device may turn
on the 5G switch. In this case, the 5G switch on the
"Settings" interface of the terminal device is in the enabled
state. If the 5G switch is added to the shortcut, in this case,
the "5G" shortcut switch presented in a drop-down status bar
of the display interface of the terminal device is also in the
enabled state. In addition, the terminal device indicates, by
using the second TAU request message, that the terminal
device supports the NR capability, so as to restore the NR
link. After the NR link is restored, the mobile network
identifier displayed on the display interface of the terminal
device changes from "4G" to "5G" (in this case, the terminal
device 131 successfully camps on 5G, and the mobile
network identifier may not be displayed on the display
interface of the terminal device 131). When the terminal
device releases the NR link and uses the LTE link for
communication, the terminal device sends the second TAU
request message to the LTE access network device when
determining that at least one of the following is met: The
terminal device is in the non-power saving mode, the battery
power of the terminal device is greater than the first preset
value, or the temperature of the rear cover of the terminal
device is less than the second preset value, where the second
TAU request message is used to request to restore the radio
resource that is occupied on the NR access network device
side and that is configured for the connection between the
terminal device and the NR access network device 122,
thereby implementing restoration of the NR link. After the
NR link is restored, the LTE link and the NR link are used
for communication, thereby improving user experience.

Optionally, as shown in FIG. 17, step 1640b may alter-
natively be replaced with step 1640c.

Step 1640c: The RRC layer of the terminal device 131
restores NR measurement.

Restoring the NR measurement may be understood as restoration of measurement of a cell covered by the NR access network device 122.

Optionally, the terminal device 131 may perform step 1641*b* only after step 1640*c* is completed. In this case, after receiving the first NR measurement reconfiguration message sent by the LTE access network device 121, the NAS layer of the terminal device 131 performs step 1642*b*. For example, when the terminal device 131 restores the NR measurement at 1 s, and the terminal device 131 receives the first NR measurement reconfiguration message sent by the LTE access network device 121 at 2 s, the terminal device 131 performs step 1642*b* at 2 s. Alternatively, the terminal device 131 first receives the one or more NR measurement reconfiguration messages sent by the LTE access network device 121, and then performs step 1640*c*; and further, the terminal device 131 receives the one or more NR measurement reconfiguration messages sent by the LTE access network device 121. In this case, the terminal device 131 performs step 1642*b* only after completing step 1640*c* and receiving the first NR measurement reconfiguration message sent by the LTE access network device 121. For example, when the terminal device 131 receives, at 0.5 s, the first NR measurement reconfiguration message sent by the LTE access network device 121, the terminal device 131 restores, at 1 s, measurement of the cell covered by the NR access network device 122, and the terminal device 131 receives, at 1.5 s, the second NR measurement reconfiguration message sent by the LTE access network device 121, the terminal device 131 performs step 1642*b* at 1.5 s.

The terminal device camps on the LTE link and the NR link. When the terminal device determines that the terminal device meets the first preset condition, the terminal device does not turn off the 5G switch. In this case, the 5G switch on the "Settings" interface of the terminal device is in the enabled state. If the 5G switch is added to the shortcut, the "5G" shortcut switch presented in the drop-down status bar of the display interface of the terminal device is also in an enabled state. In addition, the terminal device does not indicate that the terminal device does not support the NR capability, and releases the NR link. After the NR link is released, the mobile network identifier displayed on the display interface of the terminal device is "5G". In the method 1700 in which the foregoing step 1640*b* is replaced with step 1640*c*, after the terminal device determines that the terminal device does not meet the first preset condition, the 5G switch of the terminal device is always in an enabled state. In this case, the terminal device does not need to enable the 5G switch. In addition, the terminal device does not indicate a change of the NR capability of the terminal device. The NR link is restored by restoring the NR measurement. After the NR link is restored, the mobile network identifier displayed on the display interface of the terminal device is still "5G".

When the terminal device releases the NR link and uses the LTE link for communication, the terminal device restores the NR measurement when determining that at least one of the following is met: The terminal device is in the non-power saving mode, the battery power of the terminal device is greater than the first preset value, or the temperature of the rear cover of the terminal device is less than the second preset value, so as to restore the radio resource that is occupied on the NR access network device side and that is configured for the connection between the terminal device and the NR access network device 122, thereby implementing restoration of the NR link. After the NR link is restored, the LTE link and the NR link are used for communication, thereby improving user experience.

Using a mobile phone as an example of the terminal device 131, the following uses case 1', case 2', and case 3' as examples to describe a GUI change process of the terminal device 131 with reference to possible schematic scenario diagrams provided in FIG. 18A-FIG. 18G and FIG. 19A-FIG. 19E. In case 1', the mobile phone detects that the user is in the non-power saving mode. In case 2', the mobile phone detects that the battery power of the mobile phone is greater than the first preset value. In case 3', the mobile phone detects that the temperature of the rear cover of the mobile phone is less than the second preset value.

When the terminal device indicates that the terminal device does not support the NR capability, after the NR link is restored, when the mobile phone uses the LTE link for communication, the mobile network displayed on the mobile phone is "4G". When the terminal device indicates that the terminal device supports the NR capability, after the NR link is restored, when the mobile phone uses the LTE link and the NR link for communication, the mobile network displayed on the mobile phone is "5G".

When the terminal device does not indicate that the terminal device does not support the NR capability, after the NR link is released, when the mobile phone uses the LTE link for communication, the mobile network displayed on the mobile phone is "5G". When the terminal device does not indicate that the terminal device supports the NR capability, after the NR link is restored, when the mobile phone uses the LTE link and the NR link for communication, the mobile network displayed on the mobile phone is also "5G".

The following describes the GUI change process of the terminal device 131 based on the following examples: Case 1', for example, in the scenario shown in FIG. 18A-FIG. 18G, the terminal device 131 turns on the 5G switch, and the terminal device 131 indicates that the NR capability of the terminal device 131 changes; case 2', for example, in the scenario shown in FIG. 19A-FIG. 19E, the terminal device 131 turns on the 5G switch, and the terminal device 131 indicates that the NR capability of the terminal device 131 changes; and case 3', the terminal device 131 does not need to turn on the 5G switch, and the terminal device 131 does not indicate that the NR capability of the terminal device 131 changes.

Case 1': The terminal device 131 detects that the terminal device 131 is in the non-power saving mode.

FIG. 18A-FIG. 18G show a group of GUIs of the terminal device 131. FIG. 18A-FIG. 18G show a process in which the GUI of the terminal device 131 changes when the terminal device 131 is in a non-power saving mode.

Figure 18A:
FIG. 18A-FIG. 18G are a schematic diagram of still another group of GUIs of a terminal device according to an embodiment of this application.
Figure 18B:
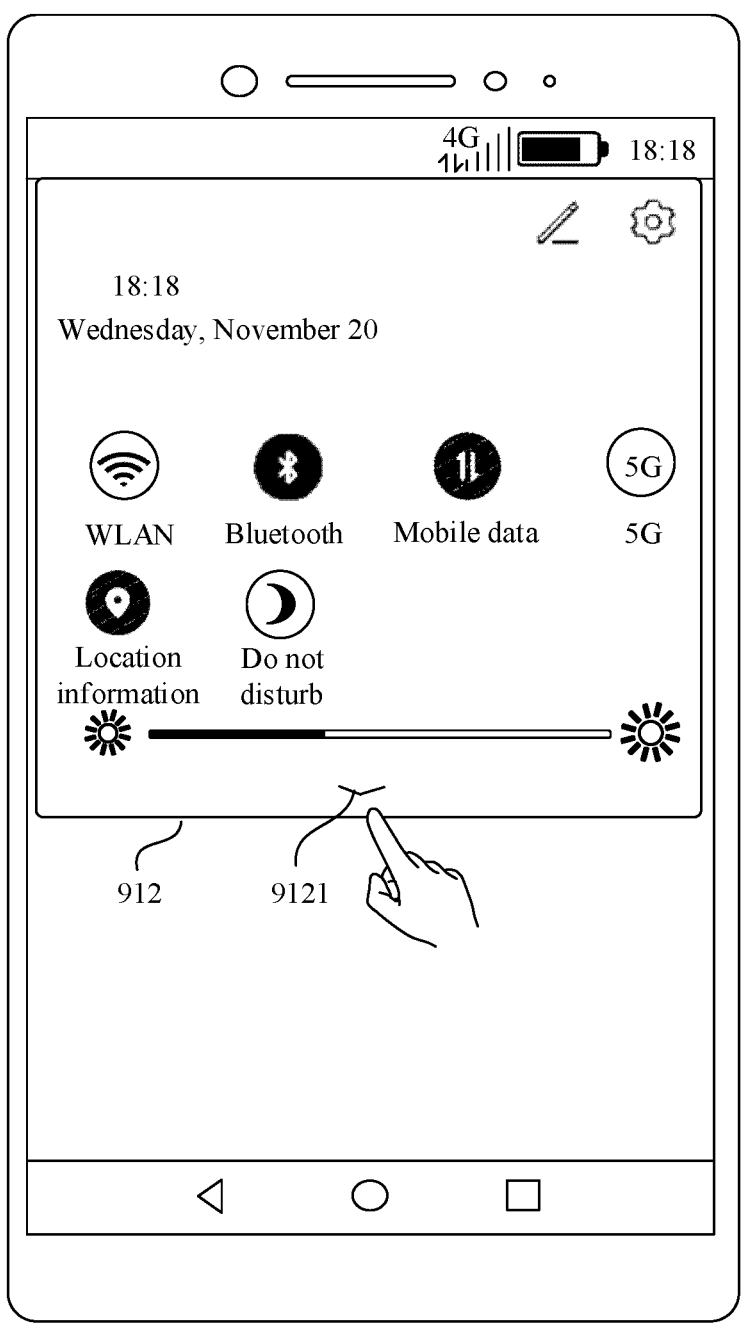
Figure 18C:
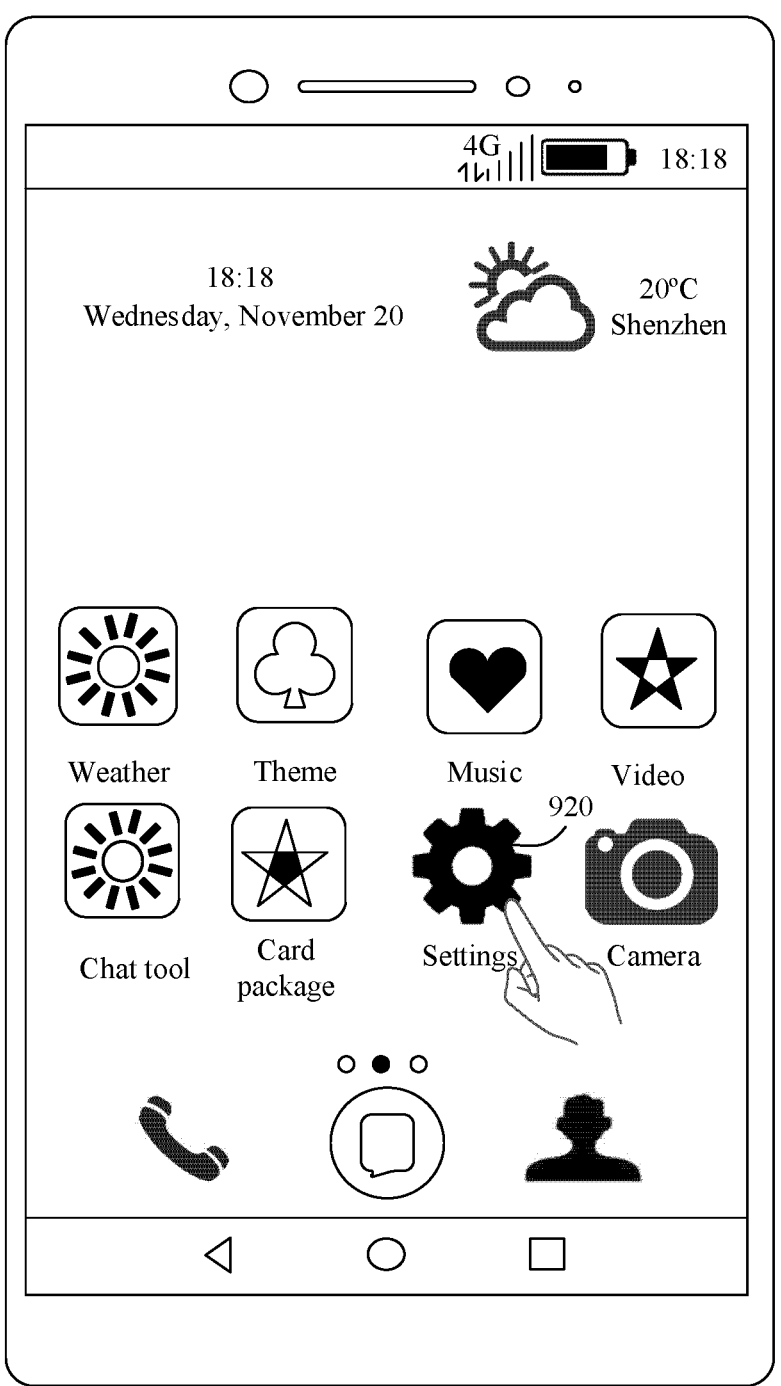
Figure 18D:
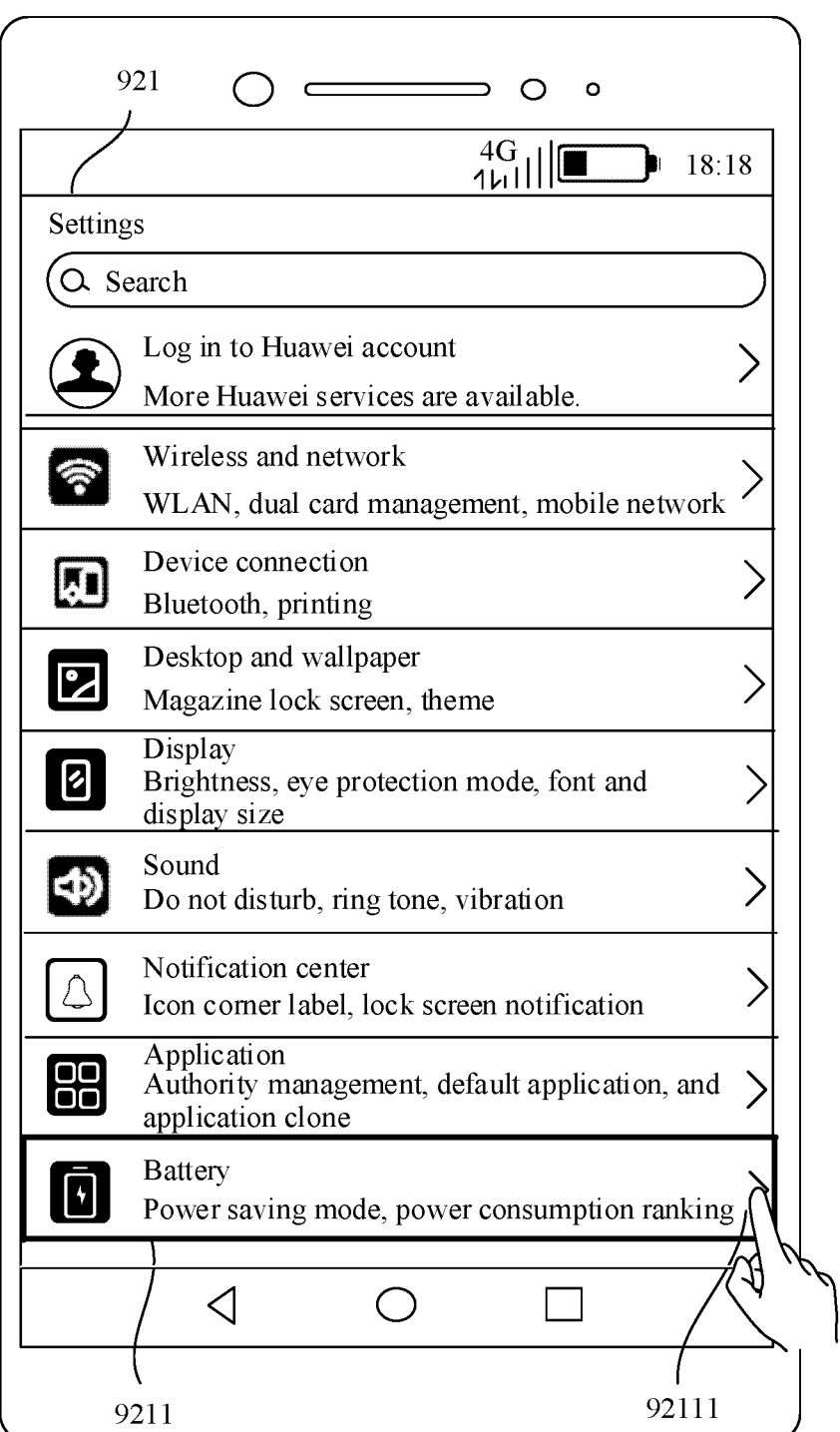
Figure 18E:
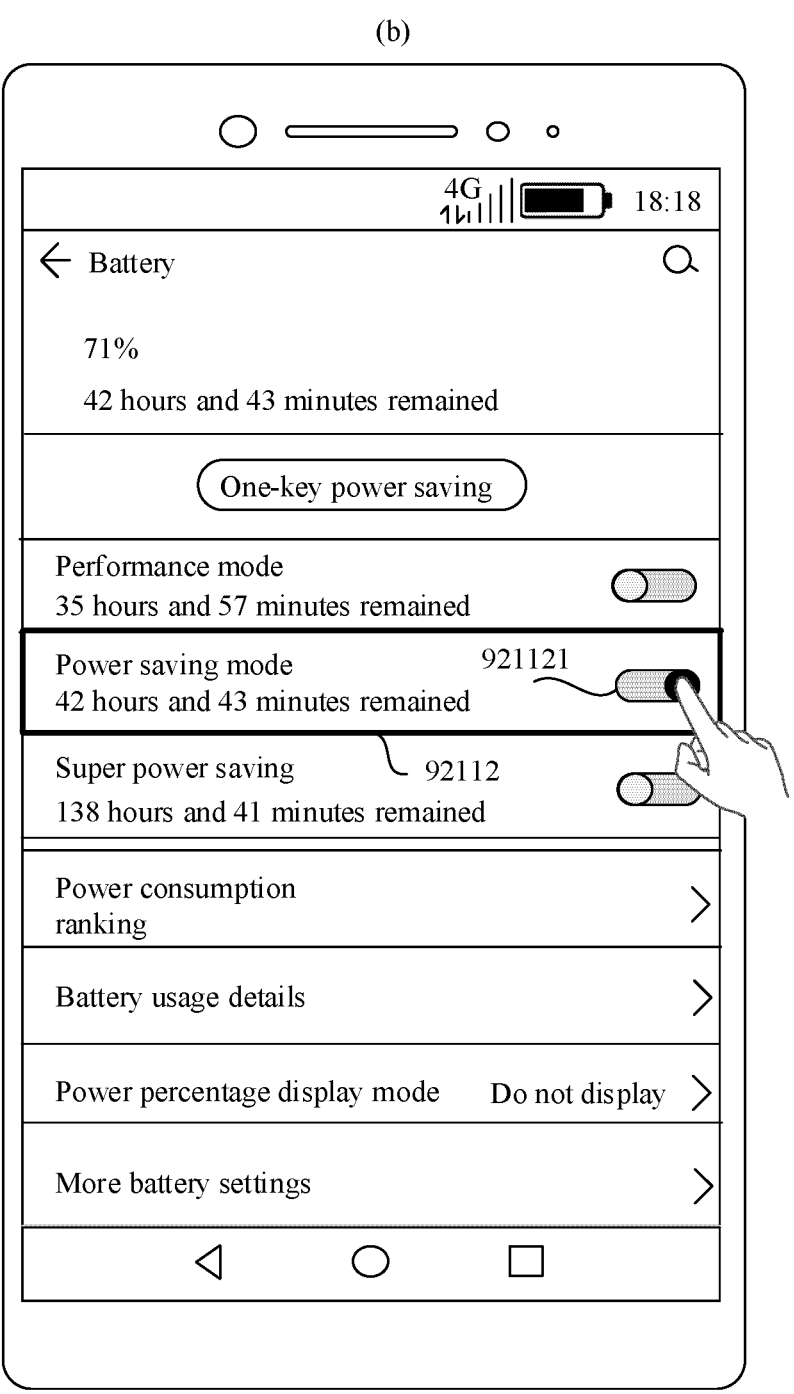
Figure 18F:
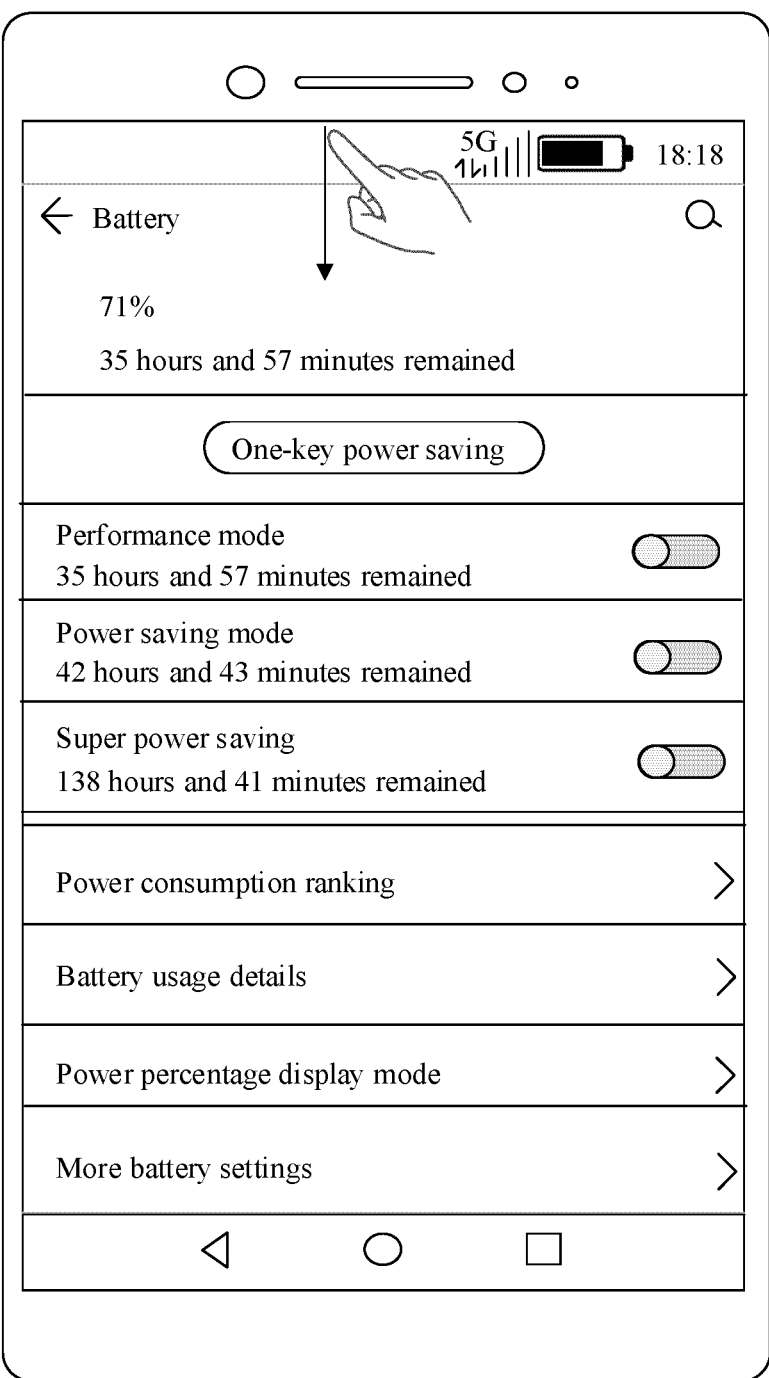
Figure 18G:
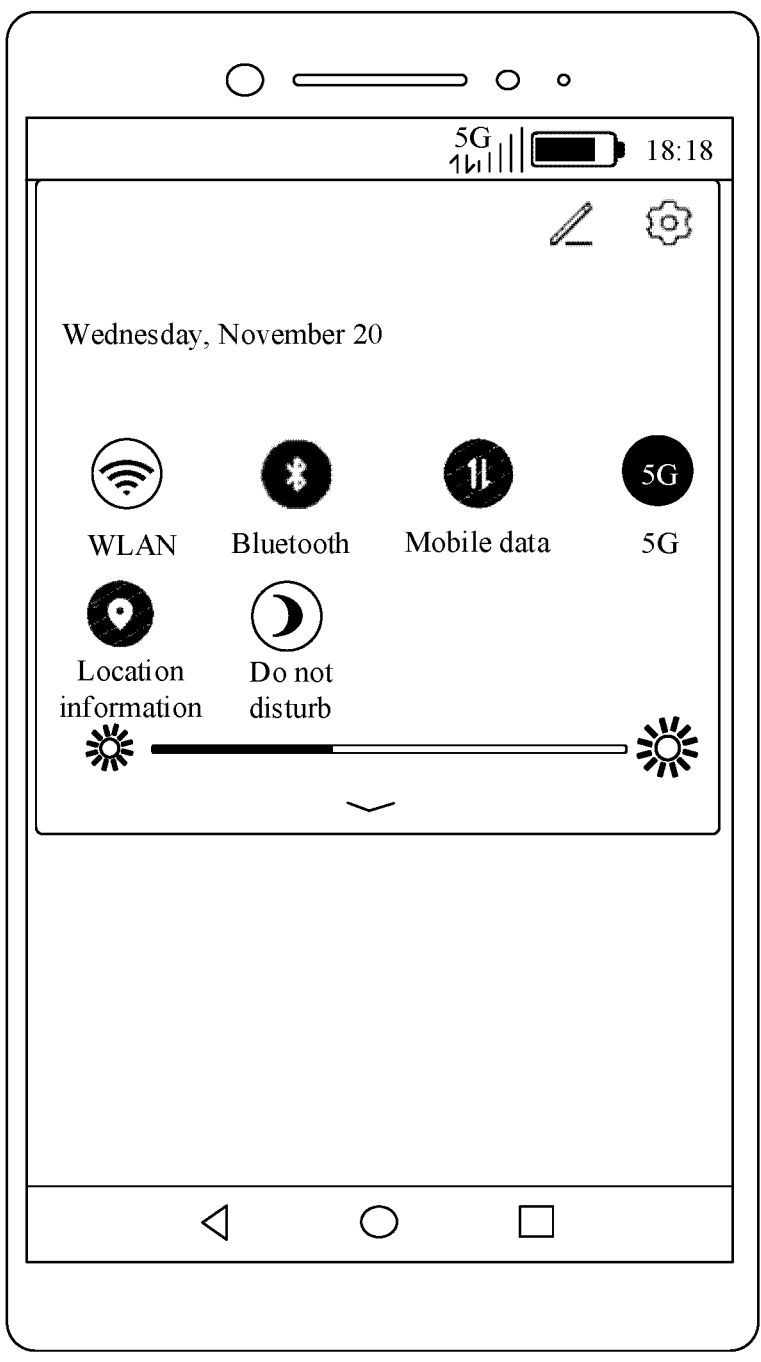

Referring to FIG. 18A, the GUI is a desktop of the terminal device 131. The desktop of the terminal device 131 includes three desktop pages, and each desktop page includes icons of one or more application programs. The current desktop of the mobile phone displays a second desktop page, and the desktop page includes a "Weather" icon, a "Theme" icon, a "Music" icon, a "Video" icon, a "Chat tool" icon, a "Card package" icon, a "Settings" icon, and a "Camera" icon. In this case, an icon 911 of "4G" is displayed in the status bar 910 at the uppermost part of the terminal device 131. When the terminal device 131 detects that the user's finger slides down along the terminal device 131 in the state 910, the display interface of the terminal device 131 is the GUI shown in FIG. 18B. The drop-down status bar 912 displayed on the display interface includes a "WLAN" shortcut switch, a "Bluetooth" shortcut switch, a "Mobile data" shortcut switch, a "5G" shortcut switch, a "Location information" shortcut switch, and a "Do not disturb" shortcut switch. When a shortcut switch is in an enabled state, the shortcut switch is in the on state. When a shortcut switch is in the disabled state, the shortcut switch is in the off state, that is, the shortcut switch is in the gray state. As shown in FIG. 18B, the "Bluetooth" shortcut switch, the "Mobile data" shortcut switch, and the "Location information" shortcut switch in the drop-down status bar 912 are in the enabled state, that is, the "Bluetooth" shortcut switch, the "Mobile data" shortcut switch, and the "Location information" shortcut switch are in the on state; the "WLAN" shortcut switch, the "5G" shortcut switch, and the "Do not disturb" switch in the drop-down status bar 912 are in the disabled state, that is, the "WLAN" shortcut switch, the "5G" shortcut switch, and the "Do not disturb" switch are in the off state, that is, the "WLAN" shortcut switch, the "5G" shortcut switch, and the "Do not disturb" switch are in the gray state. In this case, that the "5G" shortcut switch is in the disabled state may be understood as that the terminal device 131 does not communicate with another device by using the 5G network. When the terminal device 131 detects that the user's finger taps the icon 9121, the display interface of the terminal device 131 is the GUI shown in FIG. 18C, that is, the desktop of the terminal device 131. When the terminal device 131 detects that the user taps the "Settings" icon 920, the display interface of the terminal device 131 is the GUI shown in FIG. 18D. The display interface is a "Settings" interface 921. The "Settings" interface 921 includes a "Wireless and network" menu, a "Device connection" menu, a "Desktop and wallpaper" menu, a "Display" menu, a "Sound" menu, a "Notification center" menu, an "Application" menu, a "Battery" menu, and the like. When the terminal device 131 detects that the user taps the enabling button 92111 of the "Battery" menu 9211, the display interface of the terminal device 131 is shown in FIG. 18E. The display interface is the battery setting interface, including the "Remaining power" menu, the "Performance mode" menu, the "Power saving mode" menu, the "Super power saving" menu, the "Power consumption ranking" menu, the "Power usage details" menu, the "Power percentage display form" menu, the "More battery settings" menu, and the like of the battery of the terminal device 131. In this case, the button 921121 in the "Power saving mode" menu 92112 is in an enabled state, that is, the terminal device 131 has enabled the power saving mode. When the terminal device 131 detects that the user taps the button 921121 in the "Power saving mode" menu 92112, in this case, because the terminal device indicates that the terminal device supports the NR capability, the display interface of the terminal device 131 is shown in FIG. 18F, and the button 921121 is in the disabled state. In this case, the icon 913 of "5G" is displayed in the status bar 910 at the uppermost part of the terminal device 131. When the terminal device 131 detects that the user's finger slides down along the terminal device 131 in the state 910, the display interface of the terminal device 131 is the GUI shown in FIG. 18G. In this case, the "5G" shortcut switch is in the enabled state, that is, the "5G" shortcut switch is in the on state. In this case, that the "5G" shortcut switch is in the enabled state may be understood as that the terminal device 131 communicates with another device by using a 5G network. Therefore, the terminal device 131 implements turning on of the 5G switch.

Case 2': The terminal device 131 detects that the power of the terminal device is greater than the first preset value. The first preset value may be preset. For example, the first preset value may be 20%.

FIG. 19A-FIG. 19E show a group of GUIs of the terminal device 131. FIG. 19A-FIG. 19E show a GUI change process of the terminal device 131 when the terminal device 131 detects that the power of the terminal device 131 is greater than 20% and the terminal device 131 turns on the 5G switch.

Figure 19A:
FIG. 19A-FIG. 19E are a schematic diagram of still another group of GUIs of a terminal device according to an embodiment of this application.
Figure 19B:
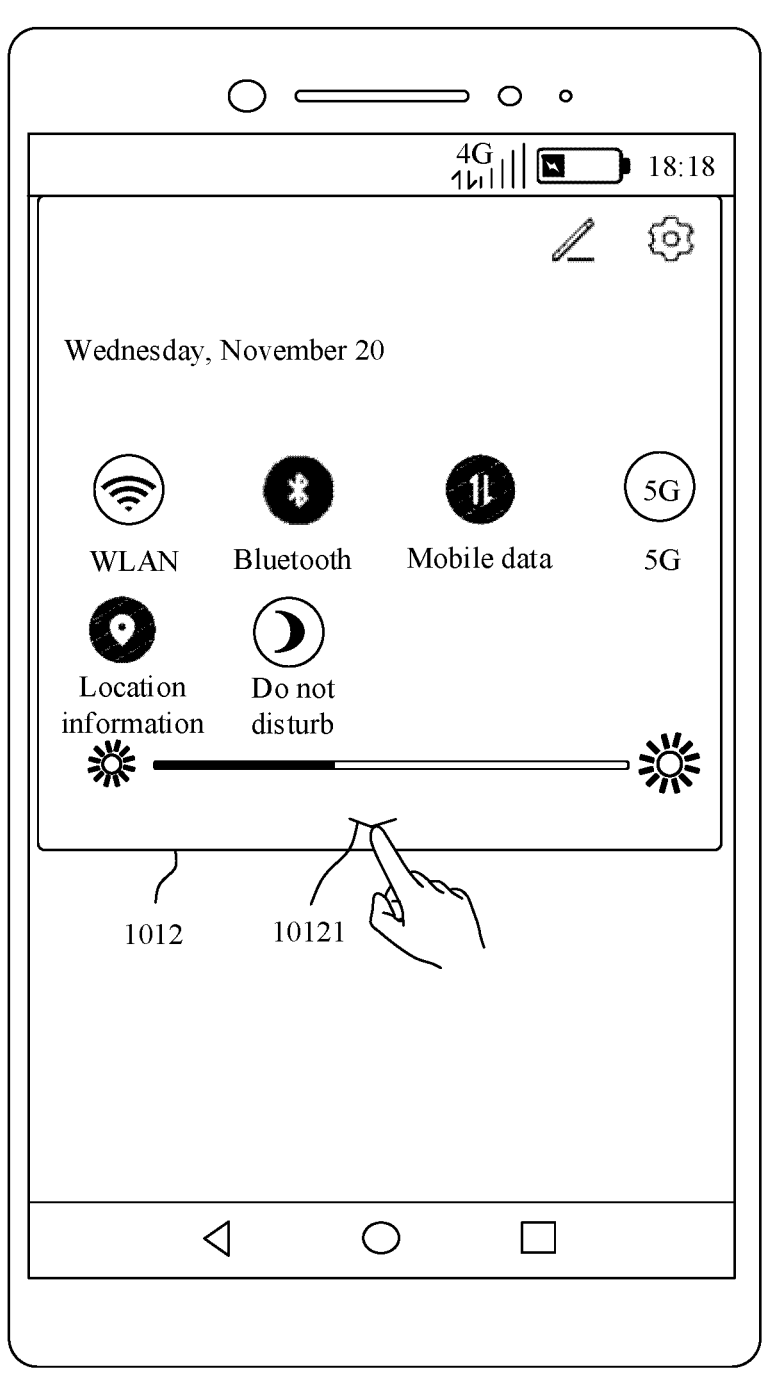
Figure 19C:
Figure 19D:
Figure 19E:
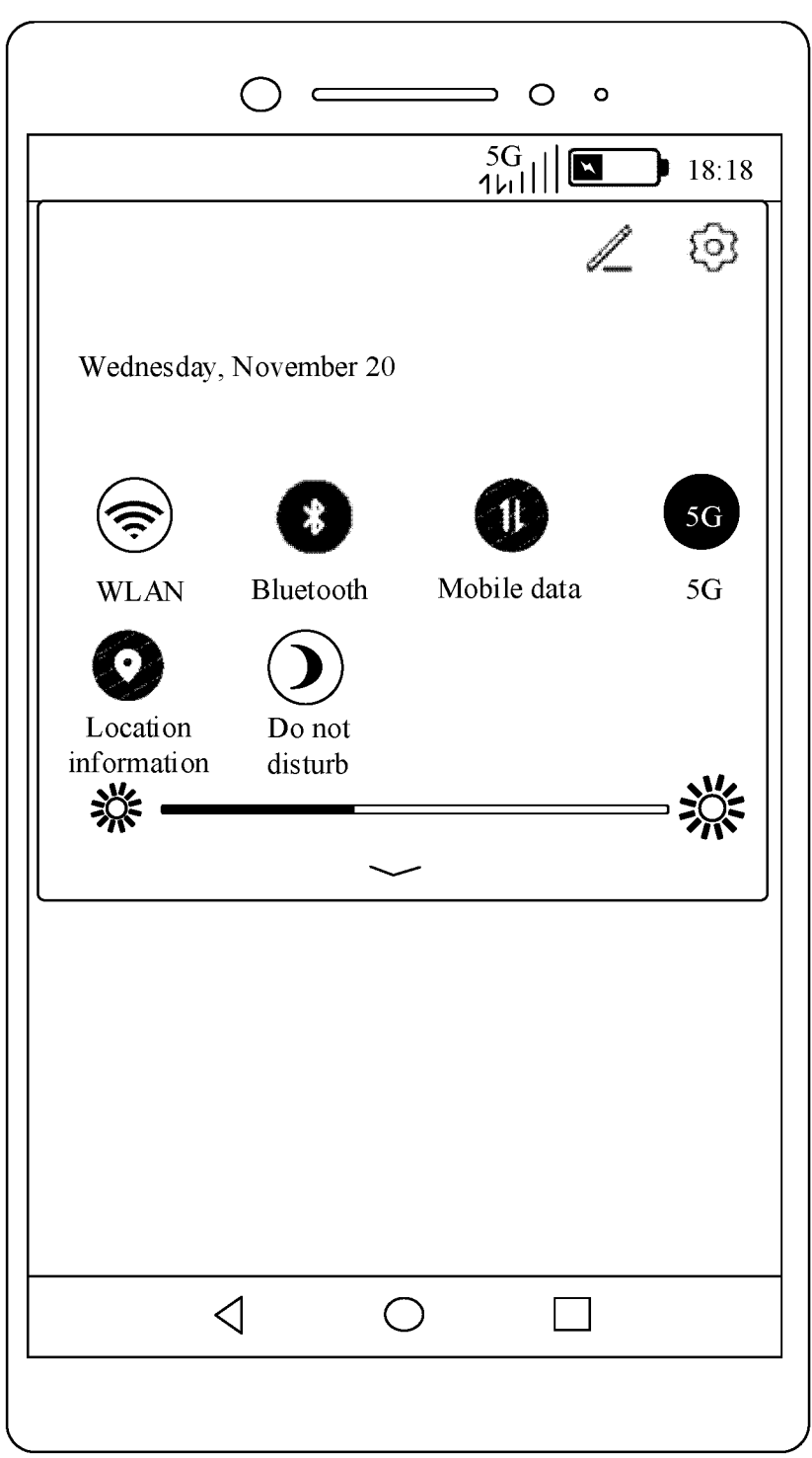

Referring to FIG. 19A, the GUI is a desktop of the terminal device 131. The desktop of the terminal device 131 includes three desktop pages, and each desktop page includes icons of one or more application programs. The current desktop of the mobile phone displays a second desktop page, and the desktop page includes a "Weather" icon, a "Theme" icon, a "Music" icon, a "Video" icon, a "Chat tool" icon, a "Card package" icon, a "Settings" icon, and a "Camera" icon. In this case, an icon 1011 of "4G" is displayed in the status bar 1010 at the uppermost part of the terminal device 131. When the terminal device 131 detects that the user's finger slides down along the terminal device 131 in the state 1010, the display interface of the terminal device 131 is the GUI shown in FIG. 19B. The drop-down status bar 1012 displayed on the display interface includes a "WLAN" shortcut switch, a "Bluetooth" shortcut switch, a "Mobile data" shortcut switch, a "5G" shortcut switch, a "Location information" shortcut switch, and a "Do not disturb" shortcut switch. When a shortcut switch is in an enabled state, the shortcut switch is in the on state. When a shortcut switch is in the disabled state, the shortcut switch is in the off state, that is, the shortcut switch is in the gray state. As shown in FIG. 19B, the "Bluetooth" shortcut switch, the "Mobile data" shortcut switch, and the "Location information" shortcut switch in the drop-down status bar 1012 are in the enabled state, that is, the "Bluetooth" shortcut switch, the "Mobile data" shortcut switch, and the "Location information" shortcut switch are in the on state; and the "WLAN" shortcut switch, the "5G" shortcut switch, and the "Do not disturb" switch in the drop-down status bar 1012 are in the disabled state, that is, the "WLAN" shortcut switch, the "5G" shortcut switch, and the "Do not disturb" switch are in the off state, that is, the "WLAN" shortcut switch, the "5G" shortcut switch, and the "Do not disturb" switch are in the gray state. In this case, that the "5G" shortcut switch is in the disabled state may be understood as that the terminal device 131 does not communicate with another device by using the 5G network. When the terminal device 131 detects that the user's finger taps the icon 10121, the display interface of the terminal device 131 is the GUI shown in FIG. 19C, that is, the desktop of the terminal device 131. When the terminal device 131 is in a charging state and the terminal device 131 detects that the power of the terminal device 131 is greater than 20%, in this case, because the terminal device indicates that the terminal device supports the NR capability, an icon 1013 of "5G" is displayed in the status bar 1010 at the uppermost part of the terminal device 131, as shown in FIG. 19D. When the terminal device 131 detects that the user's finger slides down along the terminal device 131 in the state 1010, the display interface of the terminal device 131 is the GUI shown in FIG. 19E. In this case, the "5G" shortcut switch is in the enabled state, that is, the "5G" shortcut switch is in the on state. In this case, that the "5G" shortcut switch is in the enabled state may be understood as that the terminal device 131 communicates with another device by using the 5G network. Therefore, the terminal device 131 implements turning on of the 5G switch.

Case 3': The terminal device 131 detects that the temperature of the rear cover of the terminal device 131 is less than the second preset value. The second preset value may be preset. For example, the second preset value may be 43° C.

The terminal device 131 detects that the temperature of the rear cover of the terminal device is less than the second preset value. In this case, the terminal device does not need to enable the 5G switch (the 5G switch is in the enabled state). In this case, the 5G switch on the "Settings" interface of the terminal device is in the enabled state. If the 5G switch is added to the shortcut, the "5G" shortcut switch presented in the drop-down status bar of the display interface of the terminal device is also in an enabled state. In this case, the terminal device 131 does not indicate that the terminal device supports the NR capability. Therefore, the mobile network identifier displayed on the display interface of the terminal device 131 is still "5G".

It should be understood that sequence numbers of the foregoing processes do not mean execution sequences. The execution sequences of the processes should be determined based on functions and internal logic of the processes, and should not be construed as any limitation on the implementation processes of the embodiments of this application.

It may be understood that, to implement the foregoing functions, the terminal device includes corresponding hardware and/or software modules for performing the functions. With reference to the algorithm steps described in the embodiments disclosed in this specification, this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of this application.

In the embodiments, the terminal device may be divided into functional units based on the method examples. For example, each functional module may be obtained through division based on a corresponding function, or two or more functions may be integrated into one processing module. The foregoing integrated modules may be implemented in a form of hardware. It should be noted that module division in this embodiment is an example, and is merely logical function division. In actual implementation, there may be another division manner.

Figure 20:
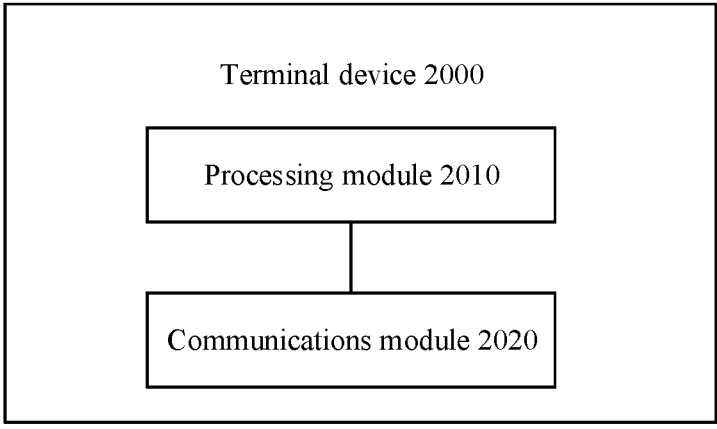
FIG. 20 is a possible schematic structural diagram of a terminal device according to this application.

FIG. 20 is a possible schematic structural diagram of a terminal device 2000 in the foregoing embodiment. As shown in FIG. 20, the terminal device 2000 may include a processing module 2010 and a communications module 2020. The processing module 2010 may be configured to control and manage actions of the terminal device. The communications module 2020 may be configured to support communication between the terminal device and another device.

The communications module 2020 may be configured to support the terminal device 2000 in performing step 350a, step 354a, step 355a, step 359a, step 350b, step 352b, step 350c, step 353c, step 350d, and the like.

The processing module 2010 may be configured to support the terminal device in determining whether the terminal device meets the first preset condition and turning off the 5G switch or turning on the 5G switch.

It should be noted that all related content of the steps in the foregoing method embodiment may be cited in function descriptions of corresponding functional modules, and details are not described herein again.

The terminal device provided in this embodiment is configured to perform the foregoing communication method. Therefore, a same effect as that of the foregoing implementation method may be achieved.

The processing module may be a processor or a controller. The processing module may implement or execute various example logical blocks, modules, and circuits described with reference to the disclosure of this application. The processor may alternatively be a combination for implementing computing functions, for example, a combination of one or more microprocessors, a combination of a digital signal processor (DSP) and a microprocessor. The storage module may be a memory. The communications module may be specifically a device that interacts with another terminal device, such as a radio frequency circuit, a Bluetooth chip, or a Wi-Fi chip.

In an embodiment, when the processing module is a processor, the terminal device in this embodiment may be a device having a structure shown in FIG. 4. In this structure, the communications module may be the mobile communications module shown in FIG. 4. In some embodiments, the communications module and the processing module may be integrated into one processor. In some other embodiments, the communications module and the processing module may be two processors, which respectively implement functions of the communications module and functions of the processing module.

This application further provides an apparatus, where the apparatus may be specifically a chip, a component, or a module, and the apparatus may include a connected processor, memory, and communications module. The memory is configured to store a computer executable instruction. When the apparatus runs, the processor may execute the computer executable instruction stored in the memory, so that the chip performs the communication methods in the foregoing method embodiments.

This embodiment further provides a computer storage medium. The computer storage medium stores a computer instruction. When the computer instruction is run on a terminal device, the terminal device is enabled to perform the foregoing related method steps to implement the communication method in the foregoing embodiment.

This embodiment further provides a computer program product. When the computer program product runs on a computer, the computer is enabled to perform the foregoing related steps, so as to implement the communication method in the foregoing embodiment.

The terminal device, computer storage medium, and computer program product or chip provided in the embodiments are all configured to perform the corresponding method provided above. Therefore, for beneficial effects that can be achieved, reference may be made to the beneficial effects in the corresponding method, and details are not described herein again.

It may be understood that some optional features in this embodiment of this application may not depend on another feature in some scenarios, for example, a solution that is currently based on the feature, but is implemented independently to resolve a corresponding technical problem and achieve a corresponding effect, or may be combined with another feature in some scenarios based on a requirement. Correspondingly, the apparatus provided in this embodiment of this application may correspondingly implement these features or functions, and details are not described herein again.

A person skilled in the art may further learn that various illustrative logic blocks and steps listed in the embodiments of this application may be implemented by electronic hardware, computer software, or a combination thereof. Whether this function is implemented by hardware or software depends on specific applications and design requirements of the entire system. A person skilled in the art may use different methods to implement the described functions for each particular application, but it should not be understood that the implementation goes beyond the protection scope of the embodiments of this application.

It should be understood that the processor in this embodiment of this application may be an integrated circuit chip, and has a signal processing capability. In an implementation process, the steps in the foregoing method embodiments may be completed by using an integrated logic circuit of hardware in the processor or an instruction in a form of software. The foregoing processor may be a general-purpose processor, a digital signal processor (DSP), an application specific integrated circuit (ASIC), a field programmable gate array (FPGA) or another programmable logic device, a discrete gate or a transistor logic device, or a discrete hardware component.

The technologies described in this application may be implemented in various manners. For example, these technologies may be implemented in a manner of hardware, software, or a combination of software and hardware. For hardware-based implementation, a processing unit configured to execute these technologies on a communications apparatus (for example, a base station, a terminal, a network entity, or a chip) may be implemented in one or more general-purpose processors, DSPs, digital signal processing devices, ASICs, programmable logic devices, FPGAs, or other programmable logic devices, discrete gates or transistor logic, discrete hardware components, or any combination thereof. The general-purpose processor may be a microprocessor, and optionally, the general-purpose processor may be any conventional processor, controller, microcontroller, or state machine. The processor may alternatively be implemented by using a combination of computing apparatuses, such as a digital signal processor and a microprocessor, a plurality of microprocessors, one or more microprocessors combined with a digital signal processor core, or any other similar configuration.

It may be understood that the memory in the embodiments of this application may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EE-PROM), or a flash memory. The volatile memory may be a random access memory (RAM) that serves as an external cache. By way of example but not of limitation, many forms of RAM are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM) and direct rambus RAM (DR RAM). It should be noted that the systems and methods described in this specification are intended to include but are not limited to these and any other suitable types of memories.

This application further provides a computer readable medium, where the computer readable medium stores a computer program, and the computer program implements a function of any one of the foregoing method embodiments when being executed by a computer.

This application further provides a computer program product, and the computer program product implements a function of any one of the foregoing method embodiments when being executed by a computer.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of this application are completely or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state disk (SSD)), or the like.

It should be understood that the "embodiment" mentioned throughout the specification means that a specific feature, structure, or characteristic related to the embodiment is included in at least one embodiment of this application. Therefore, the embodiments in the entire specification do not necessarily refer to a same embodiment. In addition, these specific features, structures or characteristics may be incorporated in one or more embodiments in any suitable manner. It should be understood that, in various embodiments of this application, sequence numbers of the foregoing processes do not mean execution sequences. The execution sequences of the processes should be determined based on functions and internal logic of the processes, and should not be construed as any limitation on the implementation processes of the embodiments of this application.

It should be further understood that in this application, "when . . . " and "if" all refer to corresponding processing performed by the UE or the base station in an objective situation, and are not a limited time, and it is not required that a determining action should be performed when the UE or the base station is implemented, and it does not mean that there is another limitation.

A person of ordinary skill in the art may understand that various numerical numbers such as "the first" and "the second" in this application are merely described for easy distinguishing, and are not intended to limit the scope of the embodiments of this application, and are used to indicate a sequence.

In this application, an element represented in a singular form is intended to represent "one or more", not "one and only one", unless otherwise noted. In this application, without special description, "at least one" is intended to represent "one or more", and "a plurality of" is intended to represent "two or more".

In addition, the terms "system" and "network" in this specification are often used interchangeably in this specification. The term "and/or" in this specification is only used to describe an association relationship between associated objects, and indicates that three relationships may exist. For example, A and/or B may indicate the following: Only A exists, both A and B exist, and only B exists, where A may indicate a singular or plural form, and B may indicate a singular or plural form.

The character "/" generally indicates that the associated objects are in an "or" relationship.

The term "at least one of . . . " in this specification represents all or any combination of the listed items, for example, "at least one of A, B, or C", and may represent the following six cases: Only A exists, only B exists, only C exists, both A and B exist, both B and C exist, and A, B, and C all exist, where A may indicate a singular or plural form, B may indicate a singular or plural form, and C may indicate a singular or plural form.

It should be understood that, in the embodiments of this application, "B corresponding to A" indicates that B is associated with A, and B may be determined based on A. However, it should be further understood that determining B based on A does not mean that B is determined based only on A, and B may be determined based on A and/or other information.

The correspondence shown in each table in this application may be configured, or may be predefined. A value of information in each table is merely an example, and may be configured as another value. This is not limited in this application. During configuration of the correspondence between the information and the parameters, it is not necessarily required to configure all the correspondences indicated in the tables. For example, in the table in this application, a correspondence shown in some rows may alternatively be not configured. For another example, appropriate variation and adjustment such as splitting and merging may be made based on the foregoing tables. The names of the parameters shown in the headings in the foregoing tables may alternatively be other names that may be understood by the communications apparatus, and values or representations of the parameters may alternatively be other values or representations that may be understood by the communications apparatus. During implementation, the foregoing tables may alternatively use another data structure, for example, an array, a queue, a container, a stack, a linear table, a pointer, a linked table, a tree, a graph, a structure, a class, a heap, or a hash table.

The pre-definition in this application may be understood as definition, pre-definition, storage, pre-storage, pre-negotiation, pre-configuration, curing, or pre-burning.

A person of ordinary skill in the art may be aware that, with reference to the examples described in the embodiments disclosed in this specification, units and algorithm steps may be implemented by electronic hardware or a combination of computer software and electronic hardware. Whether a function is performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the function is implemented in the form of a software functional unit and sold or used as an independent product, the function may be stored in a computer-readable storage medium. Based on such an understanding, the technical solutions of this application essentially, or the part contributing to the prior art, or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

For the same or similar parts in the embodiments in this application, reference may be made to each other. In the embodiments of this application and the embodiments/implementations in the embodiments, if there is no special description or logical conflict, terms and/or descriptions between different embodiments and the implementations in the embodiments are consistent and may be mutually referenced, and technical features in different embodiments and the implementations in the embodiments may be combined to form a new embodiment or implementation based on an inherent logical relationship. The foregoing embodiments of this application do not constitute a limitation on the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
displaying, by a terminal device, a mobile network identifier "5G";
camping, by the terminal device, on a dual-connectivity network, where the dual-connectivity network includes a long term evolution (LTE) link and a new radio (NR) link;

displaying, by the terminal device, an amount of battery time remaining of a battery of the terminal device while camping on the dual-connectivity network;

displaying, by the terminal device, a plurality of power control options, wherein for each power control option of the plurality of power control options, an amount of battery time remaining of the battery of the terminal device corresponding to selecting the power control option is displayed by the terminal device; and in response to a user enabling a given power control option of the plurality of power control options:

turning on, by the terminal device, a switch of a power saving mode of the terminal device corresponding to the given power control option;

releasing, by the terminal device, the NR link;

updating, by the terminal device, display of the mobile network identifier from "5G" to "4G"; and updating, by the terminal device, a displayed remaining time of the battery of the terminal device in the power saving mode.

2. The method according to claim 1, further comprising:

after releasing the NR link, performing, by the terminal device, communication over the LTE link.

3. The method according to claim 1, wherein the releasing the NR link comprises:

sending, by the terminal device, a first tracking area update (TAU) request message, wherein the first TAU request message carries information indicating that the terminal device does not support an NR capability.

4. The method according to claim 1, wherein the releasing the NR link comprises:

releasing, by the terminal device, a radio resource that is occupied on the terminal device and that is configured for connection between the terminal device and an NR access network device.

5. The method according to claim 1, wherein the releasing the NR link comprises:

sending, by the terminal device, a first detach attach request message, wherein the first detach attach request message is used to request to a detach operation.

6. The method according to claim 1, further comprising:

in response to turning on the switch of the power saving mode of the terminal device, disabling, by the terminal device, a 5G switch.

7. The method according to claim 6, further comprising:

in response to the user disabling the power saving mode of the terminal device, turning off, by the terminal device, the switch of the power saving mode of the terminal device;

in response to turning off the switch of the power saving mode of the terminal device, restoring, by the terminal device, the NR link; and in response to restoring the NR link, enabling, by the terminal device, the 5G switch.

8. The method according to claim 7, wherein the restoring the NR link comprises:

sending, by the terminal device, a second tracking area update (TAU) request message, wherein the second TAU request message carries information indicating that the terminal device supports NR; or sending, by the terminal device, a second attach request message, wherein the second attach request message carries information indicating that the terminal device supports NR.

9. The method according to claim 8, wherein the information indicating that the terminal device supports NR is a dCNR (dual connectivity with NR supported) field.

10. The method according to claim 1, further comprising:

displaying, by the terminal device, information on a first interface indicating 5G will be disabled in response to the power saving mode being enabled.

11. The method according to claim 1, wherein the plurality of power control options includes a performance mode option corresponding to a first amount of battery time remaining, a power saving mode option corresponding to a second amount of battery time remaining, and a super power saving mode option corresponding to a third amount of battery time remaining.

12. A terminal device, comprising:

a processor; and a computer storage medium, wherein the computer storage medium stores instructions, and in response to the processor executing the instructions, the terminal device is enabled to perform the following actions:

displaying a mobile network identifier "5G";

camping on a dual-connectivity network, where the dual-connectivity network includes a long term evolution (LTE) link and a new radio (NR) link;

displaying an amount of battery time remaining of a battery of the terminal device while camping on the dual-connectivity network;

displaying a plurality of power control options, wherein for each power control option of the plurality of power control options, an amount of battery time remaining of the battery of the terminal device corresponding to selecting the power control option is displayed by the terminal device; and in response to a user enabling a given power control option of the plurality of power control options:

turning on a switch of a power saving mode of the terminal device corresponding to the given power control option;

releasing the NR link;

updating display of the mobile network identifier from "5G" to "4G"; and updating a displayed remaining time of the battery of the terminal device in the power saving mode.

13. The terminal device according to claim 12, wherein in response to the processor executing the instructions, the terminal device is further enabled to perform the following action:

after releasing the NR link, performing communication over the LTE link.

14. The terminal device according to claim 12, wherein the releasing the NR link comprises:

sending a first tracking area update (TAU) request message, wherein the first TAU request message carries information indicating that the terminal device does not support an NR capability.

15. The terminal device according to claim 12, wherein in response to the processor executing the instructions, the terminal device is further enabled to perform the following action:

in response to turning on the switch of the power saving mode of the terminal device, disabling a 5G switch.

16. The terminal device according to claim 15, wherein in response to the processor executing the instructions, the terminal device is further enabled to perform the following actions:

in response to the user disabling the power saving mode of the terminal device, turning off, by the terminal device, the switch of the power saving mode of the terminal device;

in response to turning off the switch of the power saving mode of the terminal device, restoring the NR link; and in response to restoring the NR link, enabling the 5G switch.

17. The terminal device according to claim 16, wherein the restoring the NR link comprises:

sending a second tracking area update (TAU) request message, wherein the second TAU request message carries information indicating that the terminal device supports NR; or sending a second attach request message, wherein the second attach request message carries information indicating that the terminal device supports NR.

18. The terminal device according to claim 17, wherein the information indicating that the terminal device supports NR is a dCNR (dual connectivity with NR supported) field.

19. The terminal device according to claim 12, wherein in response to the processor executing the instructions, the terminal device is further enabled to perform the following action:

displaying information indicating 5G will be disabled in response to the power saving mode being enabled.

20. The terminal device according to claim 12, wherein the plurality of power control options includes a performance mode option corresponding to a first amount of battery time remaining, a power saving mode option corresponding to a second amount of battery time remaining, and a super power saving mode option corresponding to a third amount of battery time remaining.

\* \* \* \* \*